US012443533B2

(12) United States Patent
Roberts

(10) Patent No.: US 12,443,533 B2
(45) Date of Patent: *Oct. 14, 2025

(54) ADAPTIVE ADDRESS TRACKING

(71) Applicant: Micron Technology, Inc., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,516

(22) Filed: Jul. 27, 2022

(65) Prior Publication Data
US 2023/0052043 A1 Feb. 16, 2023

Related U.S. Application Data

(63) Continuation of application No. 16/928,932, filed on Jul. 14, 2020, now Pat. No. 11,409,657.

(51) Int. Cl.
*G06F 12/0862* (2016.01)
*G06F 12/0891* (2016.01)

(52) U.S. Cl.
CPC ...... *G06F 12/0862* (2013.01); *G06F 12/0891* (2013.01); *G06F 2212/6026* (2013.01)

(58) Field of Classification Search
None
See application file for complete search history.

(56) References Cited

U.S. PATENT DOCUMENTS 5,652,858 A ‡ 7/1997 Okada ................ G06F 12/0862
                                                711/138
5,721,874 A ‡ 2/1998 Carnevale .......... G06F 12/0886
                                                711/171

(Continued)

FOREIGN PATENT DOCUMENTS

CN      102696010 A      9/2012
CN      102968294 A      3/2013

(Continued)

OTHER PUBLICATIONS

"Final Office Action", U.S. Appl. No. 16/937,671, Nov. 16, 2021, 16 pages.‡

(Continued)

*Primary Examiner* — Rocio Del Mar Perez-Velez
*Assistant Examiner* — Marwan Ayash
(74) *Attorney, Agent, or Firm* — Colby Nipper PLLC

(57) ABSTRACT

Described apparatuses and methods track access metadata pertaining to activity within respective address ranges. The access metadata can be used to inform prefetch operations within the respective address ranges. The prefetch operations may involve deriving access patterns from access metadata covering the respective ranges. Suitable address range sizes for accurate pattern detection, however, can vary significantly from region to region of the address space based on, inter alia, workloads produced by programs utilizing the regions. Advantageously, the described apparatuses and methods can adapt the address ranges covered by the access metadata for improved prefetch performance. A data structure may be used to manage the address ranges in which access metadata are tracked. The address ranges can be adapted to improve prefetch performance through low-overhead operations implemented within the data structure.

(Continued)

The data structure can encode hierarchical relationships that ensure the resulting address ranges are distinct.

20 Claims, 27 Drawing Sheets

(56) References Cited

U.S. PATENT DOCUMENTS

| | | | |
|---|---|---|---|
| 5,790,823 A ‡ | 8/1998 | Puzak | G06F 9/383 |
| | | | 712/E9.047 |
| 5,809,566 A ‡ | 9/1998 | Charney | G06F 9/3802 |
| | | | 712/237 |
| 6,557,079 B1 ‡ | 4/2003 | Mason, Jr. | G06F 12/0862 |
| | | | 711/113 |
| 6,560,676 B1 ‡ | 5/2003 | Nishimoto | G06F 12/127 |
| | | | 711/E12.076 |
| 6,571,318 B1 ‡ | 5/2003 | Sander | G06F 12/0862 |
| | | | 711/204 |
| 6,728,840 B1 ‡ | 4/2004 | Shatil | G06F 12/0866 |
| | | | 712/240 |
| 7,333,994 B2 | 2/2008 | Glover et al. | |
| 7,434,004 B1 ‡ | 10/2008 | Spracklen | G06F 12/0862 |
| | | | 717/157 |
| 7,774,550 B2 ‡ | 8/2010 | Nomura | G06F 12/0862 |
| | | | 711/137 |
| 7,873,791 B1 ‡ | 1/2011 | Yu | G06F 12/0862 |
| | | | 711/144 |
| 9,110,677 B2 ‡ | 8/2015 | Ravimohan | G06F 9/4403 |
| 9,129,033 B1 | 9/2015 | Jenkins et al. | |
| 9,767,028 B2 ‡ | 9/2017 | Cheng | G06F 15/7821 |
| 9,769,030 B1 ‡ | 9/2017 | Ramalingam | H04L 67/535 |
| 9,886,385 B1 ‡ | 2/2018 | Huberty | G06F 12/0897 |
| 9,904,624 B1 ‡ | 2/2018 | Huberty | G06F 12/0875 |
| 9,971,694 B1 ‡ | 5/2018 | Meier | G06F 9/30047 |
| 10,001,927 B1 * | 6/2018 | Trachtman | G06F 3/0659 |
| 10,101,934 B1 | 10/2018 | Ben-moshe et al. | |
| 10,180,905 B1 ‡ | 1/2019 | Meier | G06F 12/0862 |
| 10,310,980 B2 | 6/2019 | Kalwitz | |
| 10,331,567 B1 ‡ | 6/2019 | Meier | G06F 12/0862 |
| 10,346,309 B1 ‡ | 7/2019 | Hakewill | G06F 12/0875 |
| 10,452,551 B2 ‡ | 10/2019 | Venkatesh | G06F 12/0897 |
| 11,294,808 B2 ‡ | 4/2022 | Roberts | G06F 12/0868 |
| 11,507,516 B2 | 11/2022 | Roberts et al. | |
| 11,693,775 B2 | 7/2023 | Roberts et al. | |
| 2002/0087800 A1 ‡ | 7/2002 | Abdallah | G06F 9/3455 |
| | | | 712/E9.047 |
| 2004/0049642 A1 ‡ | 3/2004 | Liang | G06F 9/3824 |
| | | | 712/E9.046 |
| 2004/0123043 A1 ‡ | 6/2004 | Rotithor | G06F 12/0215 |
| | | | 711/108 |
| 2005/0081014 A1 ‡ | 4/2005 | Tran | G06F 12/0215 |
| | | | 711/213 |
| 2006/0053256 A1 ‡ | 3/2006 | Moyer | G06F 12/0215 |
| | | | 711/E12.004 |
| 2006/0179238 A1 ‡ | 8/2006 | Griswell, Jr. | G06F 9/30043 |
| | | | 712/E9.047 |
| 2006/0179239 A1 ‡ | 8/2006 | Fluhr | G06F 12/0862 |
| | | | 711/137 |
| 2006/0248279 A1 ‡ | 11/2006 | Al-Sukhni | G06F 12/0862 |
| | | | 711/111 |
| 2006/0248280 A1 ‡ | 11/2006 | Al-Sukhni | G06F 9/30047 |
| | | | 711/137 |
| 2006/0248281 A1 ‡ | 11/2006 | Al-Sukhni | G06F 12/0862 |
| | | | 712/E9.047 |
| 2007/0005934 A1 ‡ | 1/2007 | Rotithor | G06F 12/0862 |
| | | | 711/213 |
| 2007/0043908 A1 ‡ | 2/2007 | Diefendorff | G06F 12/0862 |
| | | | 712/207 |
| 2008/0005466 A1 ‡ | 1/2008 | Lubbers | G06F 12/126 |
| | | | 711/E12.075 |
| 2008/0209130 A1 ‡ | 8/2008 | Kegel | G06F 12/1027 |
| | | | 711/135 |
| 2009/0006813 A1 ‡ | 1/2009 | Singhal | G06F 9/383 |
| | | | 712/207 |
| 2009/0063777 A1 ‡ | 3/2009 | Usui | G06F 12/0862 |
| | | | 711/137 |
| 2009/0172293 A1 ‡ | 7/2009 | Sun | G06F 12/0862 |
| | | | 711/E12.004 |
| 2009/0287884 A1 | 11/2009 | Toyoshima et al. | |
| 2010/0211745 A1 ‡ | 8/2010 | Jeddeloh | G06F 12/0875 |
| | | | 713/340 |
| 2010/0228941 A1 ‡ | 9/2010 | Koob | G06F 12/0895 |
| | | | 711/212 |
| 2010/0306222 A1 * | 12/2010 | Freedman | G06F 16/9014 |
| | | | 707/769 |
| 2011/0093654 A1 | 4/2011 | Roberts et al. | |
| 2011/0173398 A1 ‡ | 7/2011 | Boyle | G06F 12/0862 |
| | | | 711/E12.001 |
| 2011/0219208 A1 ‡ | 9/2011 | Asaad | G06F 9/06 |
| | | | 712/12 |
| 2012/0054443 A1 | 3/2012 | Nakra | |
| 2012/0124318 A1 ‡ | 5/2012 | Bivens | G06F 12/0646 |
| | | | 711/170 |
| 2012/0144125 A1 ‡ | 6/2012 | Greiner | G06F 12/0862 |
| | | | 711/E12.004 |
| 2012/0278560 A1 * | 11/2012 | Benzion | G06F 12/0862 |
| | | | 711/137 |
| 2013/0013867 A1 ‡ | 1/2013 | Manne | G06F 12/0862 |
| | | | 711/137 |
| 2013/0138892 A1 ‡ | 5/2013 | Loh | G06F 12/123 |
| | | | 711/134 |
| 2013/0166831 A1 | 6/2013 | Atkisson et al. | |
| 2013/0166874 A1 ‡ | 6/2013 | Auernhammer | G06F 12/1081 |
| | | | 711/204 |
| 2013/0185475 A1 | 7/2013 | Talagala et al. | |
| 2013/0185508 A1 | 7/2013 | Talagala et al. | |
| 2013/0185515 A1 ‡ | 7/2013 | Sassone | G06F 12/0862 |
| | | | 711/137 |
| 2013/0238861 A1 ‡ | 9/2013 | Manne | G06F 12/0897 |
| | | | 711/137 |
| 2014/0028693 A1 ‡ | 1/2014 | Wang | G06T 1/60 |
| | | | 345/557 |
| 2014/0149678 A1 ‡ | 5/2014 | Chaudhary | G06F 12/0862 |
| | | | 711/137 |
| 2014/0181415 A1 ‡ | 6/2014 | Loh | G06F 12/0862 |
| | | | 711/137 |
| 2014/0379994 A1 ‡ | 12/2014 | Yoshikawa | G06F 12/0862 |
| | | | 711/135 |
| 2015/0113223 A1 | 4/2015 | Brown et al. | |
| 2015/0121011 A1 | 4/2015 | Huang | |
| 2015/0143057 A1 ‡ | 5/2015 | Pavlou | G06F 9/383 |
| | | | 711/137 |
| 2015/0234663 A1 ‡ | 8/2015 | Chishti | G06F 9/3808 |
| | | | 712/207 |
| 2015/0234746 A1 ‡ | 8/2015 | Jo | G06F 12/0862 |
| | | | 711/103 |
| 2015/0269027 A1 | 9/2015 | Wan | |
| 2015/0356014 A1 ‡ | 12/2015 | Sathish | G06F 12/0862 |
| | | | 711/3 |
| 2016/0019157 A1 | 1/2016 | Palacharla et al. | |
| 2016/0055088 A1 ‡ | 2/2016 | Zhang | G06F 12/0862 |
| | | | 711/137 |
| 2016/0062894 A1 ‡ | 3/2016 | Schwetman, Jr. | H04L 67/5681 |
| | | | 711/137 |
| 2016/0154750 A1 ‡ | 6/2016 | Park | G06F 3/061 |
| | | | 711/153 |
| 2016/0227236 A1 | 8/2016 | Matsumoto | H04N 19/44 |
| 2016/0335177 A1 | 11/2016 | Huang et al. | |
| 2016/0364146 A1 ‡ | 12/2016 | Kuttner | G06F 3/0644 |
| 2016/0371187 A1 ‡ | 12/2016 | Roberts | G06F 12/0835 |
| 2016/0378668 A1 ‡ | 12/2016 | Roberts | G06F 12/0862 |
| | | | 711/137 |
| 2017/0116118 A1 ‡ | 4/2017 | Artieri | G06F 12/0895 |
| 2017/0142217 A1 ‡ | 5/2017 | Misra | H04L 67/568 |
| 2017/0192887 A1 ‡ | 7/2017 | Herdrich | G06F 12/0895 |
| 2017/0212837 A1 * | 7/2017 | Breternitz | G06F 3/0611 |
| 2017/0242626 A1 | 8/2017 | O'krafka et al. | |
| 2017/0286305 A1 * | 10/2017 | Kalwitz | G06F 12/0862 |
| 2017/0300416 A1 ‡ | 10/2017 | Yamamura | G06F 12/0862 |

(56) References Cited

U.S. PATENT DOCUMENTS

| | | | |
|---|---|---|---|
| 2017/0344880 A1‡ | 11/2017 | Nekuii | G06F 17/153 |
| 2018/0018266 A1‡ | 1/2018 | Jones, III | G06F 12/0811 |
| 2018/0024836 A1‡ | 1/2018 | Gschwind | G06F 9/30047 712/207 |
| 2018/0089087 A1‡ | 3/2018 | Chang | G06F 12/0862 |
| 2018/0285278 A1‡ | 10/2018 | Appu | G06F 12/0848 |
| 2018/0341592 A1‡ | 11/2018 | Drerup | G06F 12/0862 |
| 2018/0349288 A1‡ | 12/2018 | Vakharwala | G06F 12/1475 |
| 2019/0004944 A1 | 1/2019 | Widder et al. | |
| 2019/0057300 A1‡ | 2/2019 | Mathuriya | G06F 3/0683 |
| 2019/0087341 A1‡ | 3/2019 | Pugsley | G06F 12/0811 |
| 2019/0258579 A1‡ | 8/2019 | Carey | G06F 12/0873 |
| 2019/0317901 A1‡ | 10/2019 | Kachare | G06F 3/0688 |
| 2019/0324932 A1‡ | 10/2019 | Srinivas | G06F 11/3017 |
| 2020/0004685 A1‡ | 1/2020 | Guim Bernat | G06F 12/0813 |
| 2020/0081848 A1‡ | 3/2020 | Bae | G06F 3/0656 |
| 2020/0349080 A1‡ | 11/2020 | Radi | H04L 67/568 |
| 2021/0034528 A1‡ | 2/2021 | Karve | G06F 12/0811 |
| 2021/0034529 A1‡ | 2/2021 | Karve | G06F 12/0862 |
| 2021/0073133 A1‡ | 3/2021 | Sharon | G06F 13/1668 |
| 2021/0089457 A1‡ | 3/2021 | Park | G06F 16/23 |
| 2021/0365376 A1‡ | 11/2021 | Roberts | G06F 12/0864 |
| 2021/0390053 A1‡ | 12/2021 | Roberts | G06F 12/0873 |
| 2022/0019530 A1‡ | 1/2022 | Roberts | G06F 12/0646 |
| 2022/0019537 A1 | 1/2022 | Roberts | |
| 2022/0058132 A1‡ | 2/2022 | Roberts | G06F 12/0895 |
| 2022/0179785 A1 | 6/2022 | Tan et al. | |
| 2022/0222180 A1‡ | 7/2022 | Roberts | G06F 12/0868 |
| 2023/0088638 A1 | 3/2023 | Roberts | |
| 2023/0169011 A1 | 6/2023 | Roberts et al. | |

FOREIGN PATENT DOCUMENTS

| | | | |
|---|---|---|---|
| CN | 106462495 A | | 2/2017 |
| CN | 110688062 A | | 1/2020 |
| CN | 110727403 A | | 1/2020 |
| KR | 20170028228 | ‡ | 3/2017 |
| WO | WO-2021236800 | ‡ | 11/2021 |
| WO | WO-2021257281 | ‡ | 12/2021 |

OTHER PUBLICATIONS

"Notice of Allowance", U.S. Appl. No. 16/880,248, Nov. 24, 2021, 6 pages.‡

"Final Office Action", U.S. Appl. No. 16/901,890, Sep. 27, 2021, 29 pages.‡

"Advisory Action", U.S. Appl. No. 16/901,890, Dec. 6, 2021, 3 pages.‡

"Non-Final Office Action", U.S. Appl. No. 16/901,890, Jul. 9, 2021, 26 pages.‡

"Non-Final Office Action", U.S. Appl. No. 16/880,248, Jul. 9, 2021, 15 pages.‡

Salkhordeh, et al., "ReCA: An Efficient Reconfigurable Cache Architecture for Storage Systems with Online Workload Characterization", May 3, 2018, 14 pages.‡

Zhang, et al., "A Self-Tuning Cache Architecture for Embedded Systems", May 2004, pp. 407-425.‡

Madan, et al., "Optimizing Communication and Capacity in a 3D Stacked Reconfigurable Cache Hierarchy", Jan. 2008, pp. 262-273.‡

"Non-Final Office Action", U.S. Appl. No. 16/937,671, Jun. 23, 2021, 14 pages.‡

"Non-Final Office Action", U.S. Appl. No. 16/928,932, Jun. 28, 2021, 20 pages.‡

"International Search Report and Written Opinion", Application No. PCT/US2021/035535, Sep. 10, 2021, 10 pages.‡

"International Search Report and Written Opinion", Application No. PCT/US2021/033210, Sep. 3, 2021, 10 pages.‡

Pursuant to MPEP § 2001.6(b) the applicant brings the following co-pending application to the Examiner's attention: U.S. Appl. No. 16/937,671.‡

"Non-Final Office Action", U.S. Appl. No. 16/901,890, Feb. 17, 2022, 33 pages.‡

Nesbit, et al., "AC/DC: An Adaptive Data Cache Prefetcher", University of Wisconsin—Madison; Department of Electrical and Computer Engineering; In Proceedings of the 13th International Conference on Parallel Architectures and Compilation Techniques (PACT '04); IEEE Society, 2004, 11 pages.‡

Shi, et al., "Dynamic Page Size Adjustment in Operating System", IEEE; 2016 International Conference on Information System and Artificial Intelligence, 2016, 5 pages.‡

Hashemi, et al., "Learning Memory Access Patterns", retrieved from https://arxiv.org/pdf/1803.02329.pdf on Jan. 27, 2020, Mar. 6, 2018, 15 pages.‡

"Radix Tree", retrieved from https://en.wikipedia.org/wiki/Radix_tree on Jan. 27, 2020, 8 pages.‡

"Notice of Allowance", U.S. Appl. No. 16/997,811, Jul. 13, 2022, 9 pages.‡

Huang, et al., "Open Prefetch—Let There Be Industry-Competitive Prefetching in RISC-V Processors", Institute of Computing Technology (ICT); Chinese Academy of Sciences (CAS); Retrieved from https://content.riscv.org/wp-content/uploads/2018/07/Shanghai-1350_OpenPrefetch.pdf on Jan. 27, 2020, 20 pages.‡

Rothman, et al., "Sector Cache Design and Performance", Report No. UCB/CSD-99-1034; Computer Science Division (EECS); University of California, Jan. 1999, 63 pages.‡

Gervasi, "Overcoming System Memory Challenges with Persistent Memory and NVDIMM-P", JEDEC Server Forum 2017, Jan. 2017, 14 pages.‡

Bakhshalipour, et al., "Domino Temporal Data Prefetcher", Proceedings of the 24th International Symposium on High-Performance Architecture (HPCA); Department of Computer Engineering, Sharif University of Technology; School of Computer Science, Institute for Research in Fundamental Sciences (IPM); IEEE, Feb. 2018, 12 pages.‡

"Notice of Allowance", U.S. Appl. No. 16/937,671, Apr. 13, 2022, 21 pages.‡

"Final Office Action", U.S. Appl. No. 16/901,890, Jun. 10, 2022, 35 pages.‡

"International Preliminary Report on Patentability", Application No. PCT/US2021/033210, Nov. 17, 2022, 7 pages.

"International Preliminary Report on Patentability", Application No. PCT/US2021/035535, Dec. 13, 2022, 7 pages.

"Non-Final Office Action", U.S. Appl. No. 17/657,922, Oct. 6, 2022, 29 pages.

"Non-Final Office Action", U.S. Appl. No. 16/901,890, Nov. 9, 2022, 37 pages.

"Final Office Action", U.S. Appl. No. 16/928,932, Nov. 18, 2021, 21 pages.

"Notice of Allowance", U.S. Appl. No. 16/928,932, Mar. 22, 2022, 9 pages.

Nesbit, et al., "AC/DC: An Adaptive Data Cache Prefetcher", Jan. 2004, 11 pages.

Shi, et al., "Dynamic Page Size Adjustment in Operating System", IEEE; 2016 International Conference on Information System and Artificial Intelligence, Jun. 2016, 5 pages.

"Final Office Action", U.S. Appl. No. 16/901,890, Feb. 24, 2023, 29 pages.

"Notice of Allowance", U.S. Appl. No. 17/657,922, Feb. 23, 2023, 5 pages.

"Non-Final Office Action", U.S. Appl. No. 17/820,531, Jan. 2, 2024, 14 pages.

"Extended European Search Report", EP Application No. 21808234. 5, May 22, 2024, 7 pages.

"Non-Final Office Action", U.S. Appl. No. 18/057,628, Jun. 7, 2024, 18 pages.

"Final Office Action", U.S. Appl. No. 17/820,531, Sep. 20, 2024, 18 pages.

"Foreign Office Action", CN Application No. 202110838429.8, Aug. 9, 2024, 8 pages.

"Final Office Action", U.S. Appl. No. 18/057,628, Dec. 9, 2024, 22 pages.

"Foreign Office Action", CN Application No. 202110771649.3, Sep. 24, 2024, 13 pages.

(56) References Cited

OTHER PUBLICATIONS

"Non-Final Office Action", U.S. Appl. No. 18/057,628, May 6, 2025, 26 pages.
"Notice of Allowance", U.S. Appl. No. 17/820,531, Jul. 15, 2025, 9 pages.

\* cited by examiner
‡ imported from a related application

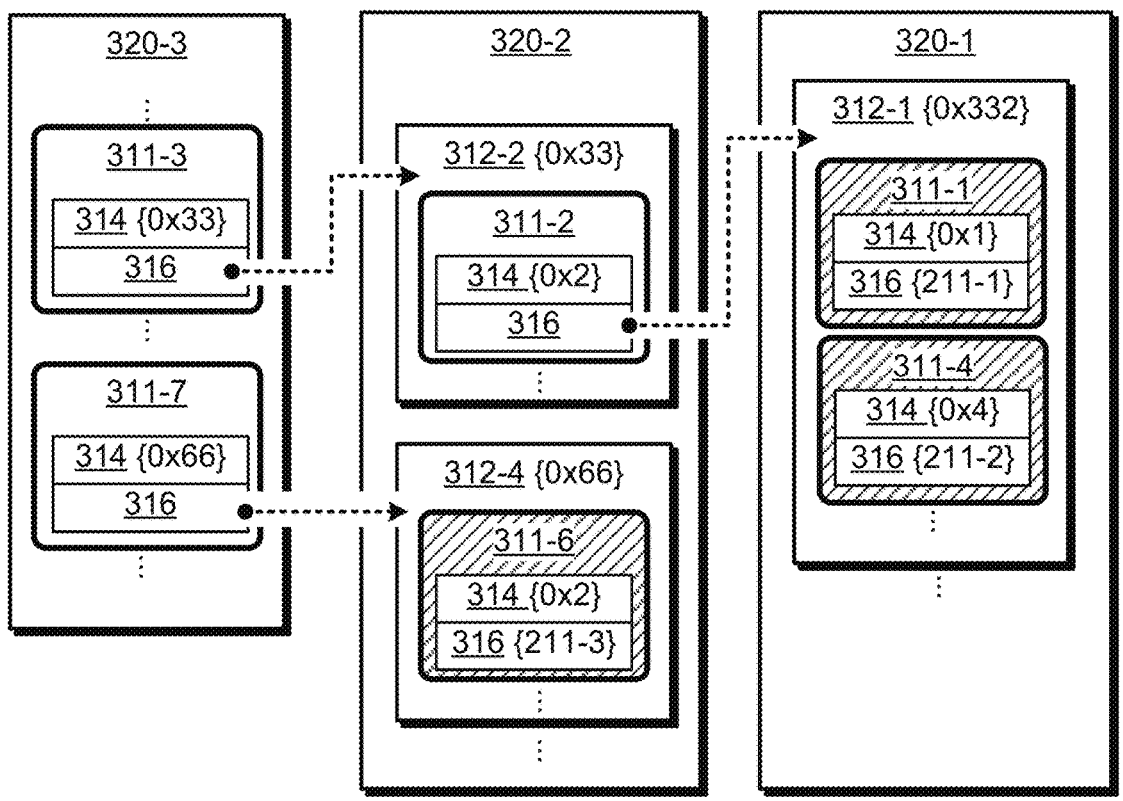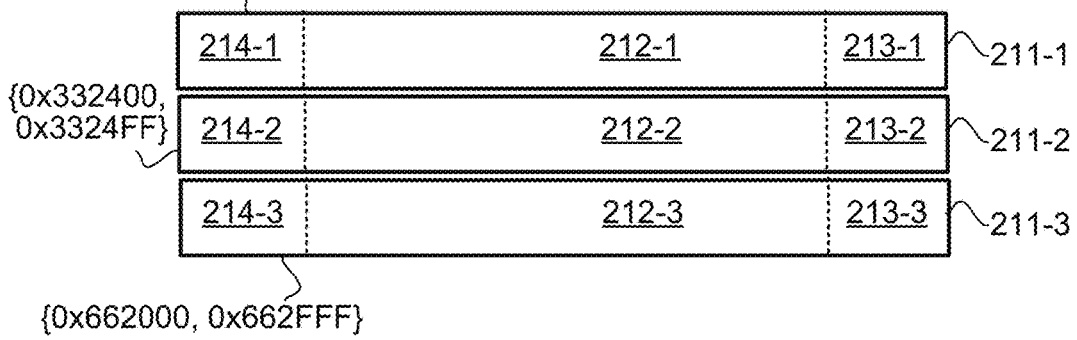
Fig. 5-5

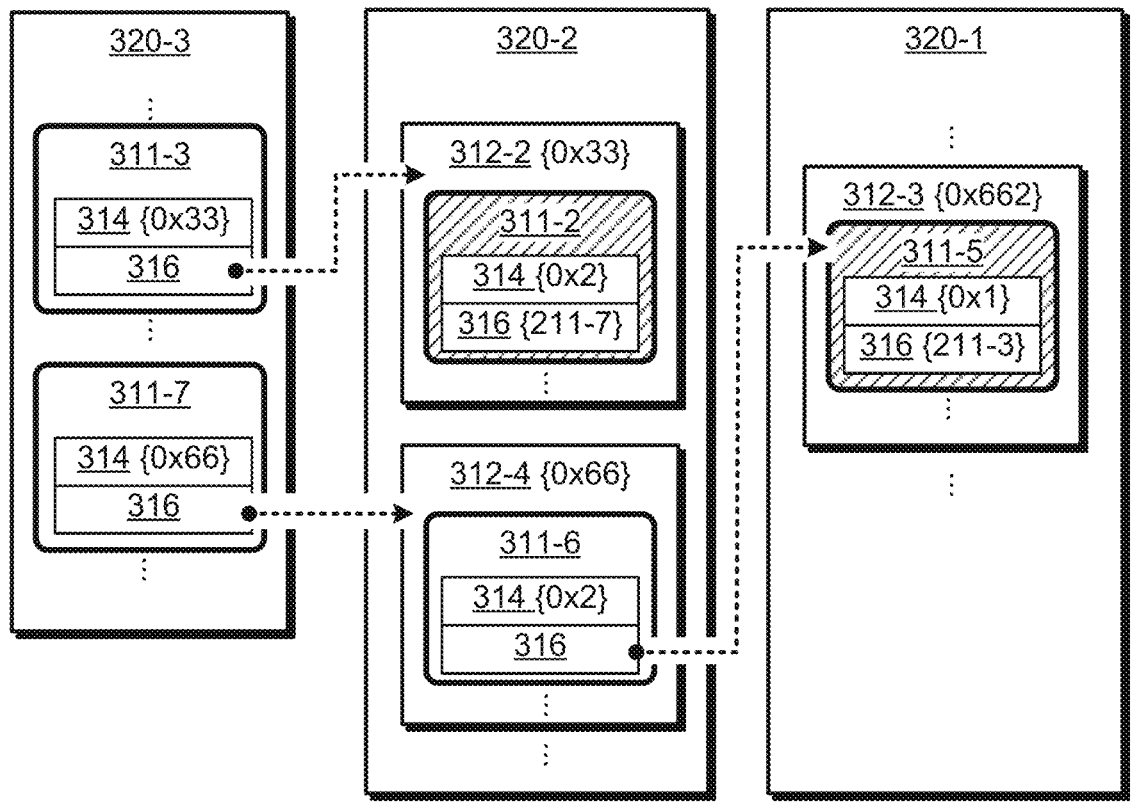
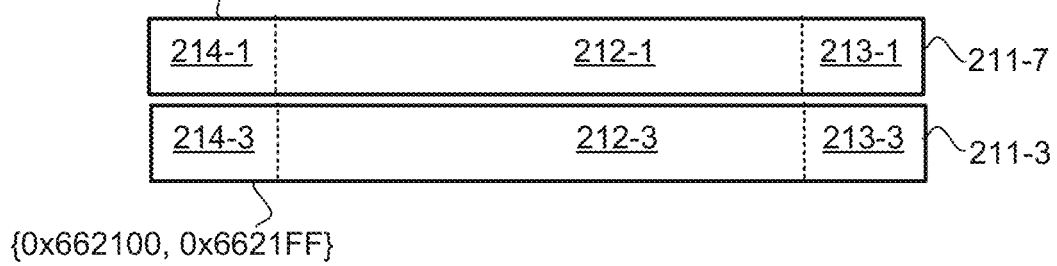
*Fig. 5-8*

900

Receive commands (and/or indications of commands) pertaining to addresses of a memory address space
902

Store access metadata within a dataset comprising one or more entries responsive to the commands, each entry of the dataset covering an address range of the memory address space and comprising access metadata pertaining to addresses within the covered address range
904

Adjust a size of the address range covered by at least one of the entries of the dataset based, at least in part, on one or more metrics indicative of prefetch performance within address ranges covered by one or more entries of the dataset
906

Represent address ranges of a memory address space by nodes within respective levels of a data structure, each level of the data structure corresponding to one of a plurality of address range sizes
1002

↓

Maintain access metadata within entries of a dataset, each entry of the dataset associated with a respective node of the data structure and covering an address range represented by the associated node
1004

↓

Modify the data structure based, at least in part, on prefetch utility metrics of address ranges represented by one or more nodes of the data structure
1006

↓

Update address ranges covered by at least one of the entries of the dataset responsive to modifying the data structure
1008

Configure a first memory to store access metadata within entries of a dataset, each entry to cover a specified address range
1502

Update access metadata of respective entries of the dataset in response to events pertaining to addresses covered by address ranges of the respective entries
1504

Maintain a data structure within a second memory, the data structure configured to define a set of address ranges covered by entries of the dataset maintained within the first memory, each entry of the dataset associated with a respective node of the data structure that defines the address range covered by the entry within the access dataset
1506

Modify the set of address ranges covered by the access metadata of the dataset maintained within the first memory based, at least in part, on utility metrics of respective entries of the dataset
1508

*Fig. 15*

ADAPTIVE ADDRESS TRACKING

RELATED APPLICATION

This application is a continuation of, and claims priority to, U.S. Utility patent application Ser. No. 16/928,932, filed on Jul. 14, 2020, which is incorporated herein by reference in its entirety.

BACKGROUND

To operate efficiently, some computing systems include a hierarchical memory system, which may include multiple levels of memory. Here, efficient operation implies cost efficiency and speed efficiency. Faster memories are typically more expensive than relatively slower memories, so designers attempt to balance their relative costs and benefits. One approach is to use a smaller amount of faster memory with a larger amount of slower memory. The faster memory is deployed at a higher level in the hierarchical memory system than the slower memory such that the faster memory is preferably accessed first. An example of a relatively faster memory is called a cache memory. An example of a relatively slower memory is a backing memory, which can include primary memory, main memory, backing storage, or the like.

A cache memory can accelerate data operations by storing and retrieving data of the backing memory using, for example, high-performance memory cells. The high-performance memory cells enable the cache memory to respond to memory requests more quickly than the backing memory. Thus, a cache memory can enable faster responses from a memory system based on desired data being present in the cache. One approach to increasing a likelihood that desired data is present in the cache is prefetching data before the data is requested. To do so, a prefetching system attempts to predict what data will be requested by a processor and then loads this predicted data into the cache. Although a prefetching system can make a cache memory more likely to accelerate memory access operations, data prefetching can introduce operational complexity that engineers and other computer designers strive to overcome.

BRIEF DESCRIPTION OF THE DRAWINGS

The details of one or more aspects of adaptive address tracking are described in this document with reference to the following drawings. The same numbers are used throughout the drawings to reference like features and components:

FIG. 1-2 illustrates further examples of apparatuses that can implement adaptive address tracking.

FIG. 2 illustrates an example apparatus for implementing adaptive address tracking.

FIG. 5-1 illustrates further examples of apparatuses and data structures for implementing adaptive address tracking.

FIGS. 5-2 through 5-9 illustrate example techniques for managing address ranges in various adaptive address tracking implementations.

FIG. 6 illustrates another example apparatus that can implement adaptive address tracking.

FIG. 7 illustrates another example apparatus that can implement adaptive address tracking.

FIG. 8 illustrates an example cache memory that can implement adaptive address tracking.

FIGS. 9 and 10 illustrate example flowcharts depicting operations for adaptive address tracking.

FIGS. 12-1 and 12-2 illustrate example flowcharts depicting operations for reducing address range sizes covered within access metadata by an adaptive tracking engine.

FIGS. 13-1 and 13-2 illustrate example flowcharts depicting operations for increasing address range sizes covered within access metadata by an adaptive tracking engine.

FIG. 15 illustrates an example flowchart depicting operations for adaptive address tracking.

DETAILED DESCRIPTION

Overview

Figure 1:
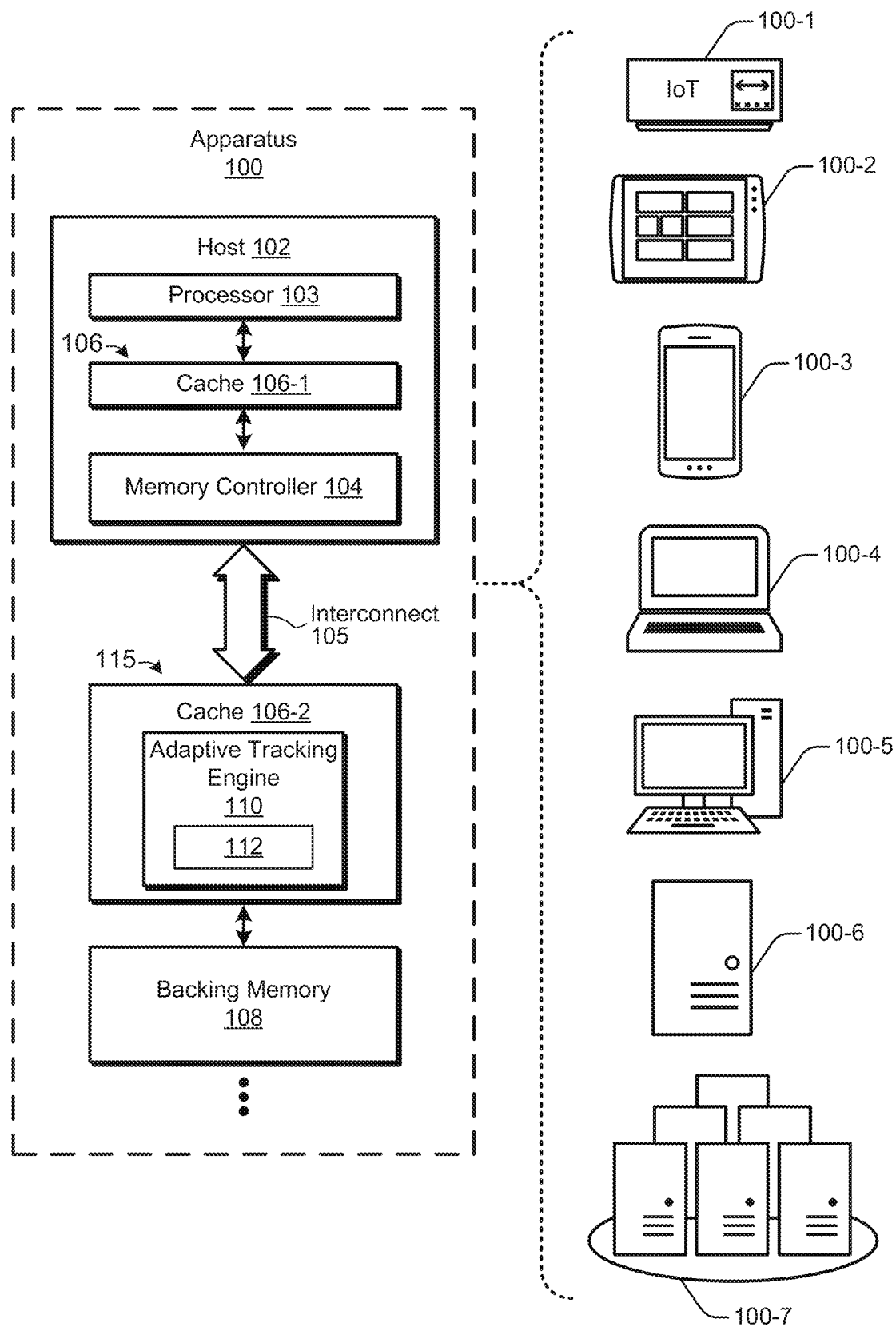
FIG. 1-1 illustrates example apparatuses that can implement adaptive address tracking.

Advances in semiconductor process technology and microarchitecture have led to significant reductions in processor cycle times and increased processor density. Meanwhile, advances in memory technology have led to increasing memory density, but relatively minor reductions in memory access times. Consequently, memory latencies measured in processor clock cycles are continually increasing. Cache memory, however, can help to bridge the processor-memory latency gap. Cache memory, which can store data of a backing memory, may be capable of servicing requests much more quickly than the backing memory. In some aspects, cache memory can be deployed "above" or "in front of" a backing memory in a memory hierarchy so that the cache memory is preferably accessed before accessing the slower backing memory.

Due to, inter alia, cost considerations, the cache memory may have a lower capacity than the backing memory. The cache memory may, therefore, load a selected subset of the address space of the backing memory. Data can be selectively admitted and/or evicted from the cache memory in accordance with suitable criteria, such as cache admission policies, eviction policies, replacement policies, and/or the like.

During operations, data can be loaded into the cache in response to "cache misses." A cache miss refers to a request pertaining to an address that has not been loaded into the cache and/or is not included in the working set. Cache misses can significantly degrade performance. Servicing a cache miss may involve fetching data from the backing memory. By contrast, servicing requests that result in "cache hits" may involve accessing the relatively higher-performance cache memory without incurring latencies for accessing the relatively lower-performance backing memory.

Cache performance can be enhanced through prefetching. Prefetching involves loading addresses of the backing memory into the working set of the cache before the addresses are requested. A prefetcher can predict addresses of upcoming requests based on, inter alia, addresses of previous requests. The predicted addresses can be loaded into the cache in background operations so that, when requests pertaining to the predicted addresses are subsequently received, the requests can be serviced from the cache memory as opposed to causing a cache miss. In other words, a request pertaining to a prefetched address may be serviced using the relatively higher-performance cache memory without incurring the latency of the relatively lower-performance backing memory. In some aspects, prefetching can be implemented by use of idle resources. For example, prefetching can be terminated or paused when resources are needed to service incoming requests and can be restarted or resumed when resources become available.

The benefits of prefetching, or "prefetch utility," can be quantified in terms of "useful prefetches" or a ratio of useful prefetches to "bad" prefetches. As used herein, a "useful" or "accurate" prefetch refers to a prefetch for address(es) that result in subsequent cache hit(s). Useful or accurate prefetches may be a result of useful or accurate address predictions by the prefetcher. By contrast, a "bad" prefetch refers to a prefetch for address(es) that are not accessed before being evicted from the cache memory (e.g., do not result in subsequent cache hit(s)). Bad prefetches can adversely impact performance. Bad prefetches can occupy limited cache memory resources with addresses that not subsequently requested, and which otherwise could have been used to cache other, more frequently accessed data. Inaccurate address predictions can, therefore, result in increased cache miss rate, cause thrashing, increase bandwidth consumption to/from the backing memory, and so on.

Some prefetchers try to avoid these problems by attempting to detect patterns in which memory are accessed and then prefetching data in accordance with the detected patterns. Access patterns, however, can vary from region to region of the address space. The access pattern(s) in which memory are accessed within a particular address range may depend on a number of factors, including, but not limited to: the program utilizing the address region, the state of the program, the processing task(s) being performed by the program, the execution phase of the program, the type of data structure(s) being accessed by the program within the region, and/or the like. Since access patterns can vary from region to region of the address space, access pattern(s) that produce accurate prefetches within one region of the address space may result in inaccurate address predictions within other regions. By way of non-limiting example, the program running within one region of the address space may access memory according to a first pattern in which addresses of consecutive requests are offset by a first delta $\Delta_1$. The program running within another region of the address space may access addresses according to a different, second pattern in which consecutive requests are separated by a different, second delta $\Delta_2$. Although the first pattern may be capable of producing useful prefetches within the first region, the first pattern will likely produce poor results if used in the second region (and vice versa) because addresses in the second region are offset by $\Delta_2$ rather than $\Delta_1$.

Prefetching performance can be improved by tracking access metadata within individual regions of the address space. The access metadata can include information regarding memory accesses within respective regions, such as a sequence of previously requested addresses, address offsets, how many accesses have occurred within a given timespan, and/or the like, which can be used to determine access patterns within the respective regions. These access patterns can be used to prefetch data that is likely to be requested in the near future. The regions may be intended to cover suitably sized address ranges in which patterns are consistent. For example, the regions can attempt to cover the address range in which a program accesses particular types of data structures. Tracking access metadata in this manner may yield access patterns specific to individual regions, which may then be used to determine accurate address predictions within the individual regions.

The number of regions in which access metadata are tracked, and the mechanisms by which fixed sizes of the regions are determined, can be limited due to resource considerations. Examples of such resource considerations include the availability of hardware resources, memory consumption, storage consumption, computational complexity, and/or the like. Moreover, address spaces of modern computing systems can be very large, which can exacerbate resource consumption issues. Memory management systems of many modern computing systems utilize 64-bit, or even larger, virtual address spaces. In order to manage resource consumption, access metadata may be tracked within fixed-size regions or "concentration zones" spanning at least parts of the address space. The fixed size of the regions can be selected by online trial and error, testing and experience, or the like because other, more computationally intensive region-sizing techniques, can be impractical to perform in real-time and can incur unacceptable overhead. The fixed size of the tracking regions is often set to be as large as possible while still yielding acceptable prefetcher performance in order to manage resource consumption.

Although techniques that utilize fixed-sized regions can impose relatively low overhead, these techniques can often lead to suboptimal or even poor results since prefetcher performance can be highly sensitive to address range size. More specifically, good prefetcher performance may rely on access metadata covering suitably sized address ranges. The fixed-size tracking regions should be sized to accurately capture access patterns of memory workloads. For example, in order to accurately capture stride access patterns within a region, the fixed size of the tracking region should roughly match the size of the data structures being accessed in the region. Fixed-sized regions that are too large can overlap workloads with different access patterns. In contrast, fixed-sized regions that are too small can fail to capture the full extent of the patterns produced under other workloads, making it difficult, or even impossible, to extract accurate, consistent access patterns.

Moreover, workload characteristics, such as data structure size, can vary from program to program and hence from region to region, meaning that a fixed range size suitable for use in some portions of the address space may not be suitable for use in other portions (and vice versa). More specifically, a fixed range size capable of accurately capturing access patterns produced by some programs may be incapable of accurately capturing access patterns produced by other programs. Furthermore, workload characteristics of a program can vary over time based on program state, such as execution phase, processing task, dataset, and so on. Although it may be possible to select a fixed range size capable of capturing access patterns of some programs during certain execution phases, the selected fixed range size may not be capable of accurately capturing access patterns during other execution phases, much less access patterns produced by other programs. Therefore, fixed-sized regions are unlikely to enable optimal prefetcher performance and may even result in performance degradation. Additionally, since access metadata is often tracked at and/or within performance-sensitive components, such as memory I/O paths, the overhead typically involved in managing dynamically sized address regions can lead designers away from alternatives to fixed-size techniques.

To address these and other issues, this document describes adaptive address tracking techniques capable of tracking access metadata within dynamically sized address regions. The size of the address regions in which access metadata is tracked can be tuned to provide improved prefetcher performance with reduced overhead. In some aspects, access metadata pertaining to an address space is maintained within a set of adaptive tracking regions, each respective region being configured to cover a respective address range of the address space. Sizes of the address ranges covered by the access metadata can vary from region to region. Access metadata can be tracked in a set of entries, with each entry covering a designated address range. The address ranges (and range sizes) of respective entries can be adapted based on prefetcher performance within respective address regions. The range sizes can be dynamically adjusted while ensuring that the address ranges covered by the access metadata are distinct (e.g., do not overlap). Capturing access metadata within adaptively sized regions may enable improved prefetching precision while limiting resource consumption. The access metadata that is maintained may be "sparse" and only cover address ranges that benefit from prefetching and are active (e.g., are in use).

The described adaptive address tracking techniques may further include managing the address ranges covered by the access metadata using a range management data structure. The data structure can manage a set of dynamically sized access metadata entries, which can be stored as part of a dataset, such that the address ranges covered by the set are distinct. As used herein, "distinct" access metadata entries refer to a set of entries that cover distinct, non-overlapping address ranges. The data structure can be implemented using, for instance, a tree having multiple nodes. The data structure may be used to configure and dynamically adjust address ranges through low-complexity operations that comply with distinctiveness constraints (e.g., constraints that cause address ranges covered by respective access metadata entries to be distinct). The address ranges can be adapted based on feedback, such as feedback pertaining to prefetch performance within respective address ranges covered by the access metadata. The address ranges can be tuned to improve prefetch performance, reduce overhead, or the like. Example implementation scenarios, some of which are described next, relate to cache memory, correlation-based prefetching, machine-learning-based prefetching, combinations thereof, and so forth.

The disclosed adaptive address tracking techniques can improve cache performance. Consider, for example, stride prefetch techniques in which access metadata captured within respective address ranges are utilized to extract "stride patterns" in which addresses of consecutive requests are separated by a constant offset quantity (a stride S). The stride patterns may be extracted from access history metadata (e.g., addresses of the N most recent requests within respective address ranges). For example, the access metadata covering a first region of the address space may yield a stride pattern in which consecutive requests are separated by a first stride quantity $S_1$. In response to a cache miss at address a within the first region, addresses a, a+$S_1$, a+2$S_1$ . . . through a+d$S_1$ can be prefetched into the cache memory, where a is the cache miss address and d is the prefetch degree. Since stride patterns can differ significantly from region to region, the stride prefetcher can use access metadata covering individual regions to detect unit stride patterns within each individual region. As disclosed herein, however, accurate detection of stride patterns may rely on access metadata covering suitably sized address regions, which may depend on the size of the data structures accessed by the program operating within each region. Suitable address range sizes may, therefore, vary significantly from region to region. Accordingly, access metadata tracked within fixed-sized regions may be incapable of accurately modeling stride patterns across different regions of the address space. The adaptive address tracking techniques disclosed herein, however, can adapt the size and/or extent of the address regions in which access metadata are tracked, thereby improving the accuracy of stride pattern detection and, in turn, the utility of stride prefetch operations.

In other examples, the adaptive address tracking techniques disclosed herein can improve other prefetch mechanisms, such as correlation prefetchers. Correlation prefetchers attempt to learn patterns that may repeat but are not as consistent as a simple stride or delta address patterns. Correlation prefetch techniques may be capable of detecting recurring delta sequences within address sequences captured in respective regions of the address space. A correlation prefetch for a delta sequence that includes two elements ($\Delta_1$, $\Delta_2$) may include prefetching addresses a+$\Delta_1$, a+$\Delta_1$+$\Delta_2$, a+2$\Delta_1$+$\Delta_2$, a+2$\Delta_1$+2$\Delta_2$, and so on (depending on the degree of the correlation prefetch operation), where a is the address at which the cache miss that triggered the correlation prefetch occurred. Since correlation prefetch techniques attempt to extract more complex patterns from access metadata, these techniques can be even more sensitive to address range size. The use of fixed-sized tracking regions in correlation prefetching may, therefore, yield poor performance due to mismatches between suitable address range size within respective regions and the fixed range size. The adaptive address tracking techniques disclosed herein, however, may be capable of adjusting address range sizes to accurately capture correlation and/or delta sequence patterns within different regions of the address space.

The disclosed adaptive address tracking techniques can also improve the performance of machine learning and/or machine-learned (ML) prefetch implementations, such as classification-based prefetchers, artificial neural network (NN) prefetchers, Recurrent NN (RNN) prefetchers, Long Short-Term Memory (LSTM) prefetchers, and/or the like. For example, an LSTM prefetcher may be trained to model the "local context" of memory accesses within an address space (with each "local context" corresponding to a respective address range of the address space). These types of ML prefetch techniques may attempt to leverage local context since, as disclosed herein, data structures accessed by programs running within respective local contexts tend to be stored in contiguous blocks that are accessed repeatedly (or in regular patterns). An ML prefetcher can be trained to develop and/or refine ML models within respective local contexts and can use the ML models to implement prefetch operations. Local context, however, can vary significantly across the address space due to differences in workload produced by programs operating within various portions of the address space. For example, the local context in which a program repeatedly accesses a first type of data structure may vary significantly from local contexts of other regions of the address space in which other programs may access other types of data structures according to different access patterns. Therefore, an ML model trained to learn the local context within one region of the address space (and/or produced by one program) may not be capable of accurately modeling the local context within other regions of the address space (and/or produced by other programs).

Furthermore, ML models may rely on access metadata covering suitably sized address ranges. The address range of the access metadata used to develop, train, or apply an ML model of a particular local context should be sized according to the size, range, region, or extent covered by the particular local context. More specifically, the size of the address range should be sufficient to cover the particular local context without overlapping with other local contexts. Like range size, suitable local context size can vary significantly based on the programs associated with the local contexts, the state of the programs, execution phase, data structures being accessed within the local contexts, and so on. Therefore, access metadata tracked within fixed-sized address ranges may not be suitable for use with ML techniques, much less ML techniques that attempt to model access patterns within variably sized local contexts. The disclosed adaptive address tracking techniques, however, may be used to capture, maintain, and/or otherwise manage access metadata that covers address ranges corresponding to differently sized local contexts. More specifically, sizes of the address ranges covered by respective access metadata entries can be adapted to cover respective local contexts modeled by an ML prefetcher.

Thus, described techniques for adaptive address tracking can be used with caches and other hierarchical memory systems, with different types of prefetching, with implementations that combine prefetching and cache memories, and so forth. To do so, a memory address space of a memory system is separated into multiple addresses ranges. An adaptive tracking engine produces a dataset that includes one or more entries, each entry covering an address range of the address space and including access metadata for the covered address range. Examples of access metadata include information pertaining to memory accesses within a covered address range, access statistics, access pattern statistics, access history, access sequences, access frequency metadata, access time metadata, access pattern metadata, stride patterns, correlation patterns, delta sequences, access modeling metadata, ML modeling metadata, ML feature data, and/or the like.

In operation, the adaptive tracking engine can adjust the set of address ranges covered by the access metadata, which may include adjusting the size of the address range covered by one or more entries of the dataset. To facilitate adjustment of address range sizes, the adaptive tracking engine can maintain a data structure. The data structure can be realized, for instance, using at least one tree or multi-level map data structure having multiple nodes. The data structure can include multiple nodal levels, with each level corresponding to a particular address range size. Nodes of relatively lower levels of the tree can correspond to relatively smaller address ranges than do nodes of relatively higher levels of the tree. Each leaf node, or node at the end of a tree branch, can link or point to an associated entry of the dataset. Thus, there can be a correspondence between the nodal level of a given node of the tree and an address range size indicated by the associated entry to which the given node points. The data structure can encode parent-child relationships between nodes, which may correspond to containment relationships between address ranges represented by the nodes. In some implementations, each child node of a parent node represents a respective subset of the address range represented by the parent node.

To adjust address range sizes, efficient data structure operations can manipulate nodes of the tree. For example, an operation may move a given node to a different nodal level corresponding to a different address range size. Such data structure operations include splitting nodes, merging nodes, and so forth. A node within an upper-level of the data structure may be split into a plurality of lower-level nodes, each lower-level node covering a respective subset of the address space covered by the upper-level node. A group of one or more nodes within a lower-level of the data structure may be merged into an upper-level node, the upper-level node covering an address range that is larger than, and encompasses, the address ranges covered by the group of lower-level nodes. Analogous operations are performed on the associated entry or entries of the dataset to maintain consistency between the nodes of the data structure and the entries of the dataset. In some cases, the entries of the dataset may be stored with the nodes of the data structure. In these manners, the described techniques for adaptive address tracking facilitate the tracking of metadata about address requests at variable granularities using efficient storage and operational mechanisms. The memory address range granularity can be adaptively changed during operation to accommodate or account for different programs, different program states, various data structures or data structure types, disparate prefetching strategies (e.g., correlation or ML-based), and so forth.

Example Operating Environment

FIG. 1-1 illustrates an example apparatus 100 that can implement adaptive address tracking. The apparatus 100 can be realized as, for example, at least one electronic device. Example electronic-device implementations include an internet-of-things (IoTs) device 100-1, a tablet device 100-2, a smartphone 100-3, a notebook computer 100-4, a desktop computer 100-5, a server computer 100-6, a server cluster 100-7, and/or the like. Other apparatus examples include a wearable device, such as a smartwatch or intelligent glasses; an entertainment device, such as a set-top box or a smart television; a motherboard or server blade; a consumer appliance; vehicles; industrial equipment; and so forth. Each type of electronic device includes one or more components to provide some computing functionality or feature.

In example implementations, the apparatus 100 includes at least one host 102, at least one processor 103, at least one memory controller 104, and at least one cache memory 106. The apparatus 100 can also include at least one interconnect 105, and at least one backing memory 108. The backing memory 108 may represent main memory, system memory, backing storage, a combination thereof, and so forth. The backing memory 108 may be realized with any suitable memory facility including, but not limited to: a memory array, semiconductor memory, random-access memory (RAM), a Dynamic RAM (DRAM) device or module, a Static RAM (SRAM) device or module, a three-dimensional (3D) stacked DRAM device or module, Double Data Rate (DDR) memory, a Synchronous DRAM (SDRAM) device or module, a high bandwidth memory (HBM) device or module, a hybrid memory cube (HMC), and/or the like. Alternatively, or in addition, the backing memory 108 may be realized with a device or module including storage-class memory, such as a solid-state memory, Flash memory, 3D XPoint™ memory, phase-change memory (PCM), and/or the like. Other examples of the backing memory 108 are described herein. In some aspects, the host 102 can further include and/or be coupled to non-transitory storage, which may be realized with a device or module including any suitable non-transitory, persistent, solid-state, and/or non-volatile memory.

As shown, the host 102, or host device 102, can include the processor 103 and/or memory controller 104. The processor 103 can be coupled to the cache memory 106-1 and the cache memory 106-1 can be coupled to the memory controller 104. The processor 103 can also be coupled, directly or indirectly, to the memory controller 104. The host 102 can be coupled to the cache memory 106-2 through the interconnect 105. The cache memory 106-2 can be coupled to the backing memory 108.

The depicted components of the apparatus 100 represent an example computing architecture with a memory hierarchy (or hierarchical memory system). For example, the cache memory 106-1 can be logically coupled between the processor 103 and the cache memory 106-2. Further, the cache memory 106-2 can be logically coupled between the processor 103 and the backing memory 108. In the FIG. 1-1 example, the cache memory 106-1 is at a higher level of the memory hierarchy than is the cache memory 106-2. Similarly, the cache memory 106-2 is at a higher level of memory hierarchy than is the backing memory 108. The indicated interconnect 105, as well as the other interconnects that couple various components, can enable data to be transferred between or among the various components. Interconnect examples include a bus, a switching fabric, one or more wires that carry voltage or current signals, and/or the like.

Although particular implementations of the apparatus 100 are depicted in FIG. 1-1 and described herein, an apparatus 100 can be implemented in alternative manners. For example, the host 102 may include additional cache memories, including multiple levels of cache memory (e.g., multiple cache layers). In some implementations, the processor 103 may include one or more internal memory and/or cache layers, such as instruction registers, data registers, an L1 cache, an L2 cache, an L3 cache, and/or the like. Further, at least one other cache memory and backing memory pair may be coupled "below" the illustrated cache memory 106-2 and backing memory 108. The cache memory 106-2 and the backing memory 108 may be realized in various manners. In some cases, the cache memory 106-2 and the backing memory 108 are both disposed on, or physically supported by, a motherboard with the backing memory 108 comprising "main memory." In other cases, the cache memory 106-2 includes and/or is realized by DRAM and the backing memory 108 includes and/or is realized by a non-transitory memory device or module. Nonetheless, the components may be implemented in alternative ways, including in distributed or shared memory systems. Further, a given apparatus 100 may include more, fewer, or different components.

The cache memory 106-2 can be configured to accelerate memory I/O by, inter alia, storing addresses of the backing memory 108 within the relatively higher-performance cache memory 106-2. In the FIG. 1-1 example, the cache memory 106-2 can include and/or be coupled to an adaptive tracking engine 110, which may be configured to capture, maintain, track and/or otherwise manage metadata pertaining to accesses within respective address ranges of an address space (access metadata 112). The access metadata 112 can include information pertaining to any suitable address space, including, but not limited to: a memory address space, a storage address space, a host address space, an input/output (I/O) address space, a storage address space, an address space of the backing memory 108, a main memory address space, a virtual memory address space, an address space managed by, inter alia, the processor 103, memory controller 104, memory management unit (MMU), and/or the like.

The adaptive tracking engine 110 captures access metadata 112 pertaining to respective regions and/or address ranges of the address space. The adaptive tracking engine 110 can be further configured to adapt the regions and/or address ranges based on feedback from a consumer 115 of the access metadata 112. As used herein, a consumer 115 refers to any component, element, module and/or process that is configured to and/or capable of utilizing and/or otherwise consuming access metadata 112 maintained by the adaptive tracking engine 110 including, but not limited to: the processor 103, the memory controller 104, a MMU, a cache layer, a cache memory 106 (e.g., cache memory 106-1 and 106-2), cache control logic, cache prefetch logic, prefetch logic, a prefetcher, a scheduler, an I/O scheduler, and/or the like.

In FIG. 1-1, the cache memory 106-2 is a consumer 115 of the access metadata 112 and may utilize the access metadata 112 to prefetch addresses of the backing memory 108. The adaptive tracking engine 110 can receive feedback pertaining to prefetch performance within respective regions covered by the access metadata 112 and can adjust the address ranges covered by the access metadata 112 for improved precision, resulting in more accurate address predictions with limited resource overhead. The adaptive tracking engine 110 may, therefore, improve memory I/O performance by, inter alia, enabling the cache memory 106-2 to improve prefetch performance, resulting in a lower cache miss rate.

Although in the FIG. 1-1 example, the adaptive tracking engine 110 is illustrated as a component of the cache memory 106-2, the disclosure is not limited in this regard. In other examples, the adaptive tracking engine 110 could be coupled to any suitable consumer 115 through any suitable interconnection. In the example illustrated in FIG. 1-2, the adaptive tracking engine 110 is coupled to the interconnect 105 for the host 102 and is configured to capture access metadata 112 by, inter alia, monitoring traffic on the interconnect 105 and/or interconnect(s) of the memory hierarchy including, but not limited to interconnects coupling the processor 103 to the cache memory 106-1, the cache memory 106-1 to the memory controller 104, the cache memory 106-2 to the backing memory 108, and/or the like. The adaptive tracking engine 110 can provide access metadata 112 (and/or portions thereof) to one or more consumers 115 through the interconnect 105 or other interconnection(s).

Example Schemes and Apparatuses for Adaptive Address Tracking

Figures 1, 2:
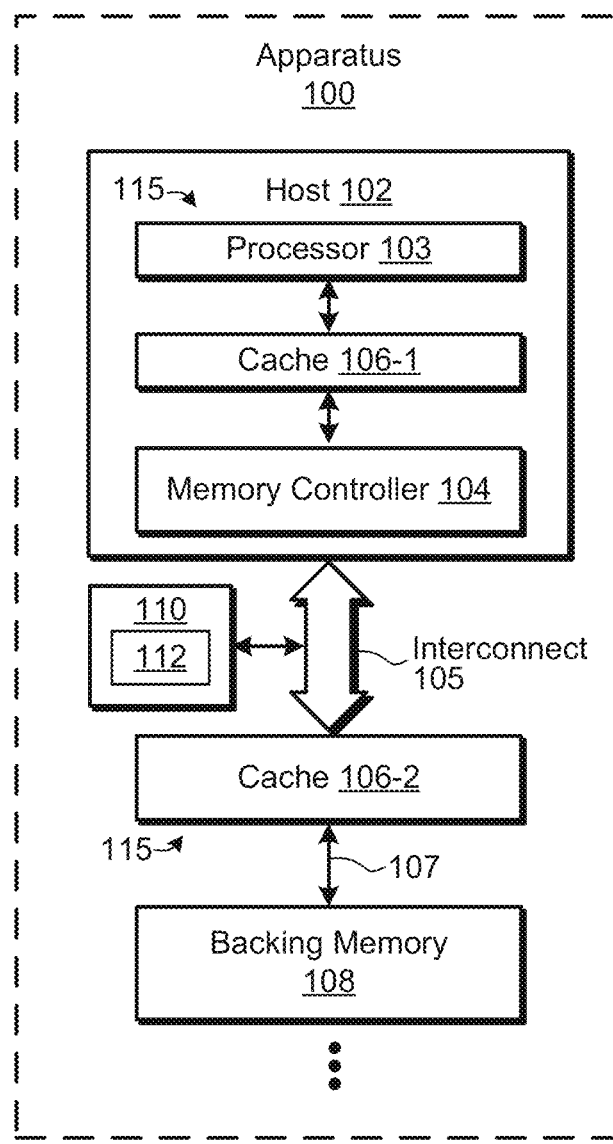
Figure 2:
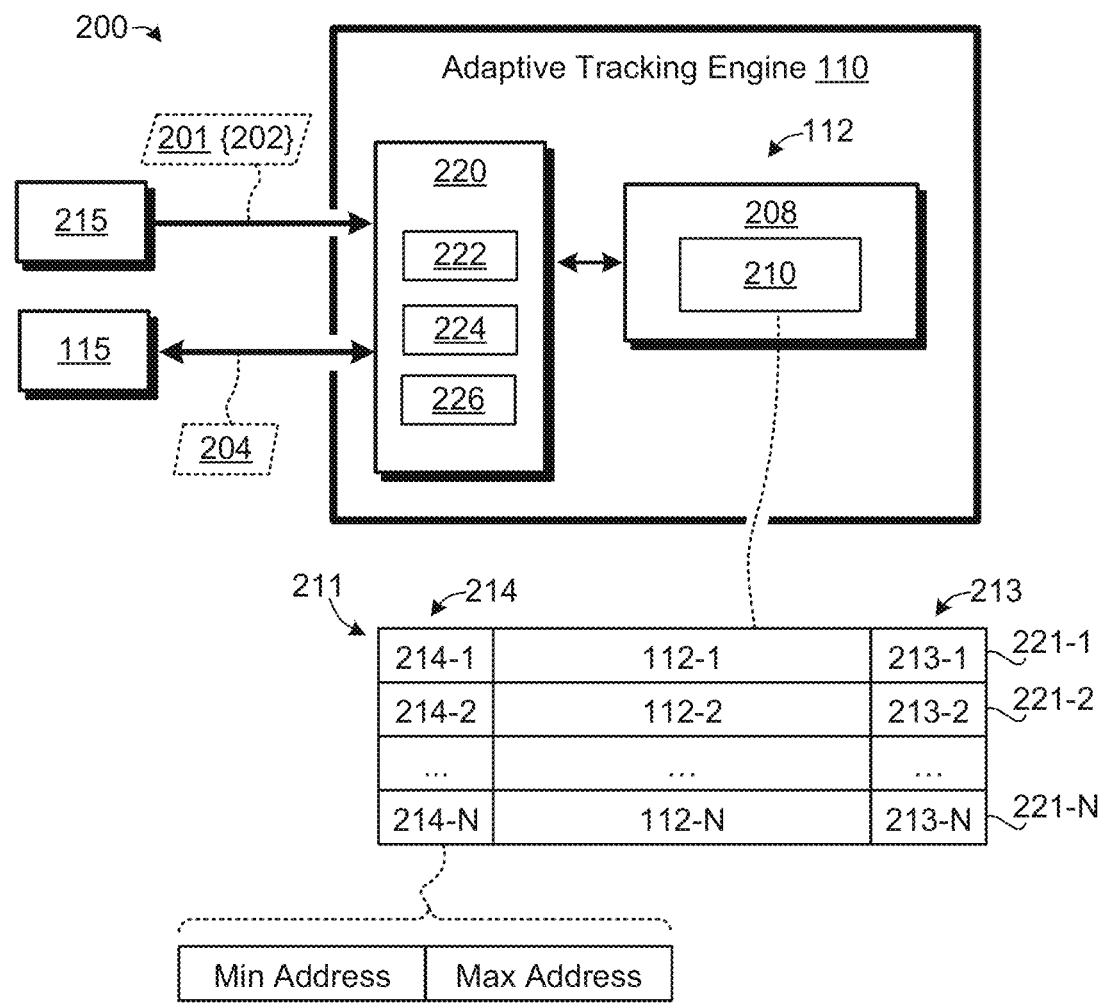

FIG. 2 illustrates an example apparatus 200 implementing an adaptive tracking engine 110. The adaptive tracking engine 110 is configured to capture, maintain, and/or otherwise manage access metadata 112 that covers a plurality of regions and/or address ranges of an address space. In the FIG. 2 example, the access metadata 112 includes and/or is maintained within an access dataset 210 (or dataset 210). The access dataset 210 includes a set of one or more access metadata entries 211 (or entries 211), each entry 211 defined to cover a respective address range and comprising access metadata 112 pertaining to the covered address range. The dataset 210 can include any number of entries 211. In the FIG. 2 example, the dataset 210 includes N entries 211-1 through 211-N. The access dataset 210 can be implemented, stored, and/or embodied within any suitable memory and/or storage resources. In the FIG. 2 example, the access dataset 210 is maintained within a memory 208. The memory 208 may be configured as an access dataset 210 and/or as access metadata 112 memory. The memory 208 may be realized by semiconductor integrated circuitry, a memory array, a memory bank, a memory chip, memory cells, DRAM, SRAM, SDRAM, on-board memory resources of the adaptive tracking engine 110, memory resources of a host device 102, main memory, cache memory 106, cache lines, backing memory 108, external memory resources, peripheral memory resources, and/or the like. The access dataset 210 may be implemented by use of any suitable type of structured data including, but not limited to: a table, a lookup table, a mapping table, an array, a list, a tree, a prefix tree, a trie, a radix tree, and/or the like.

As illustrated in FIG. 2, the entries 211 of the access dataset 210 include access metadata 112 pertaining to specified address ranges. The access metadata entries 211 may, therefore, be configured as range entries 211, tracking entries 211, range tracking entries 211, access metadata tracking entries 211, and/or the like. An entry 211 may include any suitable information pertaining to the access metadata 112, including, but not limited to: range metadata 214 to specify the address range covered by the entry 211, access metadata 112 pertaining to the covered address range, and so on. The range metadata 214 may define covered address ranges using any suitable information including, but not limited to: address bounds, minimum and maximum address bounds, address tags, address tag bounds, minimum and maximum address tags, a base address and length, one or more tuples, and/or the like. The address range covered by an entry 211 may, therefore, be specified, defined, modified, and/or manipulated by, inter alia, writing one or more bits to the memory 208 (e.g., writing one or more bits to the range metadata 214 of the entry 211 maintained within the memory 208).

The access metadata 112 of an entry 211 may include any information pertaining to the address range covered by the entry 211, which may include, but is not limited to: information pertaining to accesses within the covered address range, access statistics, access pattern statistics, access history, access sequences, access frequency metadata, access time metadata, access pattern metadata, stride patterns, correlation patterns, delta sequences, access modeling metadata, ML modeling metadata, ML feature data, and/or the like.

In some examples, the adaptive tracking engine 110 includes and/or is coupled to logic 220. The logic 220 may be configured to implement functionality of the adaptive tracking engine 110, as disclosed herein. In the FIG. 2 example, the logic 220 is configured as and/or is configured to implement interface logic (an interface 222), update logic 224, and management logic 226. The logic 220 and/or other components disclosed herein, may be provided, implemented, and/or realized by logic elements, which may include, but are not limited to: circuitry, logic circuitry, control circuitry, interface circuitry, I/O circuitry, fuse logic, analog circuitry, digital circuitry, logic gates, registers, switches, multiplexers, arithmetic logic units (ALU), state machines, microprocessors, processor-in-memory (PIM) circuitry, and/or the like. Alternatively, or in addition, in some examples portions of the adaptive tracking engine 110, such as the logic 220, interface 222, update logic 224, management logic 226, and/or the like, may be embodied as processor-executable instructions stored on non-transitory storage media. In some examples, portions of the logic 220 and/or functionality thereof may be implemented by processing resources of a host device 102, such as the processor 103.

The interface 222 can be configured to provide the access metadata 112 (and/or portions thereof) to one or more consumers 115. The interface 222 can provide access metadata 112 to consumers 115 in response to data requests. The interface 222 can receive requests for access metadata 112 pertaining to specified addresses and, in response, can return access metadata 112 corresponding to the specified addresses in response. Alternatively, or in addition, the interface 222 can be configured to enable consumers 115 to interact with the access metadata 112. The interface 222 may provide and/or implement an Application Programming Interface (API) and/or other lower-level interface(s) through which consumers 115 retrieve the access metadata 112. The interface 222 may enable consumers 115 to issue queries pertaining to the access metadata 112, such as queries to: identify respective address ranges covered by respective entries 211 of the access metadata 112, determine address ranges and/or range sizes covered by the entries 211, retrieve access metadata 112 covered by specified entries 211, retrieve access metadata 112 covering specified addresses and/or address ranges, and/or the like.

The update logic 224 is configured to update, refine and/or determine access metadata 112 in response to, inter alia, operations pertaining to addresses 202 covered by the access metadata 112. The access metadata 112 can be updated in response to any suitable type of operation, directive, message, command, and/or indication thereof to retrieve, modify, manipulate and/or otherwise access data (generally referred to as a command 201 herein) including, but not limited to: data access requests, read requests, write requests, copy requests, clone requests, trim requests, erase requests, delete requests, cache misses, cache hits, and/or the like. In response to a command 201, the update logic 224 maps the address 202 (or address range) pertaining to the command 201 to an entry 211 that covers the address 202 and updates access metadata 112 of the entry 211 accordingly (e.g., based on the event type, characteristics of the event, event data, and/or the like). The update logic 224 may be configured to map addresses 202 to entries 211 by, inter alia, comparing the addresses 202 to range metadata 214 of the entries 211. As disclosed in further detail herein, commands 201 pertaining to addresses 202 that do not map to address ranges covered by the access metadata 112 may result in a tracking miss.

The interface 222 of the adaptive tracking engine 110 can receive commands 201 (and/or indications of commands 201) from one or more source(s) 215. As used herein, a source 215 refers to any suitable source of information pertaining to commands 201 pertaining to an address space, such as a processor 103, a memory controller 104, an MMU, an interconnect 105, a cache memory 106, a prefetcher, cache prefetch logic, and/or the like. In some aspects, the interface 222 can be configured to acquire commands 201 and/or information pertaining to commands 201 by, inter alia, monitoring traffic on interconnect(s) coupling components of a memory hierarchy of a host device 102, such as interconnects coupling a processor 103 to cache memory 106-1, the cache memory 106-1 to a memory controller 104, the memory controller 104 to cache memory 106-2, the cache memory 106-2 to a backing memory 108, and/or the like. Alternatively, or in addition, the interface 222 may receive information pertaining to commands 201 captured and/or generated by other components, such as commands 201 corresponding to cache misses generated by a cache memory 106. In some aspects, a consumer 115 may be configured as a source 215 (and vice versa). By way of non-limiting example, a cache memory 106 can be configured as both a consumer 115 and source 215 of the adaptive tracking engine 110. The adaptive tracking engine 110 can: receive commands 201 and/or indications of commands 201 pertaining to a memory address space, such as cache misses, from the cache memory 106 and provide access metadata 112 to the cache memory 106 (and/or prefetch logic thereof).

The adaptive tracking engine 110 provides access metadata 112 to consumers 115 through, inter alia, the interface 222. The consumers 115 may utilize the access metadata 112 to implement operations within respective address ranges covered by the access metadata 112 and may produce feedback 204 pertaining to the operations. The feedback 204 may be configured to quantify the utility of the access metadata 112 in the operations implemented by the consumer 115 within respective address ranges. The update logic 224 may be configured to determine, update, and/or revise utility metrics 213 of respective entries 211 of the access dataset 210 in response to feedback pertaining to access metadata 112 of the entries 211 and/or address ranges covered by the entries 211. In one example, the adaptive tracking engine 110 determines utility metrics 213 based on feedback 204 from a prefetcher configured to utilize access metadata 112 covering the respective address ranges to implement prefetch operations. The feedback 204 received from the prefetcher may quantify prefetch utility and/or performance within the covered address ranges. Alternatively, or in addition, the adaptive tracking engine 110 can determine utility metrics 213 based, at least in part, on commands 201 pertaining to addresses 202 within respective address ranges. The adaptive tracking engine 110 may be configured to estimate prefetcher performance within an address range based on a frequency and/or ratio of cache hits to cache misses detected within the address range, a quantity of cache hits to prefetched addresses, eviction of prefetched addresses, and/or the like. The utility metrics 213 determined for the access metadata 112 and/or respective entries 211 of the access dataset 210 may, therefore, quantify prefetcher performance within respective address ranges covered by the access metadata 112. The utility metrics 213 may include any information pertaining to prefetch performance and/or utility, including, but not limited to: a quantity of useful prefetches determined within respective address ranges covered by the access metadata 112, useful prefetches during respective windows, ratios of useful prefetches to bad prefetches, ratios of useful to bad prefetches during respective windows, quantities of accurate address predictions, accurate address predictions during respective windows, ratios of accurate address predictions to inaccurate predictions, ratios of accurate to inaccurate address predictions during respective windows, and/or the like.

As disclosed in further detail herein, the management logic 226 of the adaptive tracking engine 110 may be configured to adjust the address ranges covered by the access metadata 112 and/or the size of such ranges in accordance with, inter alia, utility metrics 213 of the access metadata. In some examples, the address ranges covered by access metadata entries 211 having relatively high utility metrics 213 may be expanded, whereas the address ranges covered by entries 211 having relatively low utility metrics 213 may be contracted (or removed). Access metadata entries 211 that cover adjacent address ranges and have similar utility metrics 213 may be merged, thereby lowering overhead. In some aspects, address ranges and/or range sizes covered by respective access metadata entries 211 of the dataset 210 can be tuned in accordance with an adjustment policy. The adjustment policy may define thresholds and/or other criteria to trigger modifications to the set of address ranges covered by the access metadata 112, such as modifications to increase the size of one or more address ranges, decrease the size of one or more address ranges, merge one or more address ranges, split one or more address ranges, remove one or more address ranges, and/or the like. Alternatively, or in addition, the set of address ranges covered by the access metadata 112 may be adjusted in accordance with an optimization algorithm. The optimization algorithm may be configured to determine address ranges for respective entries 211 that produce optimal utility metrics 213 at minimal cost, which may be quantified in terms of resource requirements, management overhead, and/or the like.

Figure 3:
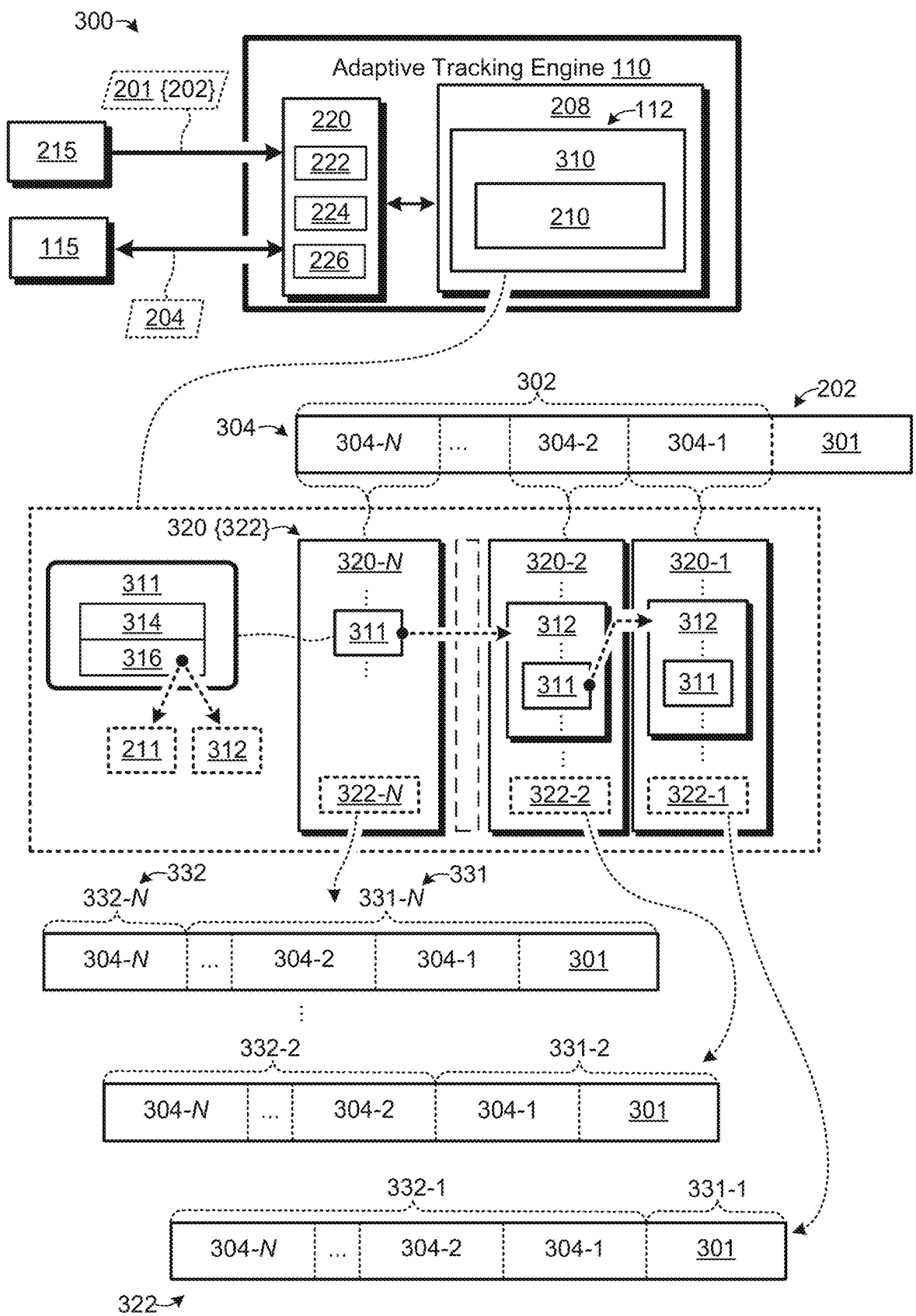
FIG. 3 illustrates examples of apparatuses and data structures for implementing adaptive address tracking.

FIG. 3 illustrates examples of apparatus 300 for implementing adaptive address tracking and/or an adaptive tracking engine 110, as disclosed herein. In the FIG. 3 example, the access dataset 210 is implemented as and/or within a range management data structure (data structure 310). The data structure 310 can define address ranges covered by the access metadata entries 211 of the dataset 210. In some aspects, the data structure 310 can implement and/or embody the access dataset 210. Alternatively, and as disclosed in further detail herein, the data structure 310 and the access dataset 210 may be maintained separately and/or within different memory resources.

The management logic 226 of the adaptive tracking engine 110 utilizes the data structure 310 to map, associate, correlate, and/or otherwise associate addresses 202 with address ranges covered by respective entries 211 of the access metadata 112. The data structure 310 can be configured to represent a sparse set of differently sized address ranges that cover a subset of an address space. The data structure 310 may enable the address ranges covered by respective access metadata entries 211 of the dataset 210 for improved precision and low overhead, while ensuring distinctiveness. The data structure 310 may include and/or be realized by any suitable type of data management structure including, but not limited to: a table, a lookup table, a mapping table, a multi-level mapping table, a tree, a trie, a prefix tree, a radix tree, and/or the like.

In some aspects, the management logic 226 configures the data structure 310 to define a plurality of address range sizes. As illustrated in FIG. 3, the data structure 310 can include a plurality of 320 levels, each level 320 corresponding to a respective one of the plurality of range sizes. Nodes 311 within each level 320 of the data structure 310 can be configured to represent address ranges of a respective one of the range sizes. The levels 320 of the data structure 310 may be organized in a hierarchy. In some aspects, the levels 320 of the data structure 310 are arranged in a range-size hierarchy (or size hierarchy) with levels 320 corresponding to larger address ranges at the top of the hierarchy and levels 320 corresponding to smaller address ranges at lower levels of the hierarchy. In the FIG. 3 example, the data structure 310 includes N levels 320, including a first or bottom level 320-1 corresponding to the smallest or minimum address range size of the plurality of range sizes, a second level 320-2 corresponding to a next larger range size, and so on, with last or top level 320-N of the data structure 310 corresponding to the largest range size of the plurality of address range sizes.

The adaptive tracking engine 110 may use the data structure 310 to divide addresses 202 into to a plurality of sections, including an address tag 302 and minimum offset 301. The minimum offset 301 may be defined within the least significant bit (LSB) address region. The number of bits included in the minimum offset 301 ($B_{MO}$) may determine the smallest or minimum range size of the plurality of range sizes defined by the data structure 310. The smallest range size may be expressed as $S_1=2^{B_{MO}}$, where $S_1$ is the smallest range size and $B_{MO}$ is the number of bits included in the minimum offset 301. The smallest range size may, therefore, be adjusted by, inter alia, adjusting the number of bits included in the minimum offset 301.

The data structure 310 further divides the address tag 302 into a plurality of sub tags 304, each sub tag 304 assigned to a respective level 320 of the data structure 310 and corresponding to a respective section, portion, or region of the address tag 302. The sub tags 304 may be assigned to levels 320 of the data structure 310 according to the range size hierarchy of the data structure 310. More specifically, sub tags 304 may be assigned to respective levels 320 by range size (and/or based on the position of the respective levels 320 within the range size hierarchy). In some aspects, the sub tags 304 are assigned from LSB to most significant bit (MSB), as illustrated in FIG. 3 and Table 1, below.

TABLE 1

| | Address 202 {64} | | |
|---|---|---|---|
| | Address Tag 302 {52} | | 301 {12} |
| Tag Sec. 304-N | ... Tag Sec.304-2 | Tag Sec. 304-1 | |

Table 1 illustrates division of 64-bit addresses by an example data structure 310 having N levels 320. The smallest range size of the example data structure 310 is set to 4K (4096 addresses) by designating the 12 LSB of the address 202 as the minimum offset 301 and the remaining 52 MSB as the address tag 302. The minimum range size may be set to any suitable quantity. In some aspects, the minimum range size is set in accordance with characteristics of the address space (and/or backing memory 108). The minimum range size may be set to the memory page size (e.g., the minimum range size may be set to 4K when used with a backing memory 108 having 4K pages, a memory controller 104 having a 4K virtual page size, and/or the like). In Table 1, the address tag 302 is further divided into sub tags 304-1 through 304-N. The sub tags 304 may be assigned to levels 320 of the data structure 310 according to the range size hierarchy of the data structure 310. The LSB sub tag 304-1 may be assigned to the lowest level 320-1 of the data structure 310, the next MSB sub tag 304-2 may be assigned to a next higher level 320-2 of the data structure 310, and so on, with the MSB sub tag 304-N being assigned to the highest level 320-N of the data structure 310. Although addresses 202 are illustrated and described herein in reference to big endian format, the disclosure is not limited in this regard and could be adapted for use with addresses 202 in any suitable format, encoding, or endianness.

The sub tags 304 can be used to form region tags 332 for each level 320 of the data structure 310. The region tags 332 may be formed by, inter alia, traversing levels 320 of the data structure 310 from the top of the hierarchy (level 320-N) to lower levels 320 of the hierarchy (towards level 320-1). The region tags 332 of respective levels 320 may, therefore, determine the size of the address ranges represented by nodes 311 within the respective levels 320.

As illustrated in FIG. 3 and Table 2 below, the region tag 332 for each level 320 can be formed from the sub tag 304 assigned to the level 320 and sub tags 304 of corresponding upper levels 320 (e.g., levels 320 above the level 320 in the size hierarchy, if any), with the remaining portions of the address forming a region offset 331 for the level 320. Each level 320 of the data structure 310 may, therefore, have a respective region scheme 322 defining respective region tags 332 configured to uniquely identify address ranges of a respective size (the size of each region determined by, inter alia, the number of address bits included in the region offset 331 thereof):

TABLE 2

| | Address 202 {64} | | |
|---|---|---|---|
| | Address Tag 302 {52} | | 301 {12} |
| 304-N {12} | ... 304-2 {8} | 304-1 {8} | |
| 332-N {12} | Region Offset 331-N {52} | | |
| ... {24} ... | | ... | |
| 332-2 {44} | | Region Offset 331-2 {20} | |
| 332-1 {52} | | | 332-1 {12} |

In the Table 2 example, the sub tag 304-N assigned to level 320-N includes the 12 MSB of the address tag 302. In the region scheme 322-N of level 320-N, the region tag 332-N is formed from the sub tag 304-N (since level 320-N is at the top of the size hierarchy) with the remaining 52 bits forming the region offset 331-N of level 320-N. The region offset 331-N defines the range size of level 320-N. In the Table 2 example, the nodes 311 of level 320-N (the N-level nodes 311) represent address ranges having a range size of $2^{56}$ per the region offset 331-N. Respective N-level nodes 311 of the data structure 310 may, therefore, cover respective, distinct ranges of $2^{56}$ addresses of the address space, each address range uniquely identified by a respective region tag 332-N value. Intermediate levels 320 between level 320-N and 320-2 may be assigned sub tags 304 formed from the next 24 MSB of the sub tag 304 (not shown in Table 2 or FIG. 3 to avoid obscuring details of the illustrated examples). In the region scheme 322-2 of level 320-2 of the data structure 310, the sub tag 304-2 assigned to level 320-2 includes 8 bits and the region tag 332-2 of level 320-2 is formed from sub tag 304-2 and the sub tags 304 of upper levels 320, including sub tag 304-N of level 320-N as well as the sub tags 304 assigned to any intervening levels 320. As illustrated, the region tag 332-2 is constructed according to the hierarchy defined by the data structure 310, with the MSB of the region tag 332-2 being formed from the top-level sub tag 304-N and the LSB of the region tag 332-2 being formed from sub tag 304-2. The region tag 332-2 of level 320-2 includes 44 bits with the remaining 20 bits forming region offset 331-2. Level 320-2 of the data structure 310 may, therefore, correspond to a range size of $2^{20}$. The nodes 311 of the second level 320-2 of the data structure 310 (the second-level nodes 311) may cover respective address ranges of $2^{20}$ addresses, each uniquely identified by a respective 44-bit region tag 332-2 value. In the region scheme 322-1 of the first, lowest level 320-1 of the data structure 310, the region tag 332-1 is formed from sub tags 304-N through 304-1. The region tag 332-1 may, therefore, include 52 bits with the remaining 12 bits defining the minimum range size of the data structure 310. The first-level nodes 311 of level 320-1 may cover respective ranges of $2^{12}$ addresses, each range uniquely identified by a respective 52-bit region tag 332-1 value.

FIG. 3 illustrates further examples of nodes 311 of the disclosed data structure 310. Nodes 311 of the data structure 310 may include any information pertaining to an address range including, but not limited to: a node tag 314, coverage data 316, and/or the like. The node tag 314 can be configured to uniquely identify nodes 311 within respective levels 320 of the data structure 310. The node tags 314 of nodes 311 within respective levels 320 of the data structure 310 may be assigned unique values corresponding to the sub tag 304 of the level 320. The size of the node tags 314 may be determined by the region scheme 322 of the level 320 (e.g., based on the number of bits included in the sub tag 304 assigned to the level). In the Table 2 example, the node tags 314 of nodes 311 within level 320-N of the data structure 310 include 12-bit values corresponding to sub tag 304-N (address bits 63-52), the node tags 314 of nodes 311 within level 320-2 are 8-bit values corresponding to sub tag 304-2 (address bits 27-20); the node tags 314 of nodes 311 within level 320-1 are 8-bit values corresponding to sub tag 304-1 (address bits 19-12), and so on.

In the FIG. 3 example, the coverage data 316 of respective nodes 311 can include and/or reference either: a) access metadata 112 and/or access metadata entry 211 configured to cover the address range defined by the node 311, or b) child node(s) 311 organized within a lower-level child structure 312. The management logic 226 can configure the access metadata entries 211 included within and/or referenced by respective nodes 311 of the data structure 310 to cover address ranges defined by the respective nodes 311. Accordingly, the access metadata entries 211 included within and/or referenced by respective nodes 311 of the data structure 310 can be configured to cover or "occupy" the address ranges of the respective nodes 311. By contrast, nodes 311 having coverage data 316 that do not include and/or reference access metadata entries 211 may be designated as "open" or "unoccupied." The management logic 226 may require that open nodes 311 reference a child structure 312 within an adjacent lower level 320 of the data structure 310; nodes 311 with coverage data 316 that does not include or reference either an access metadata entry 211 or child structure 312 may be removed from the data structure 310. The management logic 226 may enforce address range distinctiveness by, inter alia, preventing occupied nodes 311 (nodes 311 that include and/or reference access metadata entries 211) from having child nodes 311 within the data structure 310, removing child nodes 311 of occupied nodes 311 from the data structure 310 (and invalidating and/or removing corresponding entries 211 of the child nodes 311 from the dataset 210), and/or the like. In a tree-based implementation, the management logic 226 can configure occupied nodes 311 as leaf nodes 311 (nodes 311 that do not reference any lower-level child nodes 311) and can configure open nodes 311 as non-leaf nodes 311 (nodes 311 that reference child nodes 311 within an adjacent lower level 320 of the data structure 310).

The data structure 310 can be configured to encode hierarchical parent-child relationships between nodes 311 disposed within different levels 320 of the data structure. A parent node 311 within an upper level 320 of the data structure 310 can reference child nodes 311 within lower levels of the data structure 310. The hierarchical parent-child relationships encoded within the data structure 310 may correspond to address range containment relationships. More specifically, each child node 311 of a parent node 311 may cover a respective, unique subset of the address range covered by the parent node 311. In the Table 2 example, the node tag 314 of a node 311 within level 320-N of the data structure 310 (an N-level node 311) may be assigned "0x000." The N-level node 311, therefore, covers a 2^52 size address range with bounds {"0x0000 0000 0000 0000", "0x000F FFFF FFFF FFFF"}. (For clarification, portions of address ranges that correspond to region tags 332, such as the region tag 332-N "0x000," are shown in bold herein). Since the region tags 332 of child nodes 311 inherit the node tags 314 (sub tags 304) of upper-level parent nodes 311, the child nodes 311 of the N-level node 311 "0x000" will cover subsets of the address range covered by the N-level node 311 "0x000." For example, the N-level node 311 "0x000" may reference a child (or grandchild) node 311 within the second-level 320-2 of the data structure 310. Since the second-level node 311 incorporates the "0x000" node tag 314 of its N-level parent node 311, the second-level node 311 necessarily covers a subset of the address range covered by the N-level parent node 311. For example, the second-level node 311 may have a node tag 314 of "0x22" and the node tags 314 of the intermediate parent node(s) 311 may be "0x000000," resulting in a 44-bit region tag 332-2 of "0x0000 0000 022" and coverage of a 2^20 address range with bounds {"0x0000 0000 0220 0000", "0x0000 0000 022F FFFF"}. As illustrated, the 2^20 address range covered by the second-level node 311 "0x22" is contained within the address range covered by the N-level parent node 311 "0x000." Similarly, child nodes 311 of the second-level node 311 "0x22" within the first, lowest level 320-1 of the data structure 310 cover subsets of the address range covered by the second-level node 311 "0x22" (and the address ranges covered by higher-level parent nodes 311, including the N-level node 311 "0x000"). By way of further example, the second-level node 311 "0x22" may reference a first-level child node 311 with node tag 314 of "0x11," resulting in a region tag 332-1 of "0x0000 0000 0221 1" and coverage of a 2^12 address space with bounds {"0x0000 0000 0221 1000", "0x0000 0000 0221 1FFF"}. As illustrated, the 2-12 address range covered by the first-level node 311 "0x11" covers a subset of the address range covered by the second-level parent node 311 "0x22" and N-level parent node 311 "0x000" thereof. The first-level child nodes 311 of the second-level node 311 "0x22" may be included in a child structure 312, as illustrated in FIG. 3. The child structure(s) 312 within respective lower levels 320 of the data structure 310 may arrange, organize, and/or index child nodes 311 by the node tags 314 thereof (the node 311 within respective child structures 312 may be uniquely identified by the node tag 314 thereof). A lower-level 320 of the data structure 310 may include a child structure 312 for each unique parent node 311 within the adjacent upper level 320.

As disclosed herein, the management logic 226 can configure relationships between nodes 311 of the data structure 310 to represent address range relationships. Parent-child relationships between upper-level nodes 311 and lower-level nodes 311 can be configured to represent address range containment relationships in which lower-level child nodes 311 of upper-level parent nodes 311 cover respective subsets of the address ranges covered by the upper-level parent nodes 311. As illustrated in FIG. 3, the data structure 310 can define parent-child relationships between upper-level nodes 311 and lower-level nodes 311 (or child structures 312 comprising lower-level child nodes 311 of respective upper-level parent nodes 311). The parent-child relationships may correspond to address range containment relationships, as disclosed herein. The child nodes 311 of an upper-level parent node 311 include lower-level nodes 311 that cover subsets of the address range covered by the parent node 311. As disclosed above, the management logic 226 can leverage the data structure 310 to ensure that the address ranges covered by occupied nodes 311 are distinct by, inter alia, removing children of occupied nodes 311 from lower levels 320 of the data structure 310 (if any) and/or preventing children of the occupied nodes 311 (and/or corresponding access metadata entries 211) from being created.

The management logic 226 may be further configured to encode sibling relationships between nodes 311 within the data structure 310. Sibling nodes 311 refer to nodes 311 that: a) are disposed within the same level 320 of the data structure 310, and b) are referenced by the same parent node 311 within the adjacent upper-level 320 of the data structure 310. Sibling nodes 311 may be arranged within respective child structures 312, each child structure 312 corresponding to a unique parent node 311 within an adjacent upper level 320 of the data structure 310. The sibling nodes 311 within respective child structures 312 may be uniquely identified by the node tags 314 thereof (by the sub tag 304 assigned to the level 320), thereby ensuring that the address ranges covered by sibling nodes 311 at each level 320 of the data structure 310 are unique and distinct. Moreover, since the child structures 312 within respective levels 320 of the data structure 310 correspond to unique upper-level parent nodes 311, the nodes 311 within the respective levels 320 (and/or across the child structure(s) 312 of the respective levels 320) are distinct and unique.

The management logic 226 can utilize the hierarchical relationships encoded within the data structure 310 to efficiently define distinct address ranges of different sizes and/or extents. The management logic 226 can utilize the hierarchical relationships of the data structure 310 to implement address range manipulations that impose low compute overhead while guaranteeing distinctiveness. The management logic 226 can efficiently define a set of address ranges within the data structure 310 and configure the access metadata 112 accordingly. For example, the management logic 226 can configure access metadata entries 211 of the dataset 210 to cover the set of address ranges defined by respective nodes 311 of the data structure 310. The management logic 226 can efficiently adapt the size and/or extent of the set of address ranges by, inter alia, manipulating the data structure 310. The management logic 226 can implement manipulations that define a modified set of address ranges, which are guaranteed to be unique and distinct (per the hierarchical relationships of the data structure 310). The management logic 226 may then configure access metadata entries 211 of the dataset 210 to cover the modified set of address ranges.

The management logic 226 can modify the data structure 310 to adjust the defined set of address ranges based, at least in part, on utility metrics 213 of the access metadata 112. The modifications to the data structure 310 can be propagated to and/or implemented within the access dataset 210 by, inter alia, reconfiguring the set of address ranges covered by respective access metadata entries 211 to correspond with the adjusted set of address ranges of the data structure 310. In one example, the management logic 226 can increase the size of the address range covered by an access metadata entry 211 by, one or more of: merging the node 311 associated with the entry 211 with one or more sibling nodes 311, merging the node 311 into a parent node 311 within an upper-level 320 of the data structure 310, promoting the node 311 to a higher level 320 of the data structure 310, and/or the like. In another example, the management logic 226 can decrease the size of the address range covered by an access metadata entry 211 by one or more of: splitting the node 311 associated with the entry 211 into one or more sibling nodes 311, splitting the node 311 into one or more child nodes 311 within a lower-level 320 of the data structure 310, demoting the node 311 to a lower-level 320 of the data structure 310, removing the node 311 (and invalidating corresponding entry 211), and/or the like.

The data structure 310 can be further configured to define a hierarchical and/or multi-level mapping scheme that can be searched from a top level 320-N through lower levels 320. Due to the parent-child range containment relationships of the data structure 310, search operations performed at lower levels 320 of the data structure 310 can incorporate the results of search operations performed at upper levels 320 of the data structure 310. Searching the N-level data structure illustrated in FIG. 3 may involve first searching the top-level 320-N of the data structure 310 then searching one or more lower-levels 320 (if necessary). A hierarchical search for a node 311 (or access metadata entry 211) covering a specified address 202 may involve: a) searching the top-level 320-N of the data structure using sub tag 304-N of the specified address 202, and b) returning a "entry miss" if a matching top-level node 311 is not found. If a top-level node 311 matching the sub tag 304-N of the specified address 202 is found, the hierarchical search can further include either: c) returning the access metadata entry 211 of the top-level node 311 (if the coverage data 316 of the top-level node 311 includes or references an entry 211), or d) searching the lower-level child structure 312 referenced by the top-level node 311 otherwise. The hierarchical search operation can proceed through successively lower levels 320 of the data structure 310 until a node 311 having coverage data 316 that includes and/or references an access metadata entry 211 is found, or the search fails.

As disclosed herein, the address space may be extremely large and, as such, the data structure 310 and corresponding access dataset 210 may be "sparse" in that the nodes 311 of the data structure 310 (and corresponding access metadata entries 211 of the dataset 210) may not cover the entire address space. Instead, the adaptive tracking engine 110 may add nodes 311 and corresponding access metadata entries 211 as regions of the address space are utilized (e.g., as commands 201 and/or indications of commands 201 are received at the adaptive tracking engine 110, as disclosed herein). The management logic 226 may be further configured to remove nodes 311 that do not include or reference either an access metadata entry 211 or child node 311 (e.g., may prune open leaf nodes 311 from the data structure 310). The management logic 226 can be further configured to remove or evict nodes 311 and corresponding access metadata entries 211 that satisfy eviction criteria; e.g., have not been accessed within a time threshold, are not sufficiently frequent, have consistently poor utility metrics 213, produce poor prefetch, and/or the like. The management logic 226 can dynamically add nodes 311 and corresponding access metadata entries 211 in response to tracking misses. A tracking miss occurs when an address 202 of a command 201 falls outside of the address ranges covered by the access metadata 112 (outside of the covered address ranges of the access metadata entries 211 of the dataset 210). In response to a tracking miss, the management logic 226 can add a node 311 to the lowest level 320-1 of the data structure such that the corresponding entry 211 covers an address range of the smallest range size. The range size of the entry 211 may be subsequently modified based on utility metrics 213 (e.g., based on prefetcher performance within the address range covered by the access metadata entry 211).

In some aspects, the management logic 226 can initialize and/or clear the access metadata 112, which may include removing and/or invalidating nodes 311 of the data structure 310 and/or corresponding access metadata entries 211 of the dataset 210. The management logic 226 can clear the access metadata 112 during or in response to a user command or message, a configuration setting, in response to shutdown and/or restart operations, and/or the like. Following initialization, the management logic 226 can rebuild access dataset 210 and/or data structure 310 in response to tracking misses and/or adapt address ranges covered by the access metadata based, at least in part, on utility metrics 213 pertaining to the covered address ranges, as disclosed herein.

Although particular examples of data structures 310 defining particular configurations and/or region schemes 322 are described herein, the disclosure is not limited in this regard and could be adapted to use any suitable type of data structure 310 having any suitable number of levels 320 and/or any suitable region scheme(s) 322.

Figure 4:
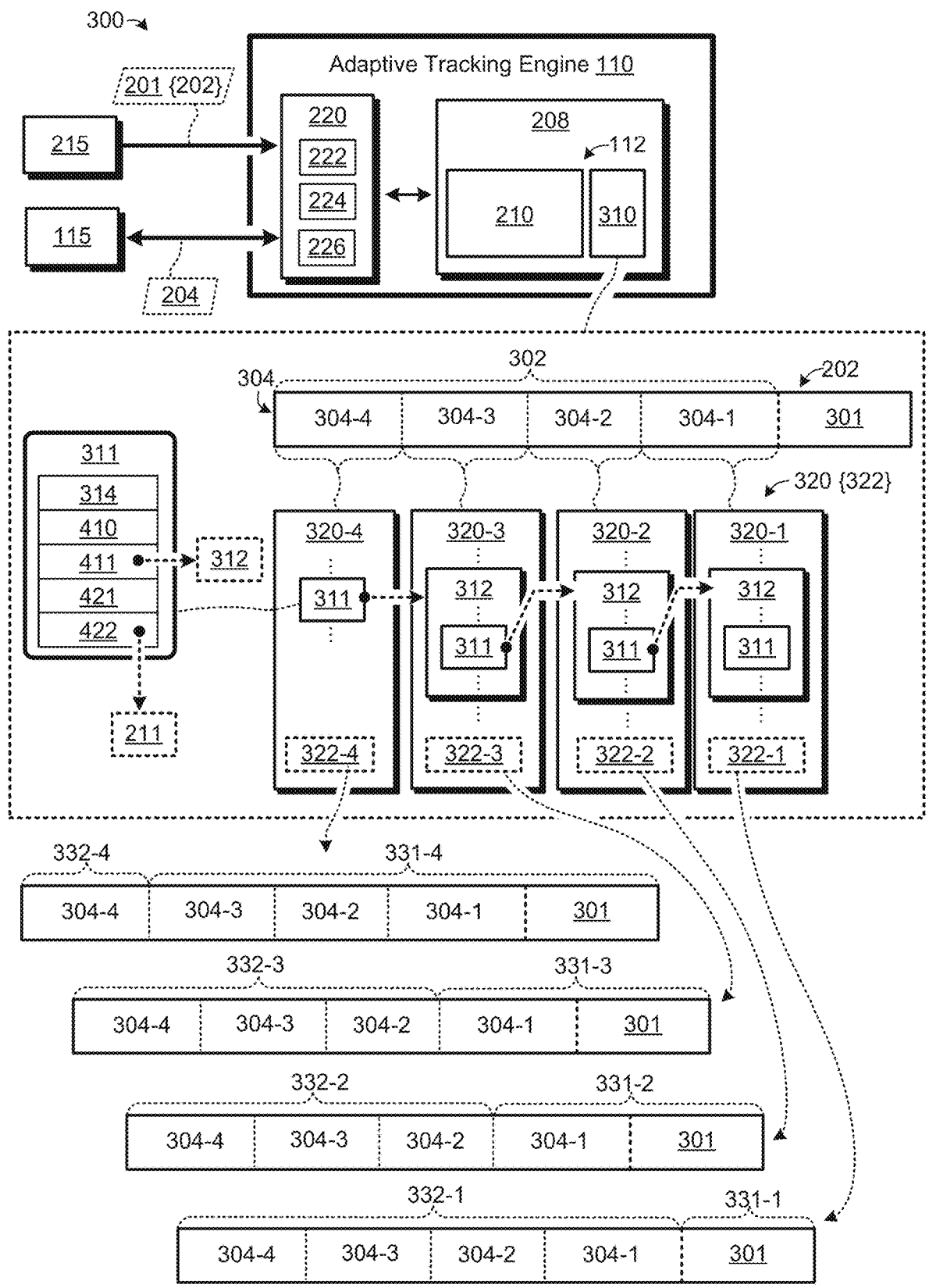
FIG. 4 illustrates further examples of apparatuses and data structures for implementing adaptive address tracking.

FIG. 4 illustrates further examples of an apparatus 300 for implementing an adaptive tracking engine 110, as disclosed herein. In the FIG. 4 example, the management logic 226 of the adaptive tracking engine 110 is configured to manage the address ranges covered by the access metadata 112 by use of a four-level data structure 310. In some implementations, access metadata entries 211 of the dataset 210 may be maintained within the data structure 310 (e.g., within occupied nodes 311 of the data structure 310). In the FIG. 4 example, the access dataset 210 is maintained separately from the data structure 310. The access dataset 210 may be maintained in a different portion of the memory 208 from the data structure 310; e.g., within a different array, region, section, bank, plane, and/or the like. As disclosed herein, the access dataset 210 may be realized by suitable structure, such as: a table, a lookup table, a mapping table, an array, a list, a tree, a prefix tree, a trie, a radix tree, and/or the like.

As illustrated in FIG. 4, the management logic 226 divides address tags 302 into four sub tags 304-1 through 304-4 and defines the minimum range size to be 4K (by designating a 12-bit minimum offset 301, as in the FIG. 3 example). Table 3 illustrates region tags 332 and corresponding region offsets 331 for an example data structure 310 comprising 4 levels as in FIG. 4.

TABLE 3

| Address 202 {64} | | | | |
|---|---|---|---|---|
| Address Tag 302 {52} | | | | 301 {12} |
| 304-4 {13} | 304-3 {13} | 304-2 {13} | 304-1 {13} | |
| 332-4 {13} | | | 331-4 {51} | |
| | 332-3 {26} | | 331-3 {38} | |
| | | 332-2 {39} | 331-2 {25} | |
| | | | 332-1 {52} | 331-1 {12} |

As illustrated in Table 3, the region scheme 322-4 of the highest level 320-4 of the data structure 310 defines a 13-bit region tag 332-4 that uniquely identifies respective ranges of $2^{51}$ addresses of the 64-bit address space (the maximum range size of the plurality of range sizes defined by the data structure 310), the region scheme 322-3 of level 320-3 defines a 26-bit region tag 332-3 formed from sub tags 304-4 and 304-3 that uniquely identifies respective ranges of $2^{38}$ addresses, the region scheme 322-2 defines a 39-bit region tag 332-2 formed from sub tags 304-4 through 304-2 that uniquely identifies respective ranges of $2^{25}$ addresses, and the region scheme 322-1 of level 320-1 defines a 52-bit region tag 332-1 formed from sub tags 304-4 through 304-1 that uniquely identify respective ranges of $2^{12}$ addresses (the minimum range size of the plurality of range sizes defined by the data structure 310).

Nodes 311 of the data structure 310 can include a node tag 314, which may hold a value corresponding to the sub tag 304 of the level 320 in which the node 311 is disposed and may uniquely identify the node 311 within a respective child structure 312 within the level 320. In the FIG. 4 example, nodes 311 of the data structure 310 further include a next valid indicator 410, a next pointer 411, an entry valid indicator 421, an entry pointer 422, and so on. The next valid indicator 410 and/or entry valid indicator 421 may specify whether the node 311 is open or occupied. More specifically, the next valid indicator 410 can specify whether the next pointer 411 of the node 311 references a valid child structure 312 in a lower level 320 of the data structure 310 (indicates whether the node 311 is open), and the entry valid indicator 421 can specify whether the entry pointer 422 references a valid access metadata entry 211 that covers the address range defined by the node 311 (indicates whether the node 311 is occupied). The next valid indicator 410 and/or entry pointer 422 can be omitted from nodes 311 that cannot reference lower-level child nodes 311, such as nodes 311 disposed within the lowest level 320-1 of the data structure 310.

Figures 1, 5:
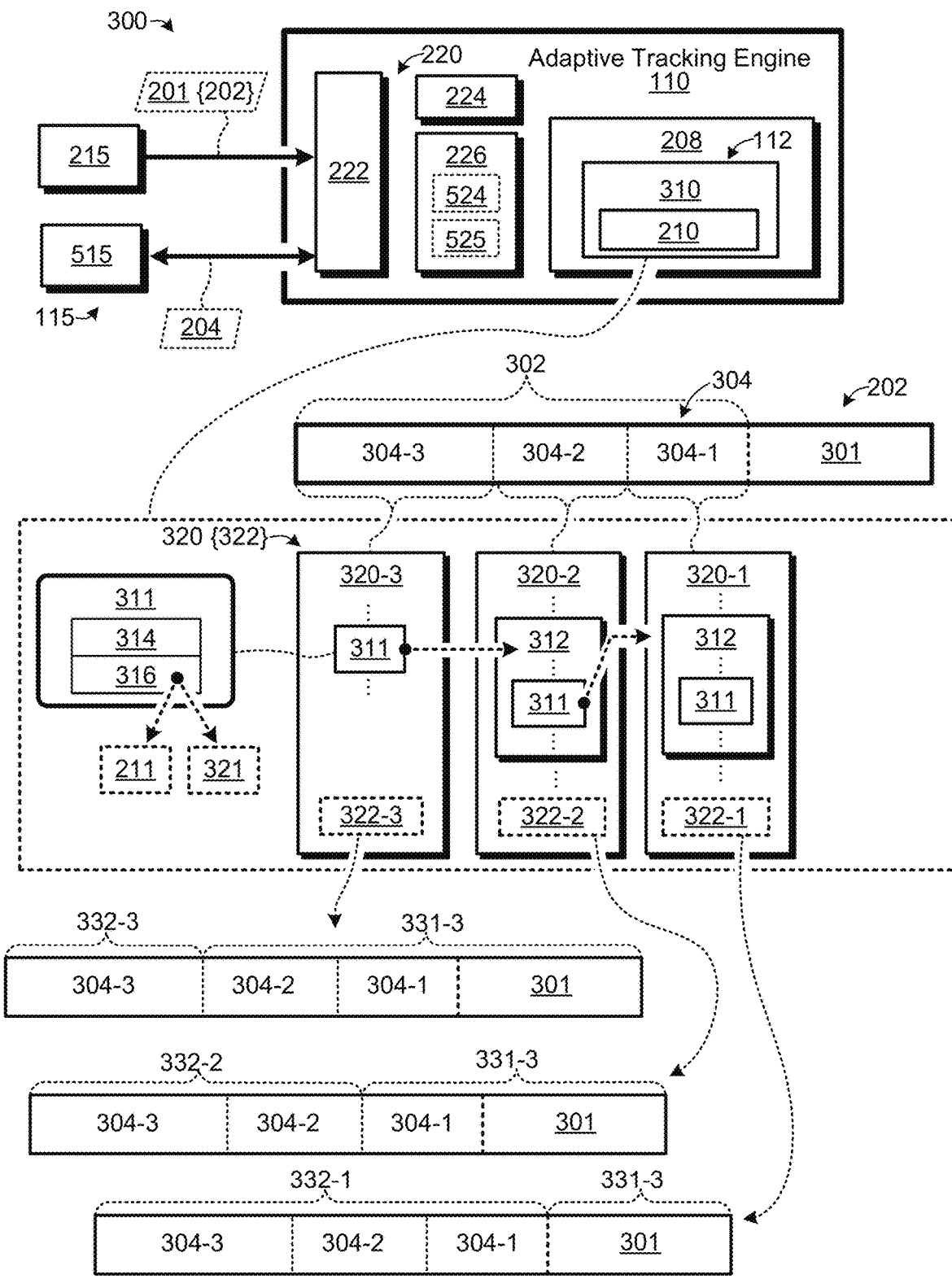
Figures 2, 5:
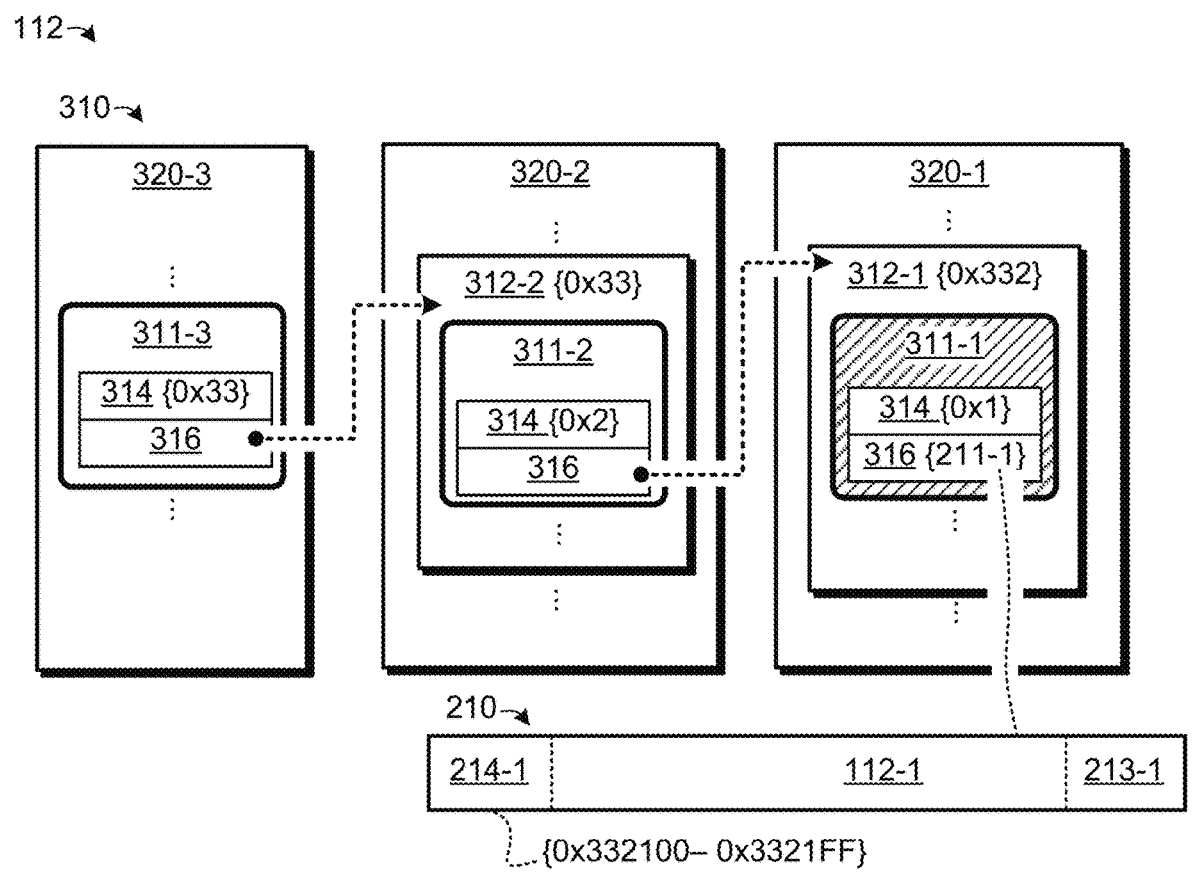
Figures 3, 5:
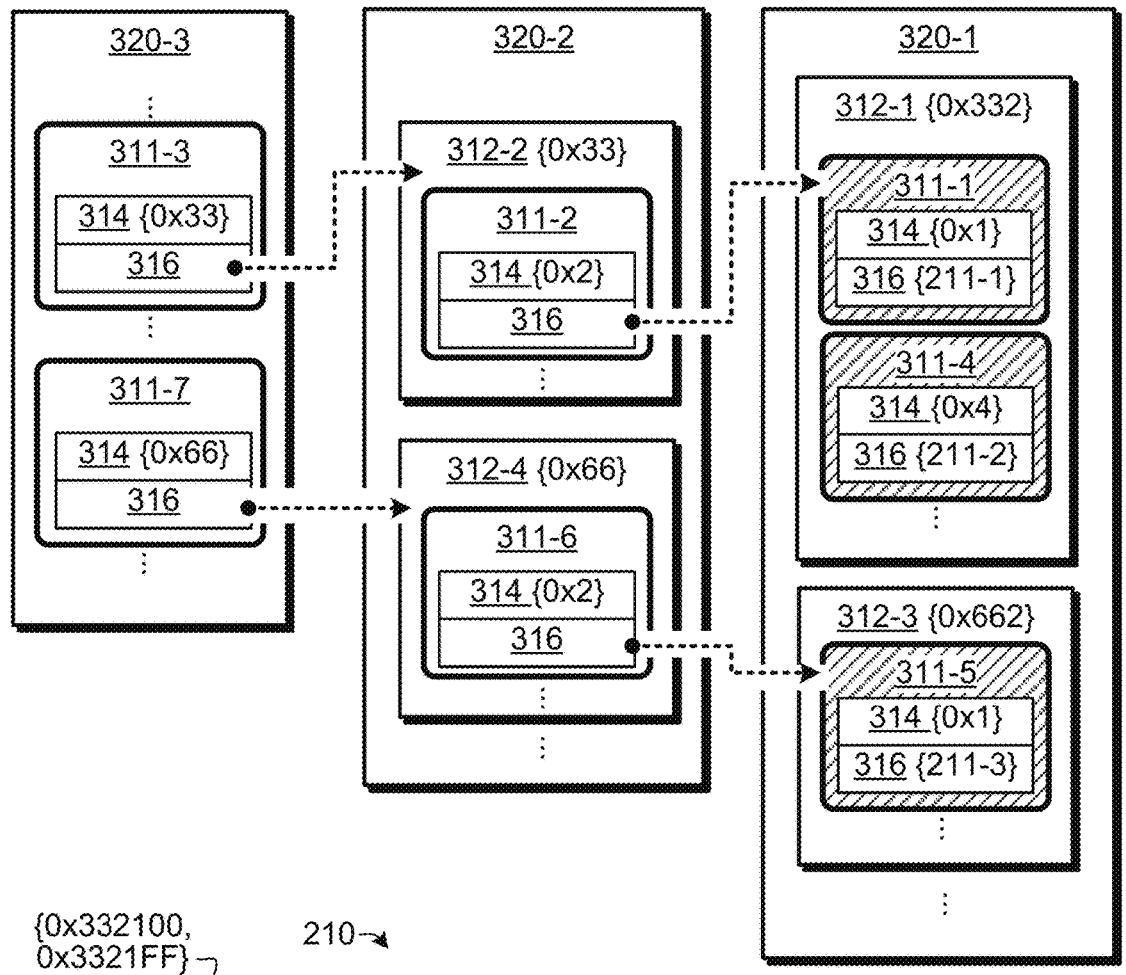
Figures 4, 5:
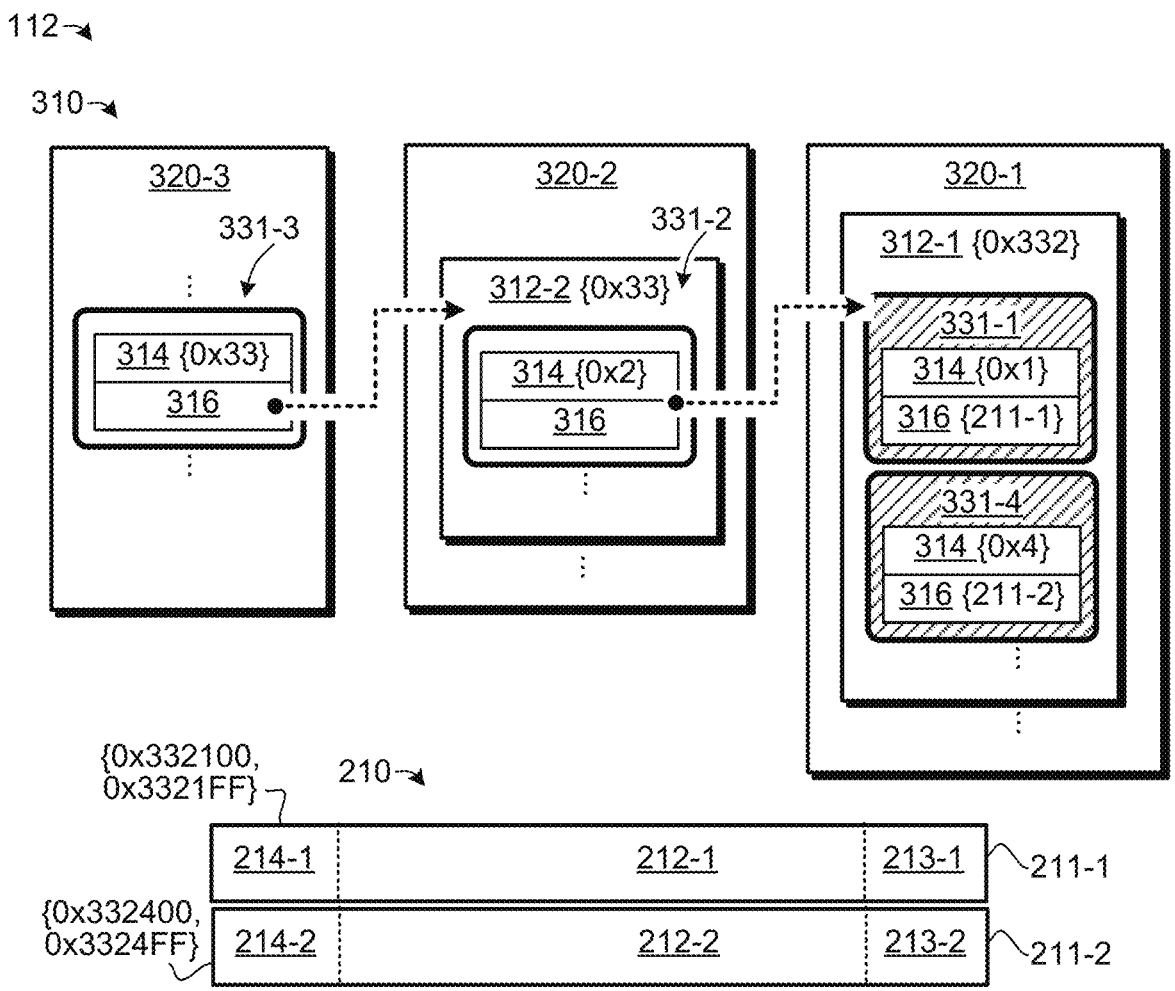

FIG. 5-1 illustrates further examples of apparatus 300 for implementing an adaptive tracking engine 110, as disclosed herein. In the FIG. 5-1 example, the management logic 226 manages the address ranges (and range sizes) covered by respective access metadata entries 211 of the dataset 210 through and/or by the use of the data structure 310, as disclosed herein. In the FIG. 5-1 example, the management logic 226 manages the address ranges covered by the access metadata 112 using a multi-level data structure 310 including three levels 320-1 through 320-3, each level 320 corresponding to a respective one of a plurality of range sizes.

The adaptive tracking engine 110 may include and/or be coupled to a memory 208, which may be implemented, realized, and/or provided by any suitable memory resource including, but not limited to: semiconductor integrated circuitry, memory cells, memory arrays, memory banks, memory chips, on-board memory of the adaptive tracking engine 110, host memory resources, main memory, backing memory 108, cache memory 106, memory resources of a consumer 115 and/or source 215, RAM, DRAM, SRAM, SDRAM, and/or the like. The management logic 226 may be configured to maintain the access metadata 112 and/or portions thereof within the memory 208.

The management logic 226 may be configured to manage the address ranges (and/or range sizes) covered by respective entries 211 of the access dataset 210 through the data structure 310, as disclosed herein. The configuration of the data structure 310 may be specified by, inter alia, configuration data 524 of the adaptive tracking engine 110. The configuration data 524 may include any suitable configuration information including, but not limited to: a configuration of the data structure 310, a type of the data structure 310 (e.g., specify a table, mapping table, multi-level mapping table, tree, Radix tree, or the like), a number of levels 320 to include in the data structure 310, region schemes 322 of respective levels 320, range sizes of respective levels 320, configuration of sub tags 304 assigned to respective levels 320 (e.g., address bits included in respective sub tags 304), region tags 332 of respective levels 320, region offsets 331 of respective levels 320, range sizes of respective levels 320 (define a plurality of range sizes, each corresponding to a respective level 320 of the data structure 310), a minimum range size, a minimum offset 301 of the data structure 310, and/or the like. In the FIG. 5-1 example, the configuration data 524 specifies a data structure 310 having three levels 320 per Table 4 below:

TABLE 4

| Address 202 {24} | | | | |
|---|---|---|---|---|
| Address Tag 302 {16} | | | | 301 {8} |
| 304-3 {8} | 304-2 {4} | | 304-1 {4} | |
| 332-3 {8} | | | 331-3 {16} | |
| | 332-2 {12} | | 331-2 {12} | |
| | | 332-1 {16} | | 331-1 {8} |

Per the region schemes 322 of Table 3, the minimum offset 301 corresponds to address bits 7 through 0 (the minimum range size is 2^8), level 320-1 is assigned sub tag 304-1, corresponding to address bits 11 through 8 (and the minimum range size), level 320-2 is assigned sub tag 304-2 corresponding to address bits 15-12 (and a next larger range size of 2^12), and level 320-3 is assigned sub tag 304-3 corresponding to address bits 23-16 (and a largest range size of 2^16).

As illustrated in FIG. 5-1, nodes 311 of the data structure 310 can include a node tag 314, coverage data 316, and/or the like. The node tag 314 of a node 311 may correspond to the sub tag 304 of the level 320 of the data structure 310 in which the node 311 is disposed. The coverage data 316 may include and/or reference either: an access metadata entry 211 or a child structure 312 within a lower-level 320 of the data structure 310 (e.g., one or more child nodes 311), as disclosed herein. The coverage data 316 may distinguish occupied nodes 311 that are blocked from referencing child nodes 311 in lower levels 320 of the data structure 310 from open nodes 311. The management logic 226 prevents the data structure 310 from including child nodes 311 under occupied nodes 311, which, due to the address range containment relationships defined by the data structure 310, prevents access metadata entries 211 of the dataset 210 from covering overlapping address ranges. Although FIG. 5-1 illustrates one example of a node 311, the disclosure is not limited in this regard and could be configured to express, represent, and/or encode information pertaining to respective address ranges and/or coverage of address ranges by the access metadata 112 using any suitable technique and/or format.

Management logic 226 of the adaptive tracking engine 110 is configured to add nodes 311 to the data structure 310 (and create corresponding access metadata entries 211) in response to tracking misses. FIG. 5-2, illustrates operations implemented by the adaptive tracking engine 110 (and/or management logic 226 thereof) in response to a tracking miss for a target address 202 "0x332105." The management logic 226 may detect the tracking miss in response to a command 201 pertaining to the address 202 (e.g., in response to determining that the access dataset 210 does not include an access metadata entry 211 that covers the target address 202). As illustrated in FIG. 5-2, the management logic 226 handles the tracking miss by, inter alia, creating nodes 311 representing the target address 202 within respective levels 320 of the data structure 310. The node tags 314 of the nodes 311-1 through 311-3 created for the target address 202 within respective levels 320 of the data structure 310 are assigned values corresponding to the sub tags 304 assigned to the respective levels 320 (per the region schemes 322 of the respective levels 320). The node 311-1 created within level 320-1 covers an address range that includes the target address 202 and is of the smallest address range size defined by the data structure 310. The node 311-1 includes and/or references an access metadata entry 211 configured to cover the address range defined by the node 311-1. The management logic 226 may, therefore, designate node 311-1 as occupied and designate nodes 311-2 and 311-3 as open.

In the example data structures 310 illustrated in FIGS. 5-2 through 5-9, occupied nodes 311 that include and/or reference access metadata entries 211 are highlighted with a diagonal fill pattern for ease of reference (and to distinguish occupied nodes 311 from open nodes 311 that do not include the diagonal fill pattern).

As disclosed herein, the management logic 226 can ensure distinctiveness by utilizing the address range relationships encoded within the data structure 310. More specifically, the management logic 226 configures the data structure 310 such that nodes 311 created within lower levels 320 of the data structure are referenced by open parent nodes 311 and child nodes 311 are removed from (and cannot be created under) occupied nodes 311. Creating the node 311-1 within level 320-1 may, therefore, include verifying that level 320-2 does not include an occupied second-level node 311 covering the target address 202 and creating a parent node 311-2 within the second level 320-2 of the data structure (if node 311-2 does not yet exist). Similarly, creating the node 311-2 within level 320-2 may include verifying that level 320-3 does not include an occupied third-level node 311 covering the target address 202 and creating a parent node 311-3 within the third level 320-3 of the data structure 310 (if node 311-2 does not yet exist). The node tags 314 of the node 311 created within respective levels 320 of the data structure 310 are extracted from the target address 202 per the sub tags 304 assigned to the respective levels: the node tag 314 of node 311-1 is assigned "0x1" (extracted from bits 11 through 7 of the target address 202 "0x332105" per sub tag 304-1); the node tag 314 of node 311-2 is assigned "0x2" (extracted from bits 15-12 of the target address 202 per sub tag 304-2); and the node tag 314 of node 311-2 is assigned "0x33" (extracted from the 8 MSB of the target address 202 per sub tag 304-3).

As illustrated in FIG. 5-2, the data structure 310 encodes parent-child relationships between nodes 311 that correspond to address containment relationships between address ranges covered by the nodes 311 (and access metadata entries 211 thereof). The region tag 332-N of the top-level parent node 311-3 is the 8-bit value "0x33" that uniquely identifies a third-level address range (2^16 address range size) with bounds {"0x330000", "0x33FFFF"}. Per the hierarchical, address containment relationships of the data structure 310, child nodes 311 of the third-level parent node 311-3 (e.g., nodes 311-2 and 311-1) cover subsets within the covered address range thereof. The second-level node 311-2 has a 12-bit region tag 332-2 of "0x332" and covers the second-level address range (2^12 address range size) bounded by {"0x332000", "0x332FFF"}. As illustrated, the second-level address range covered by node 311-2 is included within the third-level address range covered by its upper-level parent node 311-3. The first-level node 311-1 has a 16-bit region tag 332-1 of "0x3321" and covers the first-level address range (2^8 addresses) bounded by {"0x332100", "0x3321FF"}. As illustrated, the first-level address range covered by node 311-1 is included within the second-level address range covered by its second-level parent node 311-2 and the third-level address range covered by its third-level "grandparent" node 311-3.

Creating the first-level node 311-1 may further include configuring an access metadata entry 211-1 of the dataset 210 to cover the address range defined by the node 311-1. As illustrated, the access metadata entry 211-1 included within and/or referenced by node 311-1 includes access metadata 112-1 pertaining to the address range covered by the node 311-1. The address range covered by the access metadata entry 211-1 (address range {"0x332100", "0x3321FF"}) may be specified in range metadata 214-1 of the entry 211. Alternatively, since the address range covered by the entry 211-1 is defined by the node 311-1, the range metadata 214-1 of the entry 211-1 may be omitted. Since the node 311-1 includes and/or references an access metadata entry 211-1, the node 311-1 may be designated as occupied. The nodes 311-2 and 311-3 having coverage data 316 that do not include and/or reference access metadata entries 211 may be designated as open.

As disclosed herein, nodes 311 within lower levels 320 of the data structure 310 may be organized into respective child structures 312, each corresponding to a respective parent node 311 in an adjacent upper level 320 and being indexed by node tag 314, which may correspond to the sub tag 304 assigned to the level 320. As illustrated in FIG. 5-2, the first-level node 311-1 is included in a child structure 312-1 referenced by its second-level parent node 311-2, and node 311-2 is included in the child structure 312-2 referenced by its third-level parent node 311-3. The child structure 312-2 includes second-level nodes 311 that cover subsets of the address range covered by the third-level node 311-3. More specifically, the child structure 312-2 includes second-level nodes 311 having region tags 332-2 that incorporate the third-level region tag 332-3 the parent node 311-3 ("0x33") and, as such, cover subsets of the address range covered by the third-level node 311-3 (e.g., second-level nodes 311 having region tags 332-2 that incorporate region tag 332-3 "0x33"). Similarly, the child structure 312-1 referenced by the second-level node 311-2 includes first-level nodes 311 that cover subsets of the address range covered by the second-level node 311-2. More specifically, the child structure 312-1 includes first-level nodes 311 having region tags 332-1 that incorporate the second-level region tag 332-2 of the second-level node 311-2 ("0x332") and, as such, cover subsets of the second-level address range covered by the second-level node 311-2.

As further illustrated in FIG. 5-2, traversing respective levels 320 of the data structure 310 in hierarchical lookup and/or search operations may result in constructing region tags 332 of the respective levels 320. A lookup for the access metadata entry 211 that covers a designated address 202 (e.g., "0x332188") may include: a) searching level 320-3 to identify a third-level node 311-3 having a node tag 314 matching the sub tag 304-3 of the designated address 202 (e.g., "0x33"), b) searching the child structure 312-2 referenced by the identified third-level node 311-3 (and/or third-level sub tag 304-4 "0x33") to identify a second-level node 311-2 having a node tag 314 matching the sub tag 304-2 of the designated address 202 (e.g., "0x2"), and c) searching the child structure 312-1 referenced by the identified second-level node 311-2 (and/or second-level sub tag 304-2 "0x2") to identify a first-level node 311-1 having a node tag 314 matching the sub tag 304-1 of the designated address 202 (e.g., "0x1"). Traversing the data structure 310 may, therefore, result in constructing the value of the region tag 332-1 for level 320-1 (e.g., constructing a 16-bit value for the region tag 332-1 of level 320-1, "0x3321"). Similarly, traversing the data structure 310 to the second level 320-2 results in constructing a 12-bit value for the region tag 332-2 ("0x332"), and so on.

FIG. 5-3 illustrates further operations implemented by the adaptive tracking engine 110 in response to a tracking miss for additional addresses 202, including a second address 202 "0x33240F" and a third address 202 "0x66210B." In response to the tracking miss for the second address 202 "0x33240F," the management logic 226 creates a node 311-4 and corresponding access metadata entry 211-2 within the first level 320-1 of the data structure 310. Since the node 311-4 covers a subset of the region covered by the second-level node 311-2 (is a child of node 311-2) and the third-level node 311-3 (is a grandchild of node 311-3), node 311-4 is included in child structure 312-1. The node 311-4 can be included in the first-level child structure 312-1 in response to traversing the data structure 310 using respective sub tags 304 of the second address 202. The traversal may include: a) selecting the third-level node 311-3 (and second-level child structure 312-2 referenced thereby) by use of sub tag 304-3 of the second address 202 ("0x33"), b) selecting the second-level node 311-2 (and first-level child structure 312-1 referenced thereby) by use of sub tag 303-2 of the second address 202 ("0x2"), and c) determining that the first-level child structure 312-1 does not include a node 311 that covers the second address 202 (e.g., determining that "0x33240F" is outside of the address range covered by node 311-1 and/or access metadata entry 211-1). The node 311-4 can include and/or reference an access metadata entry 211-2 that includes access metadata 112-2 pertaining to the address range specified by the node 311-4 (and/or range metadata 214-2).

The management logic 226 creates nodes 311-5, 311-6, and 311-7 in response to the tracking miss for the third address 202 "0x66210B." The third address 202 is outside of the address ranges covered by the third-level node 311-3 and/or second-level node 311-2. The management logic 226 can determine that the third address 202 is outside of the third-level address range of node 311-3 (and, as such, is also outside of the second-level address range of node 311-2) in response to, inter alia, comparing the sub tag 304-3 of the third address 202 "0x66" to the node tag 314 of node 311-3 "0x33." As illustrated in FIG. 5-3, the management logic 226 creates child structure 312-3 and node 311-5 within the first level 320-1 of the data structure 310 and assigns the node tag 314 of the node 311-5 to "0x1" per the sub tag 304-1 of the third address 202. The node 311-5 includes and/or references an access metadata entry 211-3 having access metadata 112-3 pertaining to the address range covered by the node 311-5 (e.g., address range {"0x662100", "0x6621FF"}). The management logic 226 creates a parent node 311-6 within the upper adjacent level 320-2 of the data structure 310 to reference the child structure 312-3. The node tag 314 of the second-level parent node 311-6 is set to "0x2" per the sub tag 304-2 of the third address 202. The management logic 226 further creates a parent node 311-7 within the next level 320-3 of the data structure 310 to reference the second-level child structure 312-4. The node tag 314 of the third-level parent node 311-7 is set to "0x66" per the sub tag 304-3 of the third address 202.

Referring back to FIG. 5-1, the adaptive tracking engine 110 can be configured to update the access metadata 112 in response to commands 201 pertaining to the address space. In the FIG. 5-3 example, the adaptive tracking engine 110 updates the access metadata 112-1 of entry 211-1 in response to commands 201 pertaining to addresses 202 within the address range {"0x332100", "0x3321FF"}, updates the access metadata 112-2 of entry 211-2 in response to commands 201 pertaining to addresses 202 within the address range {"0x332400", "0x3324FF"} and/or updates the access metadata 112-3 of entry 211-3 in response to commands 201 pertaining to addresses 202 within the address range {"0x662100", "0x6621FF"}. A consumer 115, such as prefetch logic 515, can use the access metadata 112 to implement prefetch operations within respective regions of the address space. The prefetch logic 515 can use the access metadata 112-1 of entry 211-1 to implement prefetch operations within the address range {"0x332100", "0x3321FF"}, can use the access metadata 112-2 of entry 211-2 to implement prefetch operations within the address range {"0x332400", "0x3324FF"}, and can use the access metadata 112-3 of entry 211-3 to implement prefetch operations within the address range {"0x662100", "0x6621FF"}.

The prefetch logic 515 may implement prefetch operations in accordance with a particular prefetch technique or algorithm. Different prefetch implementations may utilize different types of access metadata 112. In one example, the prefetch logic 515 implements a stride-based prefetcher that uses the access metadata 112 to detect stride patterns within respective address regions. In another example, the prefetch logic 515 implements a correlation prefetcher that attempts to detect recurring delta sequences within address sequences covered by the access metadata 112. In yet another example, the prefetch logic 515 implements an ML prefetcher, such as an LSTM prefetcher, and uses the access metadata 112 in an ML model of the local context covered by the access metadata 112 (and/or extracts ML features therefrom). The management logic 226 may be configured to adapt the access metadata 112 to the prefetch logic 515 (e.g., based on, inter alia, characteristics of the prefetch logic 515). The management logic 226 may be configured to capture address stride metadata in response to determining that the prefetch logic 515 implements stride-based prefetch, may capture address sequences (and/or delta sequences) in response to determining that the prefetch logic 515 implements a correlation prefetcher, may capture ML model data and/or features in response to determining that the prefetch logic 515 implements an ML prefetcher, and so on.

Alternatively, or in addition, the management logic 226 may capture access metadata 112 in accordance with a programmable metadata configuration 525. The metadata configuration 525 may include any suitable information pertaining to the capture, maintenance, and/or format of the access metadata 112. The management logic 226 may maintain the metadata configuration 525 within memory resources of the adaptive tracking engine 110 (e.g., with other configuration data 524). The management logic 226 may receive and/or import metadata configuration 525 from a consumer 115, such as the prefetch logic 515. The prefetch logic 515 may receive the metadata configuration 525 (and/or portions thereof) through the interface 222 of the adaptive tracking engine 110 (e.g., through an API or other mechanism implemented by the interface 222). The management logic 226 uses the metadata configuration 525 to adapt the access metadata 112 for the prefetch implementation of the prefetch logic 515. The management logic 226 can use the metadata configuration 525 to capture access metadata 112 suitable for use by one or more of a stride prefetcher, correlation prefetcher, ML prefetcher, NN prefetcher, RNN prefetcher, LSTM prefetcher, and/or the like.

The management logic 226 can determine utility metrics 213 for respective access metadata entries 211 based on, inter alia, feedback 204 from the prefetch logic 515. The management logic 226 may use the utility metrics 213 to adjust range sizes of the address ranges. The range sizes may be adjusted by manipulating the data structure 310 and implementing the manipulations within the access dataset 210. More specifically, the management logic 226 can modify the data structure 310 to adjust the address ranges represented by respective nodes 311 and reconfigure the access metadata entries 211 accordingly. The management logic 226 can increase the size of an access metadata entry 211 by, inter alia, promoting the corresponding node 311 to a higher-level 320 of the data structure 310, merging the node 311 with one or more other nodes 311 of the data structure, merging the node 311 into a higher-level parent node 311, and/or the like. The management logic 226 can decrease the size of an access entry 211 by, inter alia, demoting the node associated with the entry 211 to a lower level 320 of the data structure 310, splitting the node 311, splitting the node 311 into one or more child nodes 311 within a lower level 320 of the data structure 310, removing the node 311 (and invalidating the corresponding access metadata entry 211), and/or the like.

In the FIG. 5-3 example, the utility metrics 213-3 of access metadata entry 211-3 may trigger a demotion operation by the management logic 226. Since the entry 211-3 covers the smallest range size defined by the data structure 310 (is associated with a node 311-5 within the first level 320-1 of the data structure), the demotion operation may include removing the access metadata entry 211-3 and corresponding node 311-5 from the data structure 310. Removing an access metadata entry 211 may include invalidating and/or removing the entry 211 from the dataset 210 and/or removing the node 311 that includes and/or references the entry 211 from the data structure 310. The remove operation may further include removing and/or invalidating upper-level parent nodes 311 and/or child structures 312 that no longer reference any child nodes 311 due to, inter alia, removal of the node 311 associated with the access metadata entry 211. As illustrated in FIG. 5-4, demoting the access metadata entry 211-3 includes removing the entry 211-3 from the dataset 210, removing the first-level node 311-5 from the data structure 310, removing upper-level parent nodes 311-6 and 311-7 that no longer reference child nodes 311 within lower levels 320 of the data structure 310, removing empty child structures 312-3 and 312-4, and so on.

In another example, the utility metrics 213-3 of the access metadata entry 211-3 are sufficient to trigger promotion of the entry 211-3. As disclosed herein, promoting an access metadata entry 211 can include increasing the size of the address range covered by the entry 211. Promoting an access metadata entry 211 may include modifying the node 311 associated with the entry 211 by, inter alia, merging the node 311 into a next-higher level 320 of the data structure 310 and setting the address range of the access metadata entry 211 to the address range defined by the modified node 311 (or associating the access metadata entry 211 with the parent node 311 and removing the child node 311 from the data structure 310). In the FIG. 5-5 example, promoting the access metadata entry 211-3 includes merging the first-level node 311-5 originally associated with the entry 211-3 into the second-level node 311-6 (and/or associating the entry 211-3 with the second-level node 311-6). As illustrated, the second-level node 311-6 transitions from an open node 311 with lower-level child nodes 311 to an occupied node 311 that is prevented from having and/or referencing any lower-level child nodes 311. Promoting the access metadata entry 211-3 may, therefore, include removing and/or invalidating the first-level node 311-5 (and the resulting empty child structure 312-3). The size of the address range covered by the modified access metadata entry 211-3 may be promoted from the smallest range size to the next larger range size of level 320-2. As illustrated in FIG. 5-5, the entry 211-3 is modified to cover a second-level address range {"0x662000", "0x662FFF"} of node 311-6 rather than the smaller, first-level address range {"0x662100", "0x6621FF"}.

The management logic 226 may monitor the utility metrics 213-3 of the access metadata entry 211-3 subsequent to the promotion operation and, based at least in part on the utility metrices 213-3, determine whether to retain the entry 211-3 at the second level 320-2, demote the entry 211-3 back to the first level 320-1, promote the entry 211-3 to the next higher level 320-3, or the like. In the example illustrated in FIG. 5-6, the utility metrics 213-3 of the access metadata entry 211-3 trigger further promotion of the entry 211-3 to the third level 320-3 of the data structure 310. In response, the management logic 226 merges the node 311—associates the entry 211-3 with the third-level node 311-7 by, inter alia, configuring the access metadata entry 211-3 to cover the third-level address range defined by the node 311-7 (e.g., address range {"0x660000", "0x66FFFF"}), setting the coverage data 316 of the node 311-7 to include and/or reference the entry 211-3, transition the node 311-7 from an open node 311 to an occupied node 311, removing lower-level child nodes 311 of the node 311-7, such as the second-level node 311-6, removing lower-level child structures 312, and so on.

Figures 5, 6:
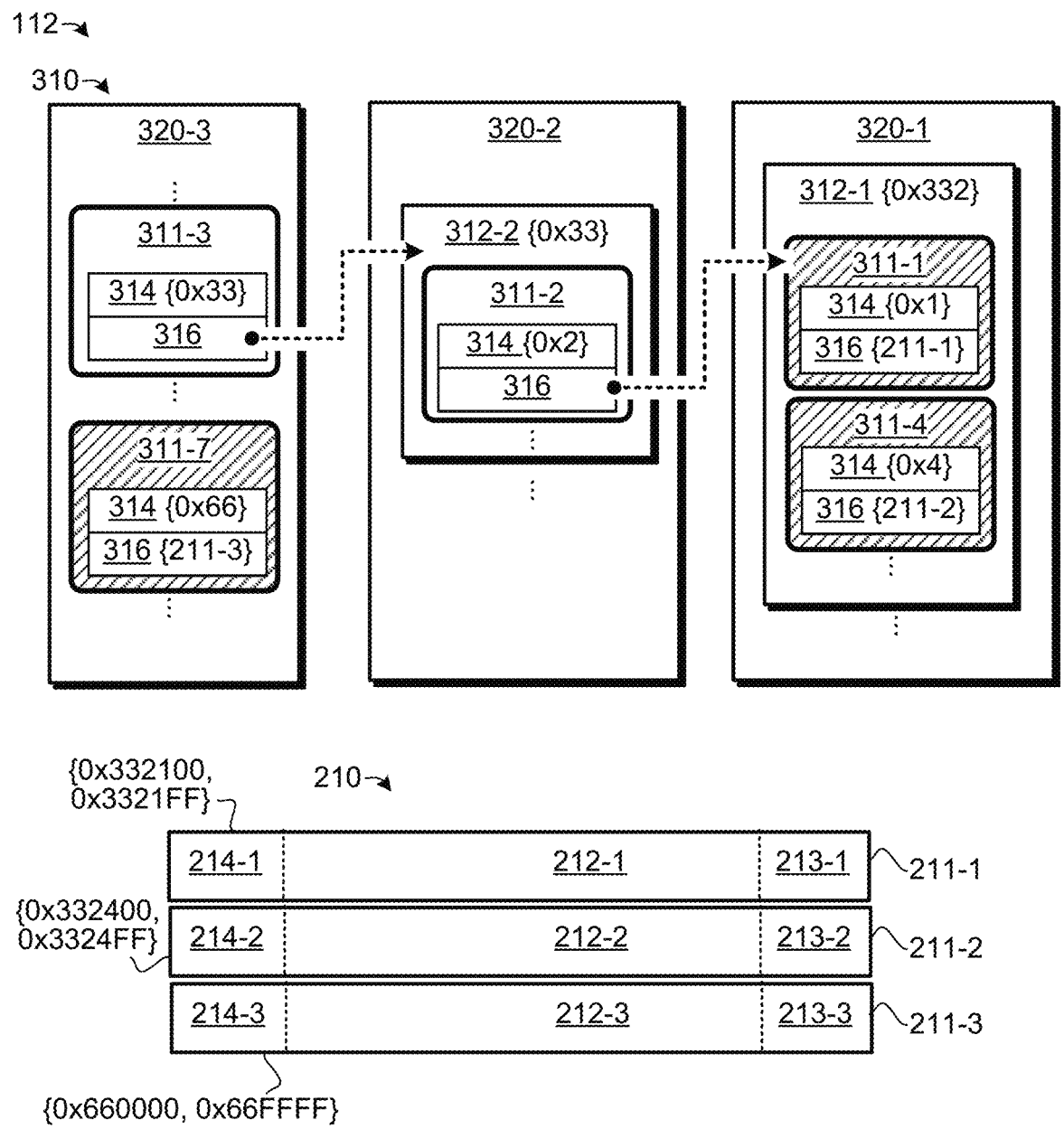

Referring back to FIG. 5-5, instead of increasing as in the example illustrated in FIG. 5-6, the utility metrics 213-3 of the access metadata entry 211-3 may decrease after promotion to the second level 320-2. The decrease may occur after access metadata 112-3 have been captured pertaining to the second-level address range {"0x662000", "0x662FFF"}. The decrease to the utility metrics 213-3 may trigger demotion of the access metadata entry 211-3 back to the lower level 320-1 of the data structure 310. Since access metadata entries 211 associated with nodes 311 at lower levels 320 of the data structure 310 cover smaller address ranges than access metadata entries 211 of nodes 311 within higher levels 320, demoting an upper-level access metadata entry 211 may include an inter-level split operation in which the upper-level node 311 associated with the access metadata entry 211 is split into a group of one or more lower-level nodes 311, each lower-level node 311 covering a smaller, lower-level address range within the larger address range covered by the upper-level node 311. In some aspects, an upper-level node 311 can be split into lower-level nodes 311 that span the address range covered by the upper-level node 311. An upper-level node 311 may be split into $2^{\wedge}B_{LST}$ lower-level nodes 311, where $B_{LST}$ is the number of bits included in the sub tag 304 of the lower level 320, and which determines the maximum number of unique nodes 311 of the lower level that can be associated with respective parent nodes 311 of the adjacent upper level 320. Alternatively, the upper-level node 311 of the access metadata entry 211 may be split based on, inter alia, access metadata 112 of the entry 211. An upper-level node 311 may be split into lower-level nodes 311 that cover selected portions of the address range covered by the upper-level node 311 as indicated by, inter alia, the access metadata entry 211 of the upper-level node 311. The management logic 226 can omit lower-level nodes 311 corresponding to: address ranges that have not been accessed within a time threshold (and/or at a threshold frequency), fail to satisfy an activity threshold, are associated with low utility metrics 213, are associated with poor prefetcher performance, and/or the like. The access metadata 112 of the upper-level entry 211 may be replicated in the lower-level entries 211. Alternatively, the access metadata 112 of respective lower-level entries 211 may be derived from corresponding portions of the access metadata 112 of the upper-level access metadata entry 211. The access metadata 112 of the lower-level entries 211 may incorporate access metadata 112 corresponding to portion(s) of the address range covered by the lower-level entry 211.

Figures 5, 6, 7:
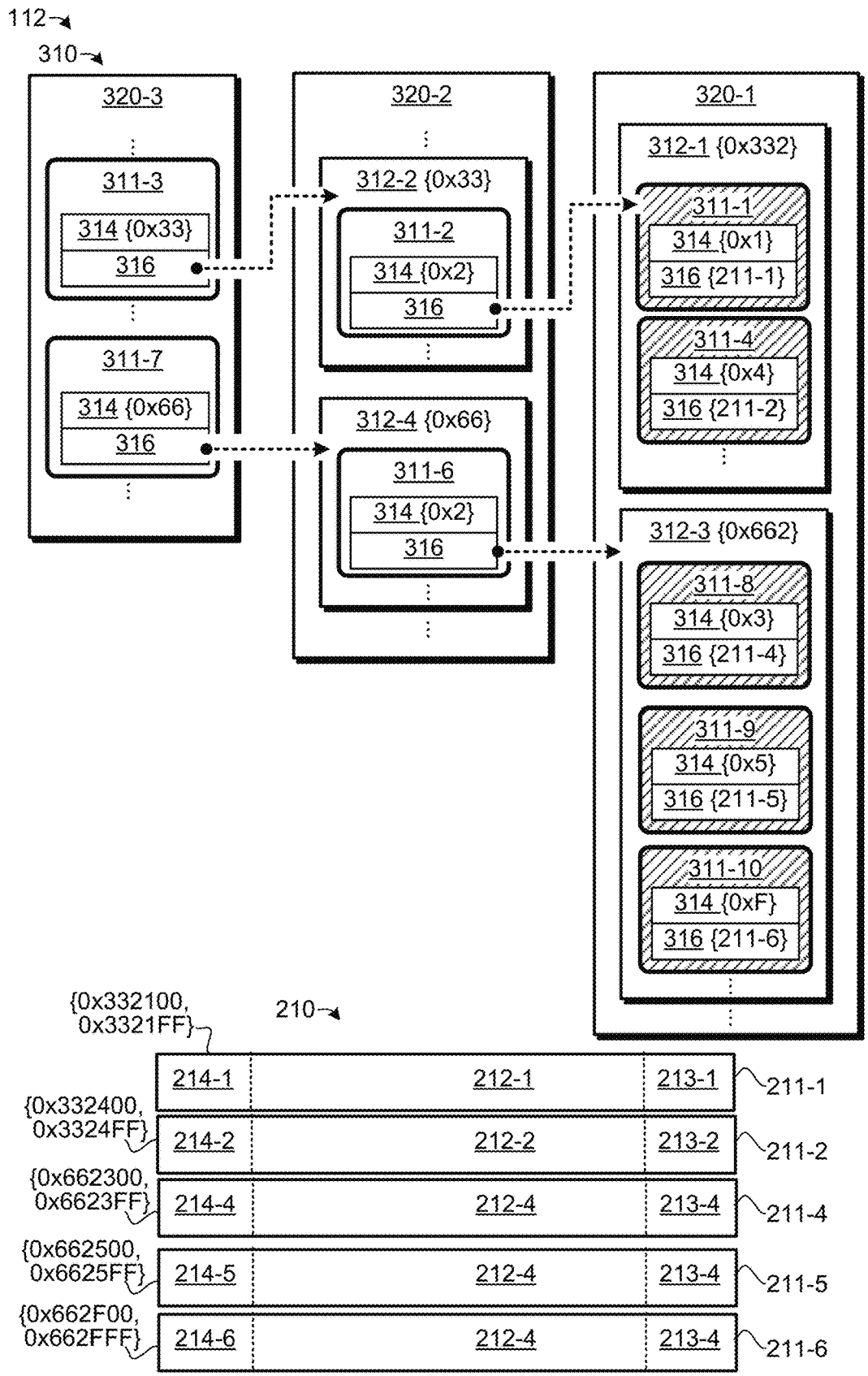

FIG. 5-7 illustrates operations to demote the access metadata entry 211-3 associated with the second-level node 311-6 as in FIG. 5-5 back to the first-level 320-1 of the data structure 310. The demotion operation may include an inter-level split operation in which the second-level node 311-6 associated within the access metadata entry 211-3 is split into one or more first-level child nodes 311, each covering a respective subset of the second-level address range covered by the second-level node 311-6. In some aspects, the access metadata entry 211-3 may be split into 16 lower-level entries 211, each covering a respective subset of the address range {"0x662000", "0x662FFF"} (per the 4-bit sub tag 304-1 of the lower level 320-1). In the example illustrated in FIG. 5-7, the access metadata entry 211-3 is split into three lower-level child nodes 311-8, 311-9, and 311-10, which may define address ranges covered by access metadata entries 211-4, 211-5, and 211-6, respectively. The address ranges may be determined based on access metadata 112-3 of the access metadata entry 211-3 (e.g., may correspond to active portions of the address range). As illustrated, access metadata entry 211-4 covers address range {"0x662300", "0x6623FF"}, entry 211-5 covers address range {"0x662500", "0x6625FF"}, and entry 211-6 covers address range {"0x662F00", "0x662FFF"}. The access metadata entry 211-3 may be invalidated and/or removed from the dataset 210 and the second-level node 311-6 is configured to reference the first-level child structure 312-3 comprising the child nodes 311-8 through 311-10 (transitions from occupied to open).

Referring back to FIG. 5-1, the management logic 226 of the adaptive tracking engine 110 can be further configured to identify and merge access metadata entries 211 that a) cover proximate address ranges and b) have similar utility metrics 213. As used herein, "proximate" address ranges refer to address ranges of the same or similar range size and are within a threshold distance of one another. In some aspects, proximate address ranges refer to address ranges covered by sibling nodes 311 of the data structure 310. Sibling nodes 311 refer to nodes 311 that are within the same level 320 of the data structure 310 and have a common parent in an adjacent upper level 320. In the FIG. 5-3 example, nodes 311-1 and 311-4 included within child structure 312-1 of level 320-1 are siblings of one another. The utility metrics 213-1 and 213-2 of the sibling entries 211-1 and 211-2 may trigger a merge operation by the management logic 226. As illustrated in FIG. 5-8, the merge operation may include merging the nodes 311-1 and 311-4 into the common parent node 311-2 of the siblings by: a) configuring a destination access metadata entry 211-7 of the merged entries 211-1 and 211-2 to cover the address range {"0x332000", "0x332FFF"} of the upper-level node 311-2, b) merging access metadata 112-1 and 112-2 of entries 211-1 and 211-2 into the destination entry 211-7, c) removing and/or invalidating the merged entries 211-1 and 211-2 and corresponding nodes 311-1 and 311-4 within the first level 320-1 of the data structure 310 (and the empty child structure 312-1), and/or d) configuring the coverage data 316 of the upper-level node 311-2 to include and/or reference access metadata entry 211-7.

Inter-level merge or promotion operations, such as the inter-level merge operation illustrated in FIG. 5-8, involve combining nodes 311 within a lower level 320 into a node within an upper level 320 of the data structure 310, which can result in a significant size increase. FIG. 5-9 illustrates an example of an intra-level merge and/or promotion operation implemented by the adaptive tracking engine 110 and/or management logic 226 in which nodes 311 are merged within the same level 320 of the data structure 310 (and/or the size of the address range covered by the node 311 and corresponding access metadata entry 211 are increased within the same level 320 of the data structure). In the FIG. 5-9 example, the first-level sibling nodes 311-1 and 311-4 are combined into a composite node 311-11 within the same level 320-1 of the data structure 310 (as opposed to a node 311 within the second level 320-2 of the data structure 310). The node tag 314 of the composite node 311-11 includes a plurality of values that span the node tags 314 of the merged nodes 311-1 and 311-4 (e.g., includes and/or spans "0x1" through "0x4"). The address range defined by the composite node 311-11, and the corresponding merged entry 211-8, therefore, spans the set of sub tags 304-1 "0x1" through "0x4" or {"0x332100", "0x3324FF"}. The example intra-level merge operation of FIG. 5-9 may result in more gradual size increases than inter-level merges. In some aspects, the management logic 226 implements intra-level merge operations until an intra-merge threshold is reached.

Although particular examples of manipulation operations are described, the disclosure is not limited in this regard. The management logic 226 could be configured to implement any suitable type of manipulation operation. The management logic 226 may be configured to implement inter-level demotion or split operations in which upper-level nodes 311 (and corresponding access metadata entries 211) are split into smaller lower-level nodes 311, as illustrated in FIG. 5-7. The management logic 226 may be further configured to implement intra-level demotion or split operations in which a composite node 311, and corresponding access metadata entry 211, is split into one or more smaller and/or non-composite nodes 311 within a same level 320 of the data structure 310.

FIG. 6 illustrates further examples of apparatus 600 for implementing adaptive address tracking and/or an adaptive tracking engine 110 (examples of adaptive address tracking apparatus 600). In some implementations, the access metadata entries 211 of the dataset 210 are maintained within the range management data structure 310. For example, access metadata entries 211 may be included in respective occupied nodes 311 of the data structure 310. Conversely, in the FIG. 6 example, the access metadata entries 211 of the dataset 210 are maintained separately from the data structure 310. As illustrated, the adaptive tracking engine 110 may include and/or be coupled to range tracking memory (a first memory 608) configured to store, maintain, and/or provide a dataset 210 comprising one or more access metadata entries 211. The first memory 608 may be configured as a range tracking memory and/or be configured to store and/or implement an access dataset 210, as disclosed herein. More specifically, the first memory 608 is configured to maintain a set of access metadata entries 211, each covering a respective address range. In the FIG. 6 example, the access metadata entries 211 include range metadata 214 that defines bounds of address ranges covered by the entries 211 (e.g., with minimum and maximum address values).

The adaptive tracking engine 110 may further include and/or be coupled to range management memory (a second memory 618) that maintains a range management data structure 310. The second memory 618 may be configured as a range management memory and/or be configured to implement a range management data structure 310.

In some aspects the first memory 608 is separate and/or independent of the second memory 618. The first memory 608 may be implemented and/or realized by memory components that are separate and/or independent of memory components that implement and/or realize the second memory 618.

As disclosed herein, the access dataset 210 may be frequently accessed and/or updated. Moreover, accesses to the dataset 210 may pertain to performance-sensitive components, such as memory I/O paths. Accordingly, the first memory 608 may be implemented, provided, and/or realized by high-performance memory resources, such as memory circuitry, semiconductor memory circuitry, memory array(s), memory bank(s), cache memory, cache line(s), SRAM, SDRAM, dedicated memory resources, on-board memory resources, and/or the like. The second memory 618 may not be as performance sensitive as the first memory 608 and, as such, may be implemented, provided, and/or realized by other memory resources, such as memory resources of a host device 102, main memory, backing memory 108, memory resources of a consumer 115 and/or source 215, DRAM, and/or the like.

The first memory 608 may include and/or be coupled to first logic 624. The first logic 624 is coupled to the interface 222 and first memory 608. The first logic 624 may be configured to provide access to entries 211 of the dataset 210. The first logic 624 may implement an interface of the access metadata 112 (and/or first memory 608). The first logic 624 may be further configured to update access metadata of respective entries 211 in response to commands 201 pertaining to addresses 202 within address ranges covered by the respective entries 211 (e.g., may include and/or implement update logic 224). In the FIG. 6 example, the first logic 624 further includes and/or is coupled to search logic 625 configured to lookup entries 211 corresponding to specified addresses 202 in response to, inter alia, commands 201 pertaining to the addresses 202, requests from consumers 115 such as prefetch logic 515, feedback 204 pertaining to access metadata 112 covering the addresses 202, and/or the like. The search logic 625 may be configured to implement fast, low-overhead search operations within the access dataset 210 maintained within the first memory 608. The search logic 625 may be configured to implement search and/or lookup operations without accessing the data structure 310 and/or second memory 618. The search and/or lookup operations implemented by the search logic 625 may involve comparing addresses 202 and/or address tags 302 to range metadata 214 of respective entries 211. The search logic 625 may implement direct, single-level comparisons as opposed to hierarchical search operations within respective levels 320 of the data structure 310. The search logic 625 can include compare logic configured to compare addresses 202 (and/or address tags 302) to minimum and/or maximum address bounds covered by respective entries 211 (as defined by the range metadata 214 of the entries 211). The search logic 625 may be configured to compare addresses 202 (and/or address tags 302) to range metadata 214 of a plurality of entries 211 at least partially in parallel. The first logic 624 (and/or search logic 625 thereof) may be provided, implemented, and/or realized in hardware. The search logic 625 may include a hardware search engine and/or hardware search circuitry coupled to the first memory 608. In some examples, the first logic 624 (and/or search logic 625 thereof) is implemented by use of on-board logic components of the first memory 608, such as PIM circuitry and/or the like. In some implementations, the search logic 625 is integrated with the first memory 608. The search logic 625 may be implemented within a chip and/or substrate of the first memory 608. Alternatively, or in addition, the hardware search engine and/or hardware search circuitry of the search logic 625 may be implemented within a same package or module as the first memory 608, or the like.

The adaptive tracking engine 110 may further include and/or be coupled to second logic 626. The second logic 626 may be coupled to the first memory 608, second memory 618 and/or interface 222. The second logic 626 may include and/or be coupled to management logic 226 configured to, inter alia, manage entries 211 of the access dataset 210 by and/or through the data structure 310 maintained within the second memory 618. In some examples, the second logic 626 (and/or management logic 226 thereof) is included and/or coupled to the second memory 618. The second logic 626 (and/or management logic 226 thereof) may also be coupled to the first memory 608 and may be configured to create, remove, invalidate, modify, and/or otherwise manage entries 211 of the dataset 210. As disclosed in further detail herein, the management logic 226 may be configured to implement the modifications performed on the data structure 310 within the access dataset 210 by, inter alia, configuring entries 211 of the dataset 210 to cover address ranges defined by corresponding nodes 311 of the data structure 310.

The data structure 310 may be constructed in accordance with configuration data 524, as disclosed herein. In the FIG. 6 example, the management logic 226 constructs a data structure 310 comprising N levels 320-1 through 320-N, each level 320 assigned a respective sub tag 304 and corresponding to a respective range size of a plurality of range sizes. The levels 320-1 through 320-N may be organized in a hierarchy corresponding to range size with the first level 320-1 corresponding to the smallest range size of the plurality of range sizes at the bottom of the hierarchy and the last level 320-N corresponding to the largest range size at the top of the hierarchy. Region schemes 322 of respective levels 320 of the data structure define the sub tags 304, region tags 332, and/or region offsets 331 of the levels 320 based on the position of the respective levels 320 within the hierarchy, which, inter alia, define the range sizes of the respective levels 320.

Nodes 311 of the data structure may include a node tag 314, status data 616, an entry reference 621, a child reference 631, and/or the like. The status data 616 of a node 311 indicates whether the node 311 references an access metadata entry 211 or a child structure 312 within a lower level 320 of the data structure 310. The status data 616 may, therefore, indicate whether the node 311 is occupied or open, as disclosed herein. The status data 616 may be further configured to indicate whether the node 311 references a valid access metadata entry 211 and/or a valid child structure 312. The entry reference 621 of a node 311 can reference an access metadata entry 211 of the dataset 210 maintained within the first memory 608. Nodes 311 maintained within the second memory 618 can reference entries 211 maintained within the first memory 608 using any suitable information including, but not limited to: reference values, index values, pointers values (pointers to locations within the first memory 608), memory addresses, address offsets, and/or the like. The child reference 631 of a node 311 can include and/or reference a child structure 312 within a lower level 320 of the data structure 310. The child reference 631 may be omitted from nodes 311 within the first level 320-1 of the data structure 310.

In the FIG. 6 examples, nodes 311 of the data structure 310 further include utility metrics 213, which may quantify a utility of the address ranges covered thereby, as disclosed herein. The utility metrics 213 of occupied nodes 311 may quantify the utility of the entry 211 referenced by the node 311 (or utility of capturing access metadata 112 covering the address range defined by the node 311) in terms of prefetch performance. Utility metrics 213 of open nodes 311 that do not directly reference entries 211 may be empty. Alternatively, the utility metrics 213 of open nodes may be configured to quantify the utility of children of the node 311. The utility metrics 213 of open nodes 311 may include an average, mean, or other combination of utility metrics 213 of occupied child nodes 311 of the open node 311.

As disclosed herein, the management logic 226 encodes address range relationships within the data structure 310. The management logic 226 encodes address range containment relationships through parent-child relations between nodes 311, wherein address ranges covered by upper-level parent nodes 311 contain the address ranges covered by the lower-level child nodes 311. Sibling relationships between nodes 311 that are within the level 320 and share the same upper-level parent node 311 in the adjacent upper-level 320 of the data structure 310 cover address ranges contained within the upper-level address range covered by the parent node 311. More specifically, sibling nodes 311 (and corresponding entries 211) cover respective subsets within the upper-level parent address range.

In the FIG. 6 example, the management logic 226 requires leaf nodes 311 to be occupied. Therefore, each node 311 within the lowest level 320-1 references an access metadata entry 211 and nodes that do not reference valid entries 211 are removed. Similarly, nodes 311 within upper-levels 320 of the data structure 310 that do not reference either a valid access metadata entry 211 or child structure 312 are removed. In some aspects, the management logic 226 requires that each node 311 within a lower level 320 of the data structure 310 (a level 320 other than the top level 320-N) has a single, unique parent node 311 in an upper adjacent level 320 and is included in a child structure 312 referenced by the parent node 311. The nodes 311 within the child structures 312 may be indexed and/or referenced by the node tags 314 thereof. The nodes 311 within the top level 320-N of the data structure 310 may be indexed and/or referenced by the node tags 314 thereof in a similar manner (e.g., as if included in a same or common child structure 312). The sibling nodes 311 within respective child structures 312 may be uniquely identified by the sub tag values recorded in the node tag 314 thereof. The lower-level sibling nodes 311 of respective upper-level parent nodes 311 may, therefore, cover distinct subsets of the address ranges covered by the respective upper-level parent nodes 311. However, the node tags 314 of nodes 311 that have different parent nodes 311 and, as such, are included in different child structures 312 may have the same value (the address ranges of such nodes 311 cannot overlap since, inter alia, the nodes 311 have different parents and, as such, are contained within different address ranges).

The management logic 226 can adjust the address ranges covered by the access metadata 112 by modifying the data structure 310 and implementing the modifications within the access dataset 210. As disclosed herein, the management logic 226 may modify the range size of one or more entries 211 of the dataset 210 by, inter alia, implementing manipulation operations within the data structure 310, which may include, but are not limited to: merge operations, inter-level merge operations, intra-level merge operations, split operations, inter-level split operations, intra-level split operations, removal operations, promotion operations, inter-level promotion operations, intra-level promotion operations, demotion operations, inter-level demotion operations, intra-level demotion operations, and/or the like. Implementing the manipulation operations may include propagating modifications made within the data structure 310 to the access dataset 210, which may include, but is not limited to: modifying the address range covered by one or more access metadata entries 211, increasing the size of the address range covered by one or more entries 211, decreasing the size of the address ranges covered by one or more entries 211, removing and/or invalidating one or more entries 211, and/or the like. The management logic 226 can adjust the range size of one or more entries 211 based, at least in part, on utility metrics 213 of the entries 211, as disclosed herein.

The management logic 226 can be configured to evaluate utility metrics 213 and implement corresponding modifications to address ranges covered by the access metadata 112 (if any) in background operations. The background operations may be configured to utilize idle resources available to the adaptive tracking engine 110. Background operations may be suspended, paused and/or terminated during and/or in response to foreground operations. Foreground operations may include, but are not limited to: receiving commands 201 (and/or indications of commands 201) at the interface 222, updating the access metadata 112 in response to the commands 201, updating utility metrics 213 in response to feedback 204 (and/or commands 201), receiving requests for access metadata 112 from a consumer 115, providing access metadata 112 to consumers 115, transmitting access metadata 112 to consumers 115, and/or the like. The background operations may be resumed and/or restarted when idle resources become available and/or when foreground operations have been completed. The management logic 226 can implement background scan operations to evaluate utility metrics 213 and implement corresponding modifications to the address ranges covered by the access metadata 112 in background scan operations implemented periodically, at specified intervals, during idle periods, and/or the like. The background scan operations may include traversing nodes 311 of the data structure 310 (and/or corresponding entries 211 of the dataset 210) to identify entries 211 for demotion, promotion, merge (related entries 211), and/or the like.

The management logic 226 can be further configured to remove and/or invalidate nodes 311 of the data structure 310. Nodes 311 within the first level 320-1 of the data structure 310 may be removed and/or invalidated in demotion and/or split operations. The management logic 226 may remove a first-level node 311 in response to determining that utility metrics 213 of the first-level node 311 are below a threshold (and/or have remained below the threshold for a determined period of time). Removing a first-level node 311 may further include removing the entry 211 referenced by the first-level node 311 from the dataset 210. In some examples, the management logic 226 may determine that the address range covered by a node 311 is not suitable for prefetching. As disclosed herein, some address ranges may be unsuitable for prefetching and/or certain prefetch techniques. Unsuitable address ranges may exhibit poor prefetch performance over time and under different range sizes. The management logic 226 may identify unsuitable address ranges and, in response, record no-track metadata 612 identifying address ranges are unsuitable for prefetching. In some examples, the no-track metadata 612 includes one or more entries (no-track entries 611), each identifying a respective no-track address range. The no-track metadata 612 may be recorded within the access metadata 112 and/or made available to consumers 115, such as the prefetch logic 515. The prefetch logic 515 can use the no-track metadata 612 to avoid implementation of prefetch operations within unsuitable address ranges. Similarly, the management logic 226 can use the no-track metadata 612 to prevent tracking the unsuitable address ranges in response to subsequent tracking misses. The no-track metadata 612 may be maintained within one or more of the dataset 210, range management data structure 310, and/or other portion of the access metadata 112. In the FIG. 6 example, the management logic 226 is configured to maintain no-track metadata 612 within the access dataset 210. The no-track metadata 612 may include one or more no-track entries 611, each configured to identify a respective address range. The no-track entries 611 may identify unsuitable address ranges by any suitable mechanism. In some examples, the no-track entries 611 include timestamps and/or other information indicating the time at which the no-track entry 611 was created. The management logic 226 may clear no-track entries 611 when one or more conditions are met (when the workload within the address range is likely to have changed), such as after a determined time period, after restart or shutdown operations, and/or the like. Alternatively, or in addition, the management logic 226 may be configured to maintain no-track metadata 612 within the data structure 310. The management logic 226 may represent unsuitable address regions using nodes 311 that are marked with no-track indicators (e.g., marked as no-track within the status data 616, entry reference 621, child reference 631, utility metrics 213, and/or other fields of the node 311).

FIG. 7 illustrates further examples of apparatus 700 for implementing adaptive tracking and/or an adaptive tracking engine 110. In the FIG. 7 example, the second logic 626 of the adaptive tracking engine 110 includes and/or is coupled to adaptation logic 726. The adaptation logic 726 utilizes the management logic 226 to adjust the set of address ranges covered by the access metadata 112 in order to, inter alia, improve prefetch performance. The adaptation logic 726 may determine modification operations to implement within the dataset 210 based, at least in part, on utility metrics 213 of the access metadata 112.

In some aspects, the adaptation logic 726 is configured to build the access metadata 112 from an initial or initialized state in which the dataset 210 and/or data structure 310 are substantially empty. The adaptation 726 can build the access metadata 112 in accordance with the configuration data 524, which may define modification operations to implement in response to tracking misses. In some examples, the configuration data 524 specifies that tracking misses are handled by adding minimum-sized entries 211 to the access dataset 210, which may include configuring the management logic 226 to: modify the data structure 310 to add a node 311 that covers the address 202 associated with the tracking miss to the lowest level 320-1 of the data structure 310, and implement the modifications within the dataset 210, by creating an entry 211 that covers the address range defined by the node 311 to the dataset 210 maintained within the first memory 608 and configuring the coverage data 316 of the node 311 to reference the entry 211. In another example, the configuration data 524 may specify that tracking misses are handled by adding a larger-sized entry 211 to the dataset 210, which may include configuring the management logic 226 to create a node 311 covering the address 202 within a higher level 320 of the data structure 310 and implement the modifications within the dataset 210, as disclosed herein (e.g., configure an access metadata entry 211 of the dataset 210 to cover the address range defined by the node 311).

The adaptation logic 726 may be further configured to tune, adjust and/or optimize the set of address ranges covered by the access metadata 112 in background operations. The adaptation logic 726 can adapt the address ranges and/or range sizes covered by entries 211 of the access dataset 210 to, inter alia, improve prefetch performance. The adaptation logic 726 may implement operations involving manipulation of the data structure 310 within the dataset 210 by use of the management logic 226, as disclosed herein.

The adaptation logic 726 can adjust the address ranges and/or range sizes of the access metadata 112 in accordance with an adaptation policy of the configuration data 524. In one example, the adaptation policy may configure the adaptation logic 726 to demote entries 211 determined to have utility metrics 213 that are below a threshold (e.g., a specified demotion threshold). The adaptation logic 726 may select entries 211 for demotion or other modifications by, inter alia, scanning the access metadata 112, which may include: traversing nodes 311 of the data structure 310 (and/or entries 211 referenced thereby), scanning entries 211 of the dataset 210, and/or the like. The adaptation logic 726 may be configured to implement background scan operations (and implement corresponding address range adjustments) periodically, at specified intervals, during idle periods, and/or the like.

As disclosed herein, demoting a selected entry 211 associated with an upper-level node 311 of the data structure 310 may include: demoting the upper-level node 311 from occupied to open, creating one or more lower-level child nodes 311 that cover respective subsets of the address range covered by the upper-level node 311, assigning entries 211 of the dataset 210 to the lower-level child nodes 311, importing access metadata 112 of the selected entry 211 into the designated entries 211, and removing and/or invalidating the selected entry 211. Demoting an entry 211 within the lowest level 320-1 of the data structure 310 may include removing and/or invalidating the node 311 from the data structure 310, removing and/or invalidating the corresponding entry 211 from the dataset 210, and/or the like. The demotion operation may further include recording a no-track indication in the access metadata 112, which may prevent the adaptive tracking engine 110 from attempting to track the address range in response to a subsequent tracking miss, as disclosed herein.

In yet another example, the adaptation policy configures the adaptation logic 726 to promote access metadata entries 211 determined to have utility metrics 213 that exceed a threshold (e.g., exceed a specified promotion threshold). As disclosed herein, promoting an entry 211 may include increasing the size of the address range covered by the entry 211. The adaptation logic 726 may select entries 211 (and/or corresponding nodes 311) for promotion during background scan operations, as disclosed herein. The adaptation logic 726 may implement operations to promote entries 211 by use of the management logic 226. The management logic 226 can promote an entry 211 through manipulation of the data structure 310. The adaptation logic 726 may configure the management logic 226 to implement: inter-level promotion operations in which entries 211 are promoted from lower levels 320 of the data structure 310 to upper levels 320, intra-level promotion operations (inter-level merge operations) in which entries 211 are expanded to include additional address ranges within the same level 320 of the data structure 310 (e.g., by manipulating composite nodes 311 of the data structure 310), and/or the like. An inter-level merge operation to merge an entry 211 associated with a lower-level node 311 into a parent node 311 in a high level 320 of the data structure 310 may include: merging the entries 211 of the child nodes 311 of the parent node 311 into a destination entry 211, removing and/or invalidating the entries 211 of the child nodes 311 from the dataset 210, removing the child nodes 311 from the data structure 310, and configuring the parent node 311 to reference the destination entry 211 (designating the parent node 311 as occupied rather than open).

In another example, the adaptation logic 726 is configured to merge selected groups of related access metadata entries 211. The adaptation policy may define related entries 211 as entries 211 that: a) cover address ranges within a proximity threshold (and/or have a same range size), and b) have utility metrics 213 within a utility threshold. The adaptation logic 726 can identify groups of related entries 211 in response to background scan operations, as disclosed herein. The adaptation logic 726 can merge an identified group of entries 211 by use of the management logic 226 (e.g., by configuring the management logic 226 to implement a merge operation, inter-level merge operation, intra-level merge operation, and/or the like).

The adaptation logic 726 may be further configured to adjust, tune, and/or optimize an access metadata configuration 725 of the adaptive tracking engine 110. As used herein, the access metadata configuration 725 of the adaptive tracking engine 110 refers to information pertaining to the configuration of the access metadata 112 being captured and/or maintained by the adaptive tracking engine 110. The access metadata configuration 725 may correspond to the set of address ranges covered by the access metadata 112 and/or a configuration of the dataset 210, such as the number of access metadata entries 211 included in the dataset 210, the set of address ranges covered by the access metadata entries 211, and so on. Alternatively, or in addition, the access metadata configuration 725 may include information pertaining to the data structure 310, which, as disclosed herein, may define the set of address ranges covered by the access metadata entries 211 of the dataset 210. The adaptation logic 726 may adjust the access metadata configuration 725 by: a) determining, monitoring, adjusting, and/or otherwise maintaining utility metadata 723 for the access metadata configuration 725, and b) implementing modification operations to modify the access metadata configuration 725 based, at least in part, on the utility metadata 723. The utility metadata 723 of the access metadata configuration 725 may be based, at least in part, on utility metrics 213 of the access metadata entries 211 of the dataset 210 (and/or utility metrics 213 of corresponding nodes 311 of the data structure 310). Determining the utility metadata 723 may include, but is not limited to: averaging, weighting, aggregating, incorporating, and/or otherwise combining utility metrics 213 of the access metadata entries 211 (and/or corresponding nodes 311). In some examples, the utility metrics 213 may be weighted by address range size with utility metrics 213 corresponding to larger address range sizes being weighted more heavily than utility metrics 213 that correspond to smaller address range sizes (e.g., utility metrics 213 associated with respective nodes 311 may be multiplied by a weighting factor assigned to the level 320 of the data structure 310 in which the respective nodes 311 are disposed). Alternatively, or in addition, the utility metrics 213 may be weighted in accordance with activity level, with utility metrics 213 corresponding to address ranges having higher levels of activity (e.g., higher request frequency, prefetch activity, or the like) being weighted more heavily than utility metrics corresponding to address ranges having lower levels of activity. Activity levels of respective access metadata entries 211 may be determined based on the quantity and/or frequency of commands 201 pertaining to addresses 202 covered by the respective entries 211 (and/or corresponding nodes).

In some examples the adaptation logic 726 implements an iterative tuning process, wherein each iteration may include, but is not limited to: a) determining utility metadata 723 for the access metadata configuration 725 of the adaptive tracking engine 110, b) evaluating an adaption function or model (e.g., optimization function or model) to determine a utility quantity for the access metadata configuration 725, and c) determining whether to modify the access metadata configuration 725 based, at least in part, on the utility quantity. The objective function may be defined by, inter alia, the adaptation policy of the configuration data 524. The objective function may be configured to balance a utility of the access metadata configuration 725 (as quantified by the utility metadata 723) with costs associated with the access metadata configuration 725, which may be quantified in terms of memory overhead, computational overhead, latency overhead, complexity, memory overhead of the dataset 210, memory overhead of the access metadata entries 211 of the dataset 210 (e.g., within the first memory 608), quantity of entries 211 included in the dataset 210, memory overhead of the data structure 310 (e.g., within the second memory 618), quantity of nodes 311 and/or child structures 312 included in the data structure 310, complexity of the data structure 310, and/or the like.

The adaptation logic 726 can determine modifications to the access metadata configuration 725 that, based on the adaptation function or model, will improve utility of the address tracking engine 110 (e.g., result in increased utility metrics 213 and/or decreased cost). The adaptation logic 726 may implement iterations of the optimization process in background operations. The adaptation logic 726 may continue to iterative optimization process until one or more termination criteria are satisfied, such as converging to an optimal access metadata configuration 725, converging to a local optimum, converging to stable set of access metadata configuration 725, reaching an iteration threshold, or the like. Alternatively, or in addition, the adaptation logic 726 may be configured to periodically implement iterations of the optimization process and/or resume the optimization process in response to changing workload conditions, which may result in, inter alia, decreased utility metrics 213 within one or more address ranges of the access metadata configuration 725. The adaptation logic 726 may be configured to implement any suitable optimization process, algorithm, technique, or model including, but not limited to: gradient descent, steepest descent, conditional gradient, stochastic gradient descent, heuristic algorithms (e.g., memetic, evolutionary, differential evolution, genetic, dynamic relaxation, hill climbing, particle swarm, and/or the like), ML optimization, and/or the like.

Although FIG. 7 illustrates adaptation logic 726 implemented in example apparatus 600 in which entries 211 of the access dataset 210 and the data structure 310 are maintained in separate memory resources the disclosure is not limited in this regard and could incorporate the adaptation logic 726 and/or functionality thereof into other implementations, such as implementations in which access metadata entries 211 of the dataset 210 are included in respective nodes 311 of the data structure 310 as illustrated in FIG. 3.

Figures 5, 6, 7, 8, 9:
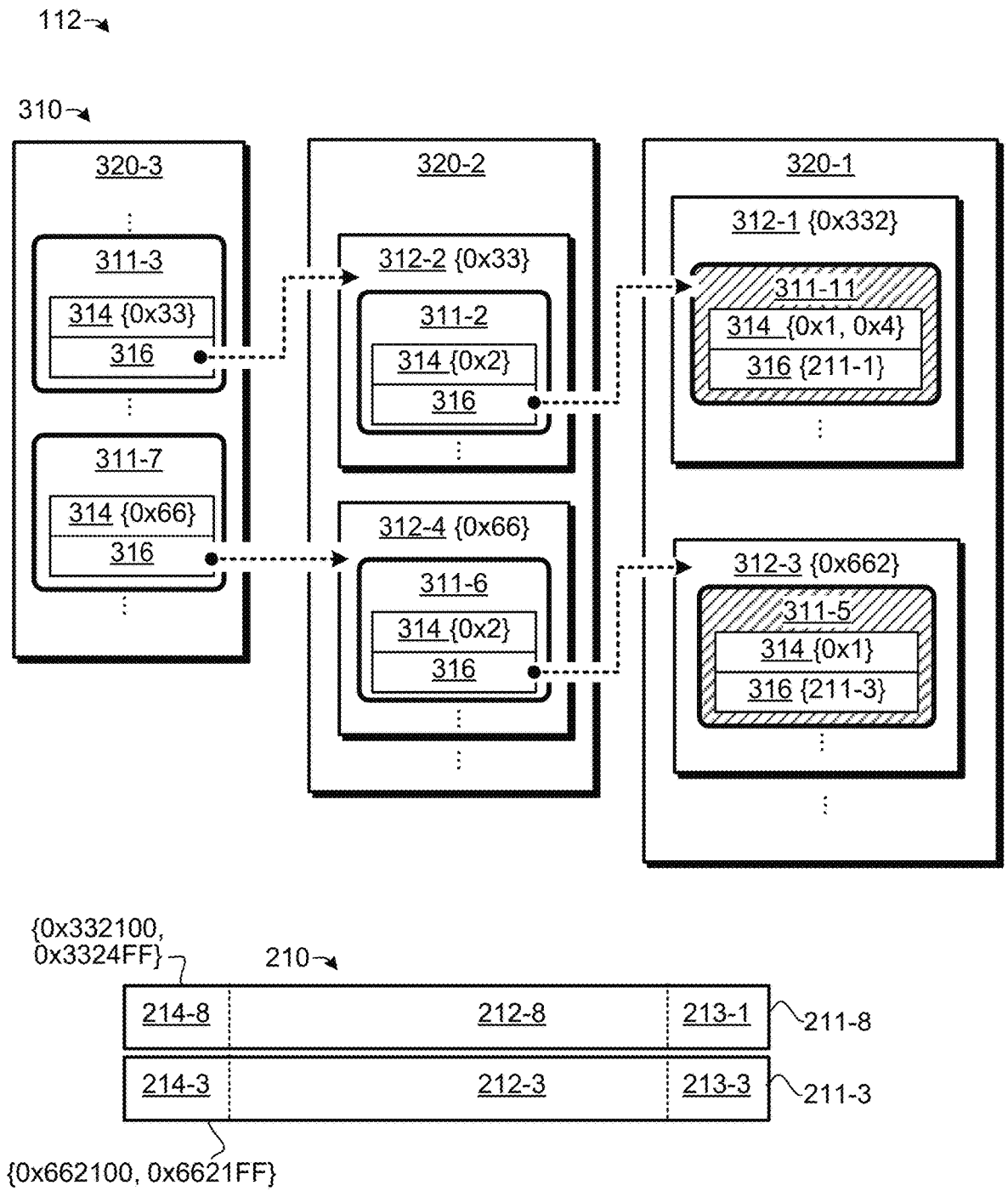
Figure 6:
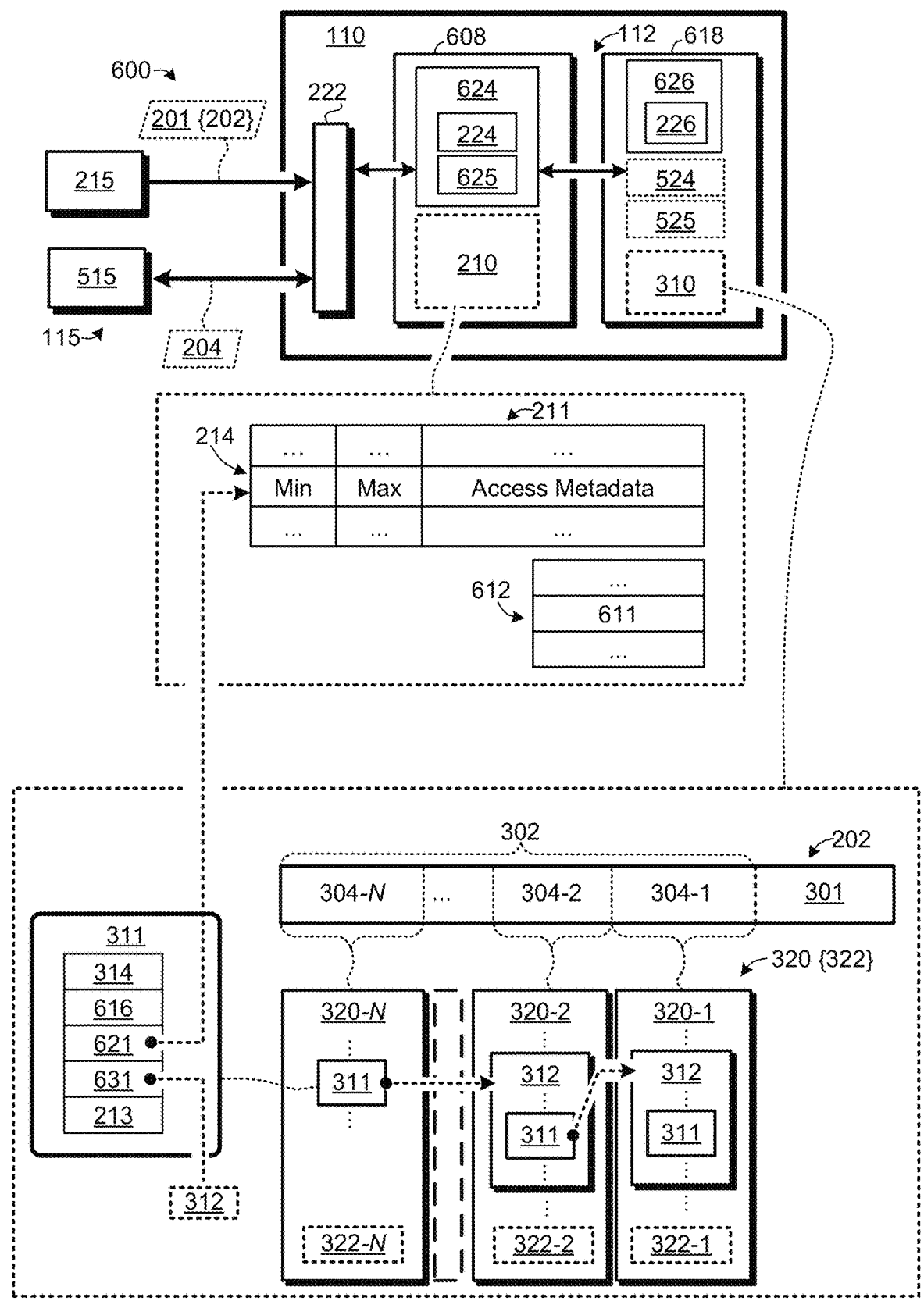
Figure 7:
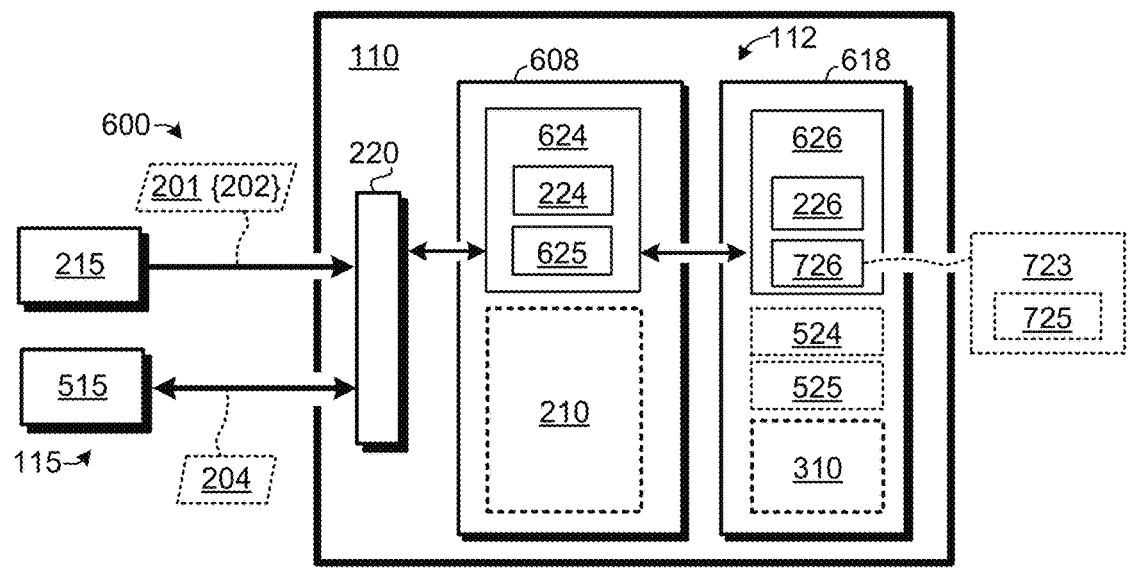
Figure 8:
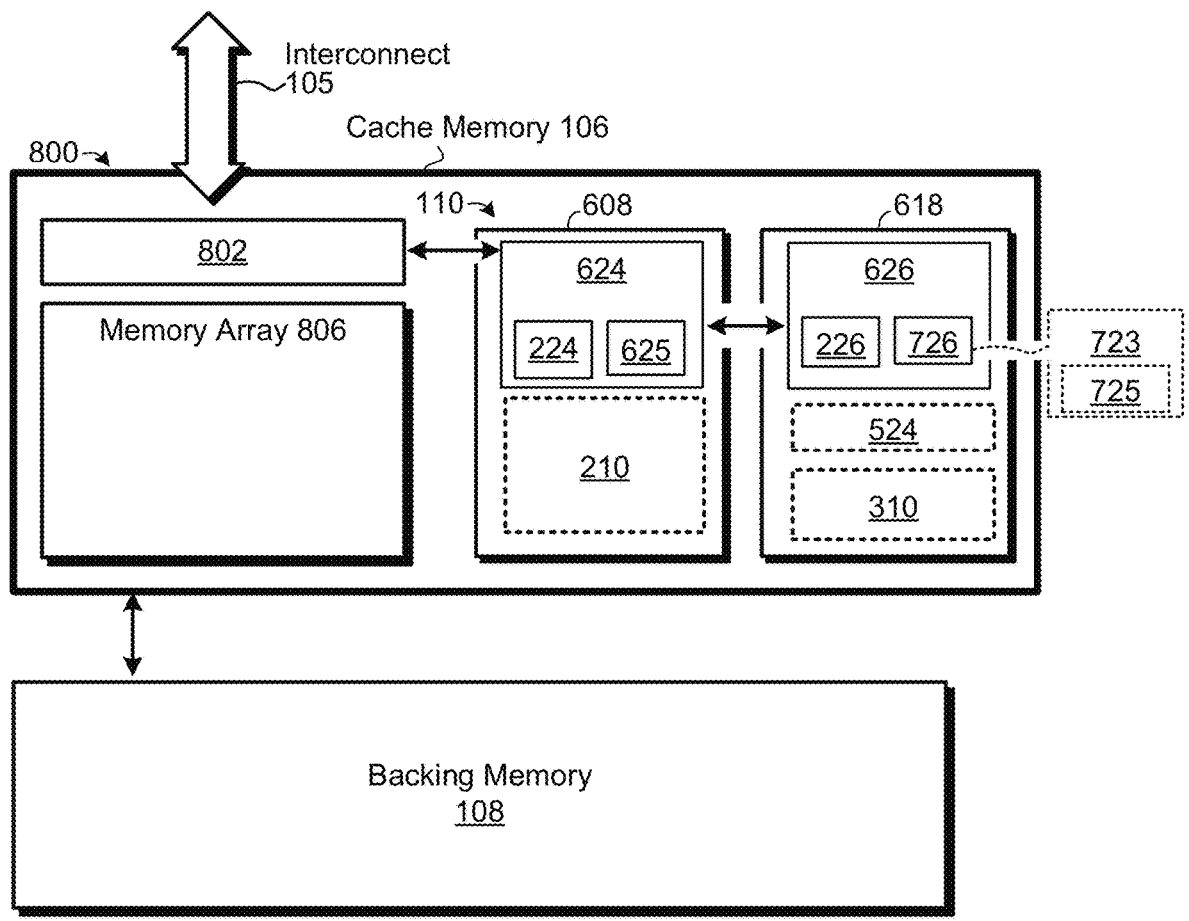

FIG. 8 illustrates further examples of apparatus 800 for implementing adaptive address tracking. In the FIG. 8 example, the adaptive tracking engine 110 is coupled to and/or included within a cache memory 106 that includes, inter alia, cache logic 802 and a memory array 806. The adaptive tracking engine 110 includes and/or is coupled to a first memory 608 configured as access metadata 112 and/or an access dataset 210. In some examples, the first memory 608 is implemented by and/or within the memory array 806. The first memory 608 may be implemented within a dedicated region of the memory array 806. The search logic 625 may also be implemented by and/or within the memory array 806 (as PIM circuitry or the like).

The adaptive tracking engine 110 further includes a second memory 618 configured as a range management data structure 310 and management logic 226. In some examples, the second memory 618 is implemented by and/or within the memory array 806. Alternatively, the second memory 618 may be implemented by and/or within other memory resources, such as the backing memory 108, on-board memory, DRAM, or the like. The management logic 226 configures the data structure 310 to define a plurality of range sizes, each range size corresponding to a respective one of the levels 320 of the data structure 310. The adaptive tracking engine 110 captures access metadata 112 pertaining to address regions covered by respective entries 211 of the dataset 210, as disclosed herein. The entries 211 can be updated in response to cache requests, such as cache hits, cache misses, and/or the like.

The cache memory 106 may be configured to cache addresses pertaining to a backing memory 108 within the memory array 806. The cache logic 802 may be configured to load addresses into the memory array 806 in response to, inter alia, cache misses. The cache logic 802 may be further configured to prefetch addresses within respective address ranges based, at least in part, on access metadata 112 covering the respective address ranges maintained within entries 211 of the dataset 210. The cache logic 802 can implement any suitable prefetch technique and/or prefetcher type including, but not limited to: a stride prefetcher, a correlation prefetcher, an ML prefetcher, and/or the like. In some implementations, a stride prefetcher implemented by the cache logic 802 uses access metadata 112 covering respective address ranges to, inter alia, detect stride patterns within the respective address ranges. In other implementations, a correlation prefetcher implemented by the cache logic 802 uses access metadata 112 covering respective address ranges to, inter alia, detect delta correlations and/or delta sequences within the respective address ranges. Alternatively, or in addition, an ML prefetcher, such as an LSTM prefetcher, uses access metadata 112 to develop ML models within respective address ranges covered and/or applies the access metadata 112 covering respective address ranges to ML models corresponding to the respective address ranges.

The cache logic 802 can be further configured to provide feedback pertaining to prefetch performance within the address ranges of the respective entries 211. The management logic 226 uses the feedback to determine utility metrics 213 for respective entries 211 (and/or corresponding nodes 311 of the data structure 310). The apparatus 800 further includes an adaptation logic 726 that adjusts range sizes and/or address ranges covered by the entries 211 to improve prefetch performance, as disclosed herein.

Example Methods for Adaptive Address Tracking

Example methods are described in this section with reference to the flow charts and flow diagrams of FIGS. 9 through 15. These descriptions reference components, entities, and other aspects depicted in FIGS. 1 through 8 by way of example only. FIG. 9 illustrates with a flow diagram 900 example methods for an apparatus to implement adaptive address tracking. The flow diagram 900 includes blocks 902 to 906. In some implementations, a host device 102 (and/or component thereof) can perform one or more operations of the flow diagram 900. Alternatively, or in addition, one or more of the operations may be performed by a memory, memory controller, PIM logic, cache memory, cache logic, prefetch logic, an embedded processor, and/or the like. At 902, the adaptive tracking engine 110 receives commands 201 (and/or indications of commands 201) pertaining addresses of a memory address space, such as commands 201 to retrieve, modify, manipulate and/or otherwise access data associated with the addresses 202. The commands 201 may be received and/or acquired from a source 215, such as a processor 103, memory controller 104, interconnect 105, cache memory 106, cache prefetch logic, prefetcher, and/or the like. For example, the commands 201 may correspond to memory I/O workloads produced by programs operating on a processor 103 of the host 102 as the programs access respective regions of the memory address space.

At 904, access metadata 112 pertaining to the commands 201 received at 902 are stored within a memory (e.g., a memory 208, first memory 608, or the like). The access metadata 112 may be stored within a dataset 210 comprising one or more entries 211 responsive to the commands 201, with each entry 211 of the dataset 210 covering an address range of the memory address space and comprising access metadata 112 pertaining to addresses within the covered address range. The access metadata 112 maintained within an entry 211 may include any information pertaining to the address range covered by the entry 211, which may include, but is not limited to: information pertaining to accesses within the covered address range, access statistics, access pattern statistics, access history, access sequences, access frequency metadata, access time metadata, access pattern metadata, stride patterns, correlation patterns, delta sequences, access modeling metadata, ML modeling metadata, ML feature data, and/or the like. The access metadata 112 may be maintained and/or updated in response to any suitable type of command 201 including, but not limited to: data access requests, read requests, write requests, copy requests, clone requests, trim requests, erase requests, delete requests, cache misses, cache hits, and/or the like.

At 906, management logic 226 adjusts the size of an address range covered by at least one of the entries 211 of the dataset 210 based, at least in part, on one or more metrics 214 indicative of prefetch performance within address ranges covered by one or more entries 211 of the dataset 210. In some examples, the adaptive tracking engine 110 provides access metadata 112 to prefetch logic 515, which uses the access metadata 112 to inform prefetch operations within the address ranges covered by the access metadata 112. The prefetch logic 515 can be further configured to provide feedback 204 regarding prefetch performance within the address ranges, such as the number of useful prefetches performed within the address range, a ratio of useful prefetches to bad prefetches, and/or the like. At 906 the address ranges covered by entries 211 having relatively high prefetch performance may be increased whereas the address ranges covered by entries 211 having relatively low prefetch performance may be decreased (and/or low performing entries 211 may be removed). At 906, the set of address ranges defined by the data structure 310 may be modified by, inter alia, manipulating one or more nodes 311 thereof. The entries 211 of the dataset 210 may be configured to implement the modified set of address ranges. The address range covered by an entry 211 may be modified by writing one or more bits to the first memory 608 (writing bits to modify range metadata 214 of the entry 211).

FIG. 10 illustrates with a flow diagram 1000 further examples of methods for an apparatus to implement adaptive address tracking. At 1002, management logic 226 of the adaptive tracking engine 110 represents address ranges of a memory address space by nodes 311 within respective levels 320 of a data structure 310, each level 320 corresponding to one of a plurality of address range sizes. The management logic 226 may be further configured to encode parent-child relationships within the data structure 310, the parent-child relationships between nodes 311 at different levels 320 of the data structure representing address range containment relationships between the nodes 311. The management logic 226 may also encode respective sibling relationships within the data structure 310 in which nodes 311 having same respective parent nodes 311 in an upper level 320 of the data structure 310 represent subsets of the same respective larger, upper-level address range represented by the respective parent nodes 311. Sibling nodes 311 of same parent nodes 311 may be organized within child structures 312 in which the sibling nodes 311 are indexed by sub tag values (e.g., by contents of a node tag 314). The management logic 226 may be further configured to implement the set of address ranges defined by the data structure 310 within a dataset 210 comprising access metadata entries 211, as disclosed herein.

At 1004, update logic 224 of the adaptive tracking engine 110 captures and/or maintains access metadata 112 within respective entries 211 of a dataset 210, each entry 211 of the dataset 210 associated with a respective node 311 of the data structure 310 and covering an address range represented by the associated node 311. The update logic 224 may be configured to update the access metadata 112 in response to commands 201 pertaining to addresses 202 of the address space. At 1004, a command 201 is received and, in response, the update logic 224 maps the address 202 pertaining to the command 201 to an entry 211 of the dataset 210 and updates access metadata of the entry 211 accordingly. At 1004, the adaptive tracking engine 110 may be further configured to provide access metadata 112 pertaining to specified address ranges to a consumer 115, such as a cache, cache memory, cache control logic, cache prefetch logic, prefetch logic, a prefetcher, or the like, which may use the access metadata 112 to implement prefetch operations within the specified address ranges and provide feedback pertaining to prefetch performance and/or utility within the specified address ranges. The feedback may be used to determine prefetch utility metrics (utility metrics 213) for respective access metadata entries 211 of the dataset 210, as disclosed herein.

At 1006, the management logic 226 modifies the data structure 310 based, at least in part, on prefetch utility metrics of access metadata entries 211, nodes 311, and/or corresponding address ranges of the dataset 210. The management logic 226 may implement modifications to: modify the size of one or more address ranges, increase the size of one or more address ranges, promote one or more entries 211 to a higher-level 320 of the data structure, demote one or more entries 211 to a lower-level 320 of the data structure, merge one or more entries 211 (and/or corresponding nodes 311), split one or more entries 211 (and/or corresponding nodes 311), and so on. The modifications to the data structure 310 may be adapted to improve prefetch performance. The modifications may include decreasing the size of entries 211 having utility metrics 213 below a decrease threshold, increasing the size of entries 211 having utility metrics 213 above an increase threshold, combining sibling entries 211 having utility metrics 213 within a proximity threshold, and/or the like. The management logic 226 may implement the modifications of 1006 by, inter alia, manipulating nodes 311 of the data structure 310. The manipulations may be implemented in accordance with the hierarchical address containment relationships of the data structure 310 such that the modified set of address ranges defined by the modified data structure 310 are distinct from each other.

At 1008, the management logic 226 updates the address range covered by at least one of the entries 211 of the dataset 210 responsive to modifying the data structure 310. The management logic 226 may be configured to propagate the modifications implemented within the data structure 310 at 1006 within the access metadata entries 211 of the dataset 210. More specifically, the management logic 226 can link entries 211 of the dataset 210 with occupied or leaf nodes 311 of the data structure 310 and configure the entries 211 to cover the address ranges defined by the associated nodes 311 after modifications.

Figure 11:
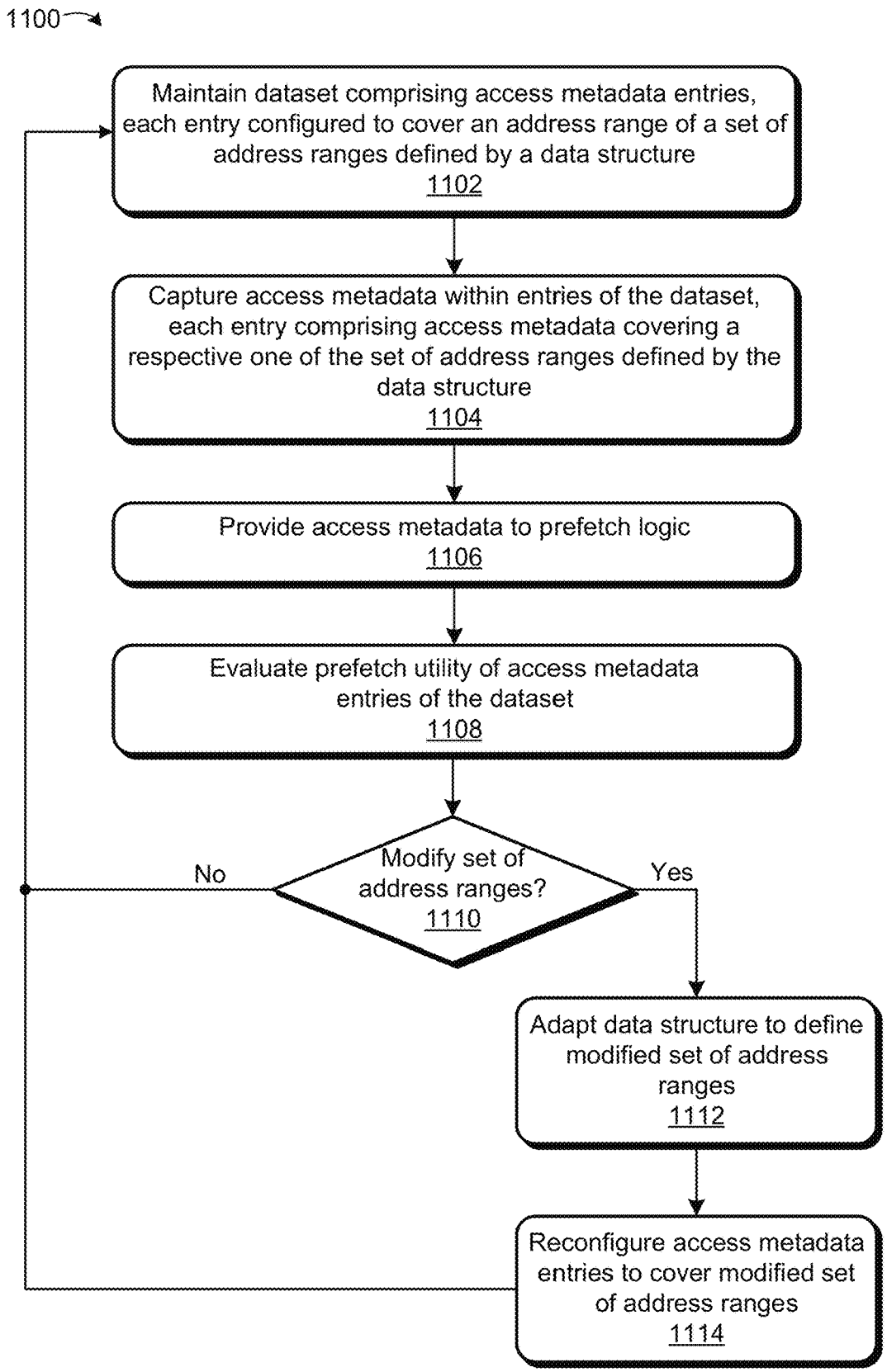
FIG. 11 illustrates an example flowchart depicting operations for modifying address ranges and/or address range sizes covered by access metadata of an adaptive tracking engine.

FIG. 11 illustrates with a flow diagram 1100 further examples of methods for an apparatus to implement adaptive address tracking. At 1102, management logic 226 maintains a dataset 210 comprising access metadata entries 211, each entry 211 configured to cover an address range of a set of address ranges defined by a data structure 310. The management logic 226 may be configured to build the data structure 310 and corresponding dataset 210 from an initialized state in which the data structure 310 and dataset 210 are substantially empty. The management logic 226 may be further configured to add nodes 311 to the data structure 310 and corresponding entries 211 to the dataset 210 in response to tracking misses (e.g., in response to commands 201 and/or requests for access metadata 112 pertaining to addresses 202 not covered by entries 211 of the access dataset 210). In some implementations, the access dataset 210 is maintained within a first memory 608 and the data structure 310 is maintained within a second memory 618 that is separate from and/or independent of the first memory 608.

At 1104, update logic 224 of the adaptive tracking engine 110 captures access metadata 112 within entries 211 of the dataset 210. The access metadata 112 may be captured in response to commands 201 pertaining to addresses 202 of the address space. At 1104, respective entries 211 of the dataset 210 are updated in response to commands 201 pertaining to addresses 202 within address ranges covered by the respective entries 211.

At 1106, an interface 222 of the adaptive tracking engine 110 provides access metadata 112 (and/or portions thereof) to prefetch logic 515. The prefetch logic 515 may utilize the access metadata 112 to inform prefetch operations within address ranges covered by the access metadata 112. The prefetch logic 515 may implement prefetch operations within address ranges covered by respective entries 211 based on and/or by use of access metadata 112 of the entries 211. The prefetch logic 515 may be further configured to return feedback 204 pertaining to prefetch utility with respective address ranges, which may be used to determine, update, and/or revise utility metrics 213 of respective entries 211 of the dataset 210.

At 1108, the update logic 224 evaluates a prefetch utility of respective access metadata entries 211 of the dataset 210. The prefetch utility of an entry 211 may indicate whether the size of the address range covered by the entry 211 is suitable for capturing access metadata 112 from which access patterns can be derived. Low prefetch utility may indicate that the address range is not suitably sized and/or should be demoted to a smaller size, whereas high prefetch utility may indicate that the address range is suitably sized and/or should be promoted to a larger size.

At 1110, the management logic 226 (or adaptation logic 726 thereof) determines whether to modify the set of address ranges defined by the data structure 310 (and implemented by entries 211 of the dataset 210). At 1110, prefetch utility of the entries 211 (e.g., utility metrics 213) may be compared to one or more thresholds: entries 211 having utility metrics 213 below a first threshold may be selected for demotion, entries 211 having utility metrics 213 above a second threshold may be selected for promotion, related nodes 311 having utility metrics 213 within a threshold may be selected for merge operations, and so on. In some implementations, the adaptation logic 726 evaluates an adaptation function (e.g., an objective function of an optimization model) to determine, inter alia, whether to modify the set of address ranges covered by the access metadata 112. The evaluation may include determining a fitness quantity configured to balance prefetch performance provided by the access metadata 112 captured within the set of address ranges to costs associated with the access metadata 112. The costs may be quantified in terms of overhead, resource consumption, prefetch cost, and/or the like. The evaluation may include determining to modify the set of address ranges in accordance with an optimization algorithm, such as gradient descent or the like.

If the determination at 1110 is to modify the set of address ranges, the flow continues at 1112; otherwise, the flow continues at 1102. At 1112, the management logic 226 adapts the data structure 310 to define a modified set of address ranges. The management logic 226 may define the modified set of address ranges by implementing one or more manipulation operations within the data structure 310, which may include, but are not limited to: merge operations, inter-level merge operations, intra-level merge operations, split operations, inter-level split operations, intra-level split operations, removal operations, promotion operations, inter-level promotion operations, intra-level promotion operations, demotion operations, inter-level demotion operations, intra-level demotion operations, and/or the like. The manipulation operations may be configured to improve prefetch utility of the access dataset 210 by demoting entries 211 having relatively low utility metrics 213, promoting entries 211 having relatively high utility metrics 213, and so on.

At 1114, the management logic 226 reconfigures the access metadata entries 211 of the dataset 210 to cover the modified set of address ranges defined by the data structure 310 and the flow may continue at 1102. In some implementations, portions of 1108 through 1114 may be implemented in background operations. The background operations may be implemented during idle periods and/or by use of idle resources available to the adaptive tracking engine 110. The management logic 226 may suspend, pause, and/or terminate the background operations when resources are needed to implement foreground operations, as disclosed herein.

Figures 1, 12:
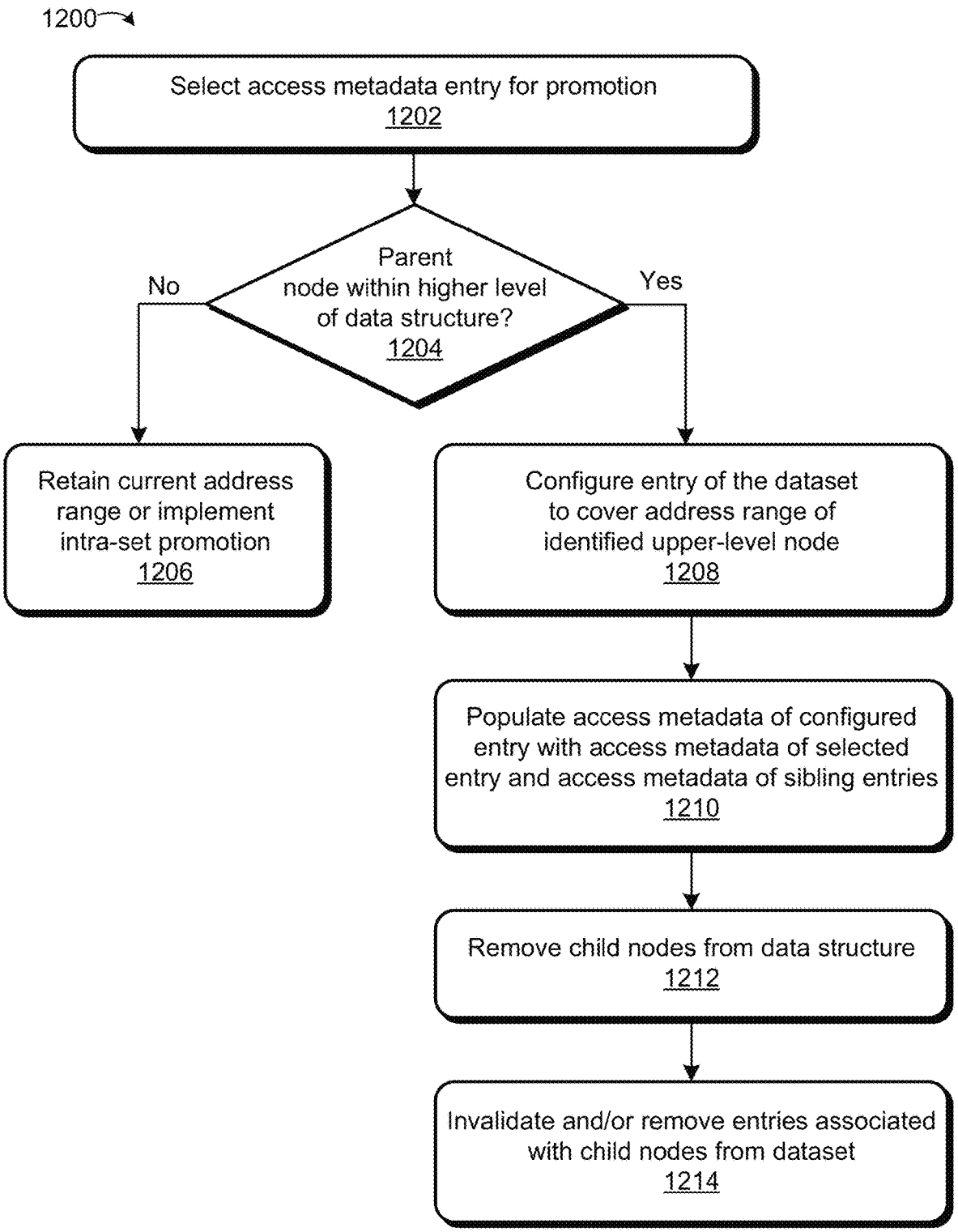
Figures 2, 12:
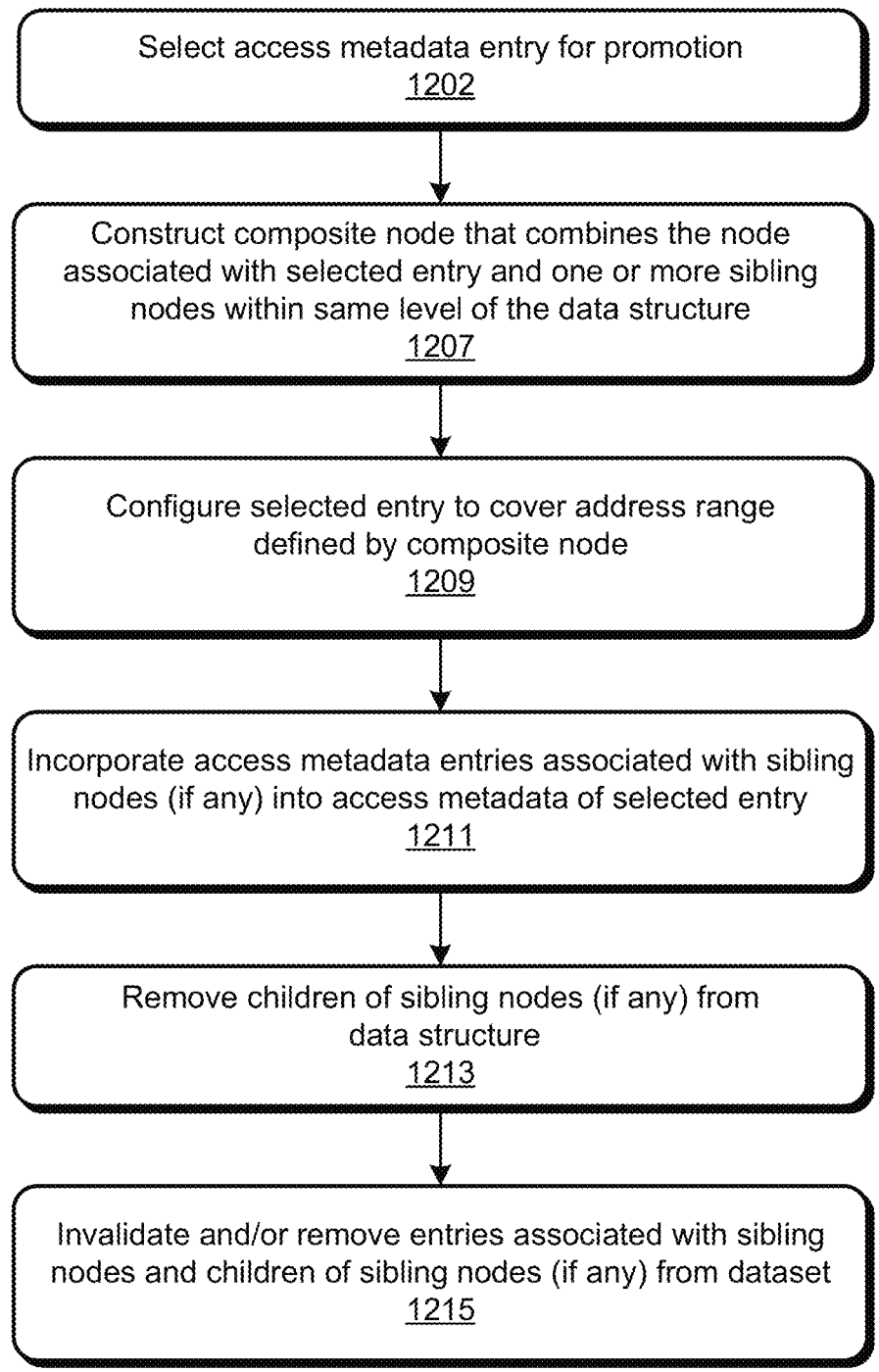

FIG. 12-1 illustrates with a flow diagram 1200 examples of methods for increasing the size of one or more address ranges covered by access metadata entries 211 of the dataset 210, as disclosed herein (e.g., promoting an entry 211 of the dataset 210). At 1202, an access metadata entry 211 of the dataset 210 is selected for promotion. The entry 211 may be selected for promotion based on utility metrics 213 of the entry 211, which may indicate relatively high prefetch performance within the address range covered by the entry 211. The entry 211 may be selected in response to determining that utility metrics 213 of the entry 211 exceed one or more thresholds.

At 1204, management logic 226 of the adaptive tracking engine 110 determines whether the node 311 associated with the selected entry 211 has a parent within a higher level of the data structure 310. The management logic 226 may determine whether the node 311 is disposed within the last, highest level 320-N of the data structure 310 or in a lower level 320 of the data structure (e.g., within one of level 320-N-1 through level 320-1). If the selected entry 211 is associated with a node 311 within the highest-level 320 of the data structure 310, the flow continues at 1206; otherwise, the flow continues at 1208. At 1206, the current address range of the selected entry 211 may be retained (unchanged). Alternatively, the address range of the selected entry 211 may be expanded through an intra-level promotion operation (examples of intra-level promotion operations disclosed in further detail in conjunction with FIG. 12-2).

At 1208, the management logic 226 configures a designated entry 211 of the dataset 210 to cover the address range defined by the upper-level node 311 identified at 1204 (the parent of the node 311 associated with the selected entry 1202). The designated entry 211 may be configured to cover a larger address space than the address space covered by the selected entry 211. The address space covered by the designated entry 211 may contain the address space covered by the selected entry 211.

At 1210, access metadata 112 of the designated entry 211 is populated with access metadata 112 of the selected entry 211 and access metadata 112 of siblings of the selected entry 211 (if any). The sibling entries 211 may be identified as entries 211 associated with sibling nodes 311 of the node 311 associated with the selected entry. The management logic 226 may merge the selected entry 211 and the sibling entries 211 (if any) into the designated entry 211 associated with the higher-level node 311 (e.g., effectively promote the lower-level address range covered by the selected entry 211 to a larger, higher-level address range).

At 1212, the management logic 226 removes children of the upper-level node 311 from the data structure 310. At 1214, the management logic 226 invalidates and/or removes entries associated with the child nodes 311 from the dataset 210.

FIG. 12-2 illustrates with a flow diagram 1201 further examples of methods for increasing the size of one or more address ranges covered by access metadata entries 211 of the dataset 210 (e.g., promoting an entry 211). At 1202, an access metadata entry 211 of the dataset 210 is selected for promotion, as disclosed herein. At 1207, the management logic 226 configures a composite node 311 that combines the nodes 311 associated with the selected entry 211 with one or more sibling nodes 311 within a same level 320 as the node 311 within the data structure 310. The composite node 311 may be configured to cover address ranges corresponding to a plurality of sub tag values of the level. The node tag 314 of the composite node 311 may, therefore, include a plurality of sub tag values (as opposed to a single sub tag value of a non-composite node 311). In some implementations, the management logic 226 assigns contiguous sub tag values to composite nodes 311.

At 1209, the management logic 226 configures the selected entry 211 to cover the address range defined by the composite node 311. At 1211, the management logic 226 incorporates access metadata of entries associated with the sibling nodes 311 merged into the composite node 311 at 1207 (if any) into the access metadata 112 of the selected entry 211. At 1213, children of the sibling nodes 311 (if any) are removed from the data structure. At 1215, entries 211 associated with the sibling nodes 311 (if any) are invalidated and/or removed from the dataset 210.

Figures 1, 13:
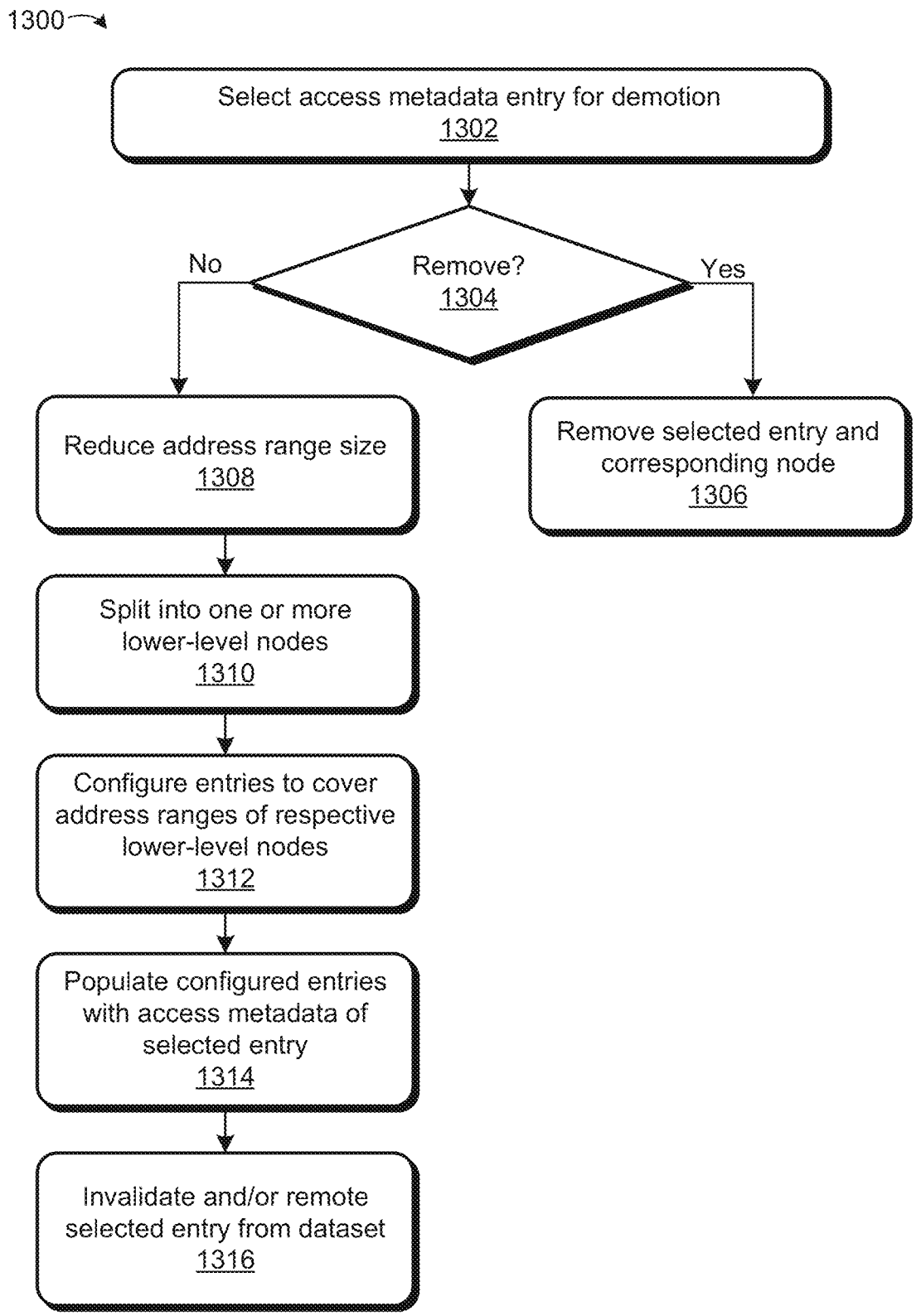
Figures 2, 13:
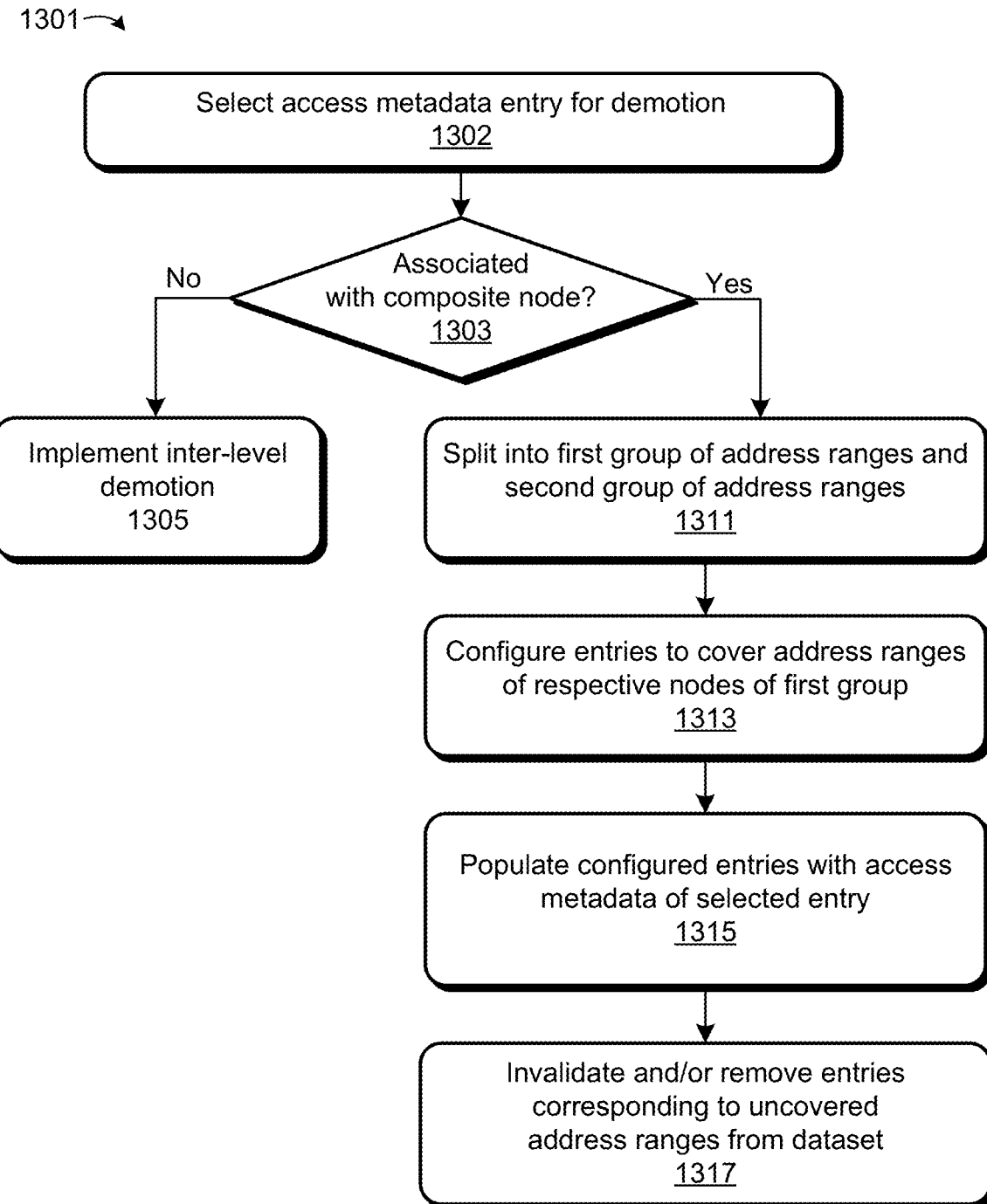

FIG. 13-1 illustrates with a flow diagram 1300 examples of methods for reducing the size of an address range covered by access metadata 112. FIG. 13-1 illustrates examples of inter-set demotion or split operations. At 1302, an access metadata entry 211 of the dataset 210 is selected for demotion. The entry 211 may be selected for demotion based on utility metrics 213 of the entry 211, which may indicate poor prefetch performance within the address range covered by the entry 211. The entry 211 may be selected for demotion in response to determining that utility metrics 213 of the entry fail to satisfy one or more thresholds.

At 1304, the management logic 226 determines whether the identified node 311 currently associated with the selected entry 211 is disposed within the first or lowest level 320-1 of the data structure 310. If so, the flow continues at 1306; otherwise, the flow continues at 1308. At 1306, the identified node 311 is removed from the data structure 310 and the corresponding entry 211 is invalidated and/or removed from the dataset 210. At 1306, the management logic 226 can be further configured to designate the address range covered by the entry 211 as a no-track address range, which may prevent the adaptive tracking engine 110 from tracking the address range in response to subsequent tracking misses. The no-track designation may be included in access metadata 112 provided to consumers 115, such as prefetch logic 515, which may prevent the prefetch logic 515 from attempting to implement prefetch operations within the address range.

At 1308, the management logic 226 implements manipulation operations to reduce the size of the covered address range. In the example illustrated in FIG. 13-1, the management logic 226 implements an inter-level demotion operation that includes, at 1310, splitting the identified node 311 into a group of one or more nodes 311 within a lower-level 320 of the data structure 310 (child nodes 311), each node of the group configured to cover a respective subset of the address range covered by the identified node 311. In some implementations, the group of nodes 311 are configured to cover the address range of the selected entry 211. Alternatively, the group of nodes 311 may be configured to cover selected portions of the address range based on, inter alia, access metadata of the selected entry 211. The group of nodes 311 may be configured to cover portions of the address range determined to be relatively more active and/or correspond to relatively higher utility metrics 213 than other portions of the address range. The group of nodes 311 may be organized into a child structure 312 referenced by the identified node 311. The identified node 311 may, therefore, transition from occupied to open.

At 1312, the management logic 226 configures access metadata entries 211 of the dataset 210 to cover address ranges defined by respective nodes 311 of the group of nodes 311 (and associates the configured entries 211 with corresponding nodes 311 of the group). At 1314, the management logic 226 populates access metadata 112 of the configured entries 211 with access metadata 112 of the selected entry 211. At 1316, the selected entry 211 is invalidated and/or removed from the dataset 210.

FIG. 13-2 illustrates with a flow diagram 1301 examples of methods for reducing the size of an address range covered by an access metadata entry 211 associated with a composite node 311 of the data structure 310. More specifically, FIG. 13-2 illustrates examples of intra-set demotion or split operations. At 1302, an access metadata entry 211 of the dataset 210 is selected for demotion, as disclosed herein. At 1303, the management logic 226 determines whether the selected entry 211 is associated with a composite node 311. If not, the flow continues at 1305 where an inter-level demotion is implemented; otherwise, the flow continues at 1311.

At 1311, the management logic 226 splits the address range covered by the composite node 311 into a first group and a second group, the first group including subsets of the address range to be covered by the access metadata 112 and the second group including subsets of the address range to be excluded from coverage within the access metadata 112. The first group may be distinguished from the second group based, at least in part, on access metadata of the selected entry 211. The first group may include address ranges that have relatively higher activity levels and/or are associated with relatively higher utility metrics 213 than the second group of address ranges. The management logic 226 may be further configured to create nodes 311 configured to represent respective address ranges of the first group within the same level 320 of the data structure 310 as the composite node 311.

At 1313, the management logic 226 configures entries 211 of the dataset 210 to cover respective address ranges of the first group of address ranges (and corresponding nodes 311). At 1315, configured entries 211 are populated with access metadata of the selected entry 211. At 1317, the management logic 226 invalidates and/or removes entries 211 corresponding to the second set of address ranges from the dataset 210. The management logic 226 may be further configured to remove the composite node 311 from the data structure 310 and invalidate and/or remove the selected entry 211 from the dataset 210.

Figure 14:
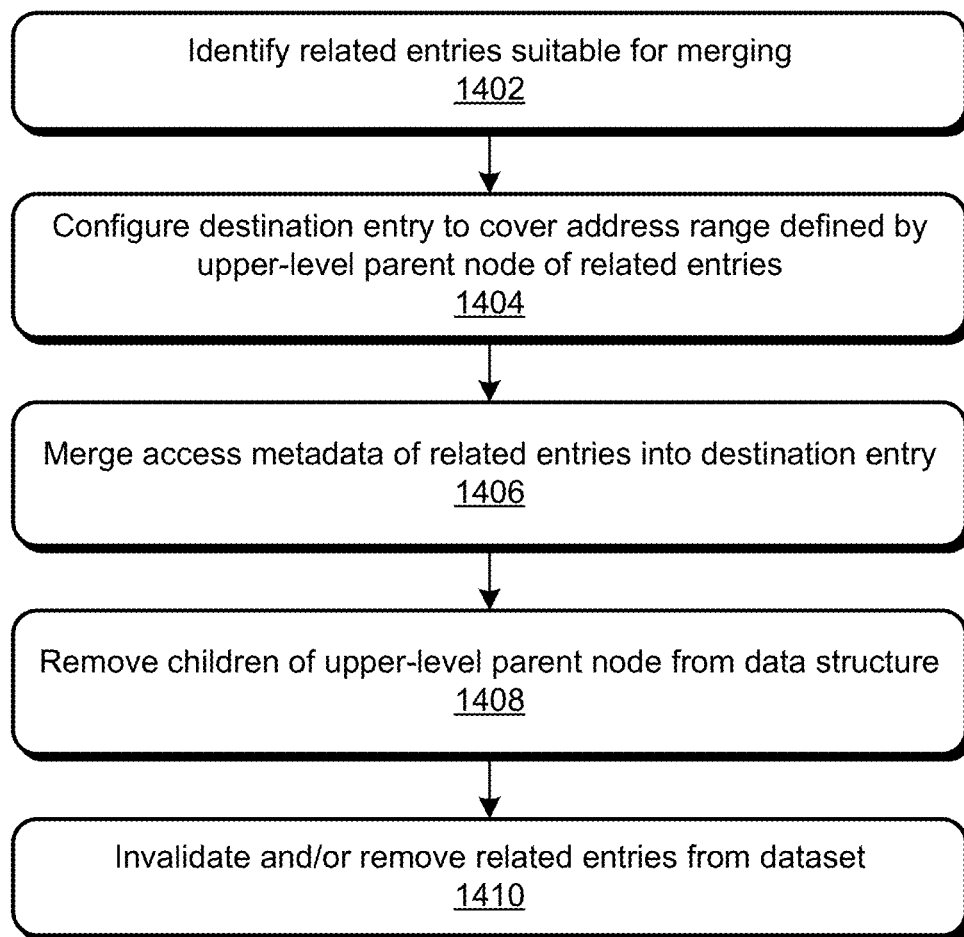
FIG. 14 illustrates an example flowchart depicting operations for merging related access metadata entries of an adaptive tracking engine.

FIG. 14 illustrates an example flowchart depicting operations for merging related access metadata entries of an adaptive tracking engine. At 1402, management logic 226 of the adaptive tracking engine 110 identifies related entries 211 of the dataset 210 that are suitable for merging. As disclosed herein, related entries 211 refer to entries 211 that are siblings. More specifically, the sibling or related entries 211 include entries 211 that are associated with nodes 311 that are a) disposed within the same level 320 of the data structure 310 and b) have a same upper-level parent node 311. Related entries 211 that are suitable for merging refer to related entries 211 that have similar utility metrics 213 to one another (e.g., have utility metrics 213 that differ by less than a threshold). The related entries 211 may be identified in background scan operation(s), as disclosed herein.

At 1404, the management logic 226 configures a destination entry 211 to cover the address range defined by the upper-level parent node 311 of the identified entries 211. At 1406, access metadata of the related entries 211 are merged into the access metadata of the destination entry 211 (e.g., by averaging, aggregating, and/or otherwise combining the access metadata of the related entries 211 into the destination entry 211). At 1408, the management logic 226 removes children of the upper-level parent node 311 from the data structure 310, including nodes 311 associated with the related entries 211 identified at 1402 (and children of the related entries 211, if any). At 1410, entries 211 associated with the children of the upper-level parent node 311 are invalidated and/or removed from the dataset 210, as disclosed herein.

FIG. 15 illustrates with a flow diagram 1500 further examples of methods for an apparatus to implement adaptive address tracking. At 1502 first logic 624 of the adaptive tracking engine 110 configures a first memory 608 to store access metadata 112 pertaining to an address space within entries 211 of a dataset 210.

At 1504, the first logic 624 updates access metadata of respective entries 211 of the dataset 210 in response to commands 201 pertaining to addresses covered by address ranges of the respective entries 211. In response to a command 201 pertaining to an address 202, the first logic 624 may utilize search logic 625 to lookup an access metadata entry 211. The search logic 625 may be implemented in hardware and may be capable of comparing the addresses 202 (and/or portions thereof) to a plurality of entries 211 of the dataset 210 at least partially in parallel. At 1504, the first logic 624 may be further configured to provide the access metadata 112 and/or portions thereof to a consumer 115, such as prefetch logic 515. The prefetch logic 515 may utilize the access metadata 112 to inform prefetch operations within address ranges covered by the access metadata 112 and return feedback 204 indicating a utility of the prefetch operations performed within respective address ranges.

At 1506, second logic 626 of the adaptive tracking engine 110 maintains a data structure 310 within a second memory 618, the data structure 310 configured to define a set of address ranges covered by entries 211 of the dataset 210 maintained within the first memory 608, each entry 211 of the dataset 210 associated with a respective node 311 of the data structure 310 that defines the address range covered by the entry 211 within the access dataset 210.

At 1508, the second logic 626 modifies the set of address ranges covered by the access dataset 210 maintained within the first memory 608 based, at least in part, on utility metrics of respective entries 211 of the dataset 210. The second logic 626 can include management logic 226 that alters the data structure 310 within the second memory 618 to, inter alia, modify the address ranges defined thereby, and propagates the modifications to the access dataset 210 maintained within the first memory 608. The management logic 226 can reconfigure access metadata entries 211 of the dataset 210 to cover respective address ranges of the modified set of address ranges defined by the altered data structure 310. The flow may continue with the first logic 624 updating access metadata 211 in response to commands 201 pertaining to addresses 202 covered by respective address ranges of the modified set of address ranges (at 1504) and the interface 222 providing the access metadata 112 (and/or portions thereof) to consumers 115, such as prefetch logic 515 that utilizes the access metadata 112 to implement prefetch operations within address ranges covered by respective access metadata entries 211 and provides feedback pertaining to the prefetch utility of the respective entries 211.

Figure 16:
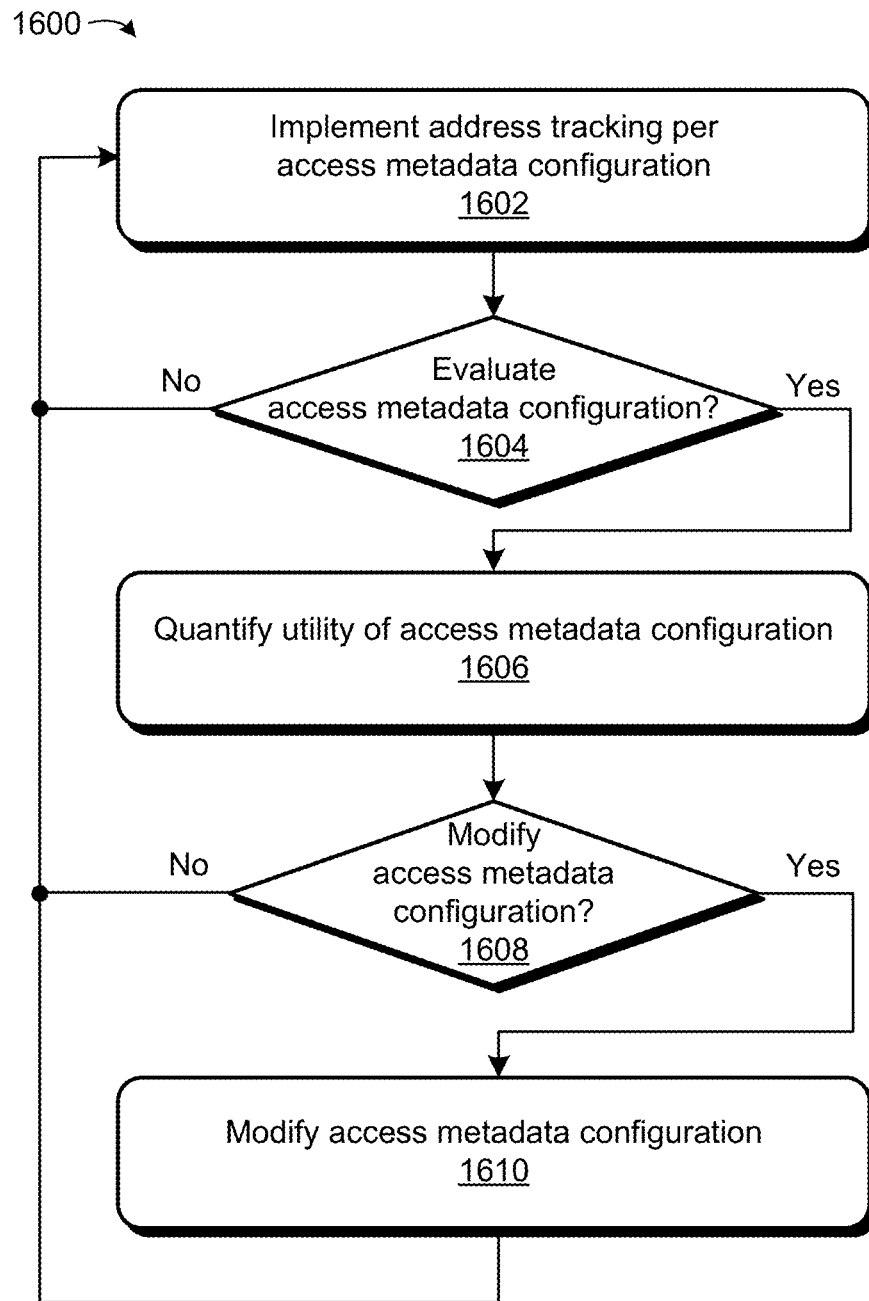
FIG. 16 illustrates an example flowchart depicting operations for adapting address range sizes covered by access metadata for improved prefetch performance.

FIG. 16 illustrates with a flow diagram 1600 operations for adapting address range sizes covered by access metadata by example implementations of an adaptive tracking engine 110. Adapting the address range sizes may include adjusting the set of address ranges covered by the access metadata 112 (and/or respective entries 211 of the dataset 210). At 1602, the adaptive tracking engine 110 implements address tracking, as disclosed herein. At 1602, update logic 224 of the adaptive tracking engine 110 captures, updates, and/or otherwise maintains access metadata 112 within respective entries of a dataset 210 in response to, inter alia, commands 201 pertaining to addresses 202 covered by the respective entries 211. The set of address ranges covered by the access metadata entries 211 may be defined by a data structure 310, as disclosed herein. Management logic 226 of the adaptive tracking engine 110 creates nodes 311 within the data structure 310 in response to tracking misses and encodes relationships between respective nodes 311 to represent relationships between address ranges covered by the respective nodes 311 at 1602. In some implementations, utility metrics 213 of respective entries 211 of the dataset 210 (and/or corresponding nodes 311 of the data structure 310) are determined, updated, and/or revised based, at least in part, on feedback 204 pertaining to prefetch performance within address ranges covered by the respective entries 211. At 1602, the adaptive tracking engine 110 may, therefore, develop an access metadata configuration 725 that defines, inter alia, the set of address ranges covered by the access metadata 112 captured and/or maintained thereby. In some implementations, the data structure 310 and the dataset 210 are maintained within separate structures and/or memory components. In some examples, the access metadata entries 211 of the dataset 210 are maintained within a first memory 608 and the data structure 310 is maintained within a second memory 618.

At 1604, the management logic 226 (and/or adaptation logic 726) of the adaptive tracking engine 110 determines whether to evaluate the access metadata configuration 725. The determination may be based on whether the adaptive tracking engine 110 can implement one or more background operations based on, inter alia, the availability of idle resources, whether the adaptive tracking engine 110 has received and/or is implementing one or more foreground operations, and/or the like. Alternatively, or in addition, the determination may be based on a time interval and/or other criteria (e.g., operations to evaluate and/or adjust the access metadata configuration 725 may be implemented periodically, even if not in background operations). In some implementations, the adaptation logic 726 may determine whether to implement an iteration of an optimization process at 1604, which may be based on whether one or more termination criteria of the optimization process have been satisfied, as disclosed herein. If the determination at 1604 is to evaluate the access metadata configuration 725 (e.g., implement optimization operation(s)), the flow continues at 1606; otherwise, the flow continues at 1602.

At 1606, the adaptation logic 726 quantifies the utility of the access metadata configuration 725 of the adaptive tracking engine 110. The utility of the access metadata configuration 725 may be quantified by and/or within utility metadata 723, as disclosed herein. The utility metadata 723 may incorporate utility metrics 213 of respective access metadata entries 211 of the dataset 210 (and/or corresponding nodes 311 of the data structure 310). In some implementations, the utility metrics 213 may be weighted and/or adjusted based on one or more criteria, such as address range size, activity level, and/or the like.

At 1608, the adaptation logic 726 determines whether to modify the access metadata configuration 725 implemented by the adaptive tracking engine 110. The adaptation logic 726 may determine whether to modify the access metadata configuration 725 based on and/or by use of an adaptation policy. As disclosed herein, the adaptation policy may define conditions to trigger modifications to one or more address ranges covered by the access metadata 112. In some implementations, first metrics 213 are monitored while the access metadata 112 is configured to a cover a first set of address ranges defined by the data structure 310, second metrics 213 are monitored after adapting the access metadata 112 to cover a second set of address ranges different from the first set of address ranges (e.g., after modifying the data structure 310 to define the second set of addresses), and, based, at least in part, on the first metrics 213 and the second metrics 213, 1608 may include one of: adjusting the set of address ranges covered by the access metadata 112 such that the access metadata 112 reverts to covering the first set of address ranges (e.g., modifying the data structure 310 to revert to defining the first set of address ranges), continuing operation with access metadata 112 configured to cover the second set of address ranges, or adjusting the set of address ranges covered by the access metadata 112 such that the access metadata 112 covers a third set of address ranges different from the first set of address ranges and the second set of address ranges (e.g., modifying the data structure 310 to define the third set of address ranges).

Alternatively, or in addition, the determination at 1608 may be based on an optimization model defined by and/or within configuration data 524 of the adaptive tracking engine 110. The optimization model may implement an optimization algorithm or technique configured to balance the utility of respective access metadata configurations 725 against corresponding costs, which may be quantified in terms of resource utilization, as disclosed herein. The optimization model may be configured to iteratively converge to an optimal access metadata configuration 725 that produces optimal utility at minimal cost (and/or a local or approximate optimum access metadata configuration 725). The adaptation logic 726 may be configured to iteratively modify the access metadata configuration 725 through the optimization model (per the decisions at 1604 and 1608) until an optimal access metadata configuration 725 is achieved, or other termination criteria of the optimization process are satisfied. If the determination at 1608 is to modify the access metadata configuration 725, the flow continues at 1610; otherwise, the flow continues back at 1602.

At 1610 the adaptation logic 726 modifies the access metadata configuration 725 per the optimization model (and determination at 1608). The modifications may include, but are not limited to: promoting one or more access metadata entries 211 (expanding the address ranges covered by the entries 221), demoting one or more entries 211 (contracting the address ranges covered by the entries 211), removing one or more entries 211, and so on. The management logic 226 implements the modifications determined by the adaptation logic 726 within the data structure 310, which may include modifying the set of address ranges defined by the data structure 310. Promoting the address range of a selected entry 211 may include an inter-level merge operation in which: a) an entry 211 of the dataset 210 is configured to cover the address range defined by the upper-level parent node 311 of the selected entry 211 (a destination entry 211 for the inter-level merge), b) access metadata of entries 211 associated with child nodes 311 of the upper-level parent node 311, including the selected entry 211, are merged into the destination entry 211, c) the child nodes 311 are removed from the data structure 310, and d) entries 211 associated with the child nodes 311 are invalidated and/or removed from the dataset 210. Alternatively, or in addition, promoting the address range of a selected entry 211 may include an intra-level merge operation in which a) the node 311 associated with the selected entry 211 is converted into a composite node 311 that incorporates one or more sibling nodes 311 and/or address ranges within the same level 320 of the data structure, b) the selected entry 211 is configured to cover the expanded address range defined by the composite node 311, c) the sibling nodes 311 are removed from the data structure 310, and d) entries 211 associated with the sibling nodes 311 are invalidated and/or removed from the dataset 210. Demoting the address range of a selected entry 211 may include an inter-level split operation in which: a) one or more child nodes 311 of the node 311 associated with the selected entry 211 are created within a next lower level 320 of the data structure 310, b) entries 211 of the dataset 210 are configured to cover address ranges defined by the child nodes 311, c) access metadata 112 of the selected entry 211 is replicated within the entries 211 associated with the child nodes 311, and d) the selected entry 211 is invalidated and/or removed from the dataset 210. Demoting the address range of a selected entry 211 in an intra-level split operation may include: a) splitting a composite node 311 associated with the selected entry 211 into one or more non-composite nodes 311 within a same level 320 of the data structure 310 as the composite node 311, b) importing access metadata 112 of the selected entry 211 into entries 211 associated with the non-composite nodes 311, c) removing the composite node 311 from the data structure 310, and d) invalidating and/or removing the selected entry 211 from the dataset 210. Demoting the address range of a selected entry 211 associated with a non-composite node 311 within the lowest level 320-1 of the data structure 310 may include: a) removing the node 311 from the data structure 310, and b) invalidating and/or removing the selected entry 211 from the dataset 210. In some implementations, demoting the address range further includes designating the address range as no-track within the access metadata 112, which may prevent the adaptive tracking engine 110 from tracking the address range in response to subsequent tracking misses and/or prevent prefetch logic 515 from attempting to implement prefetch operations within the no-track address range. Following implementation of the modifications at 1610, the flow may continue at 1602 where the adaptive tracking engine 110 may implement address tracking operations in accordance with the modified access metadata configuration 725.

Example Systems for Adaptive Address Tracking

Figure 17:
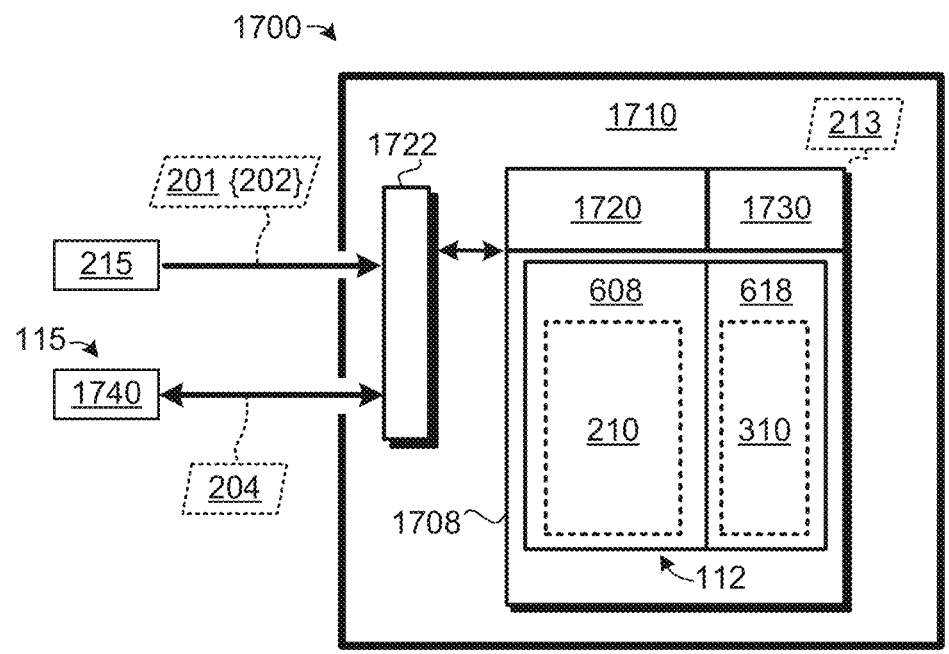
FIG. 17 illustrates an example of a system for implementing adaptive address tracking.

FIG. 17 illustrates an example system 1700 for implementing adaptive address tracking. The system 1700 includes an apparatus 1710, which may include an adaptive tracking engine 110 and/or means for implementing an adaptive tracking engine 110, as disclosed herein. The description of FIG. 17 refers to aspects described above, such as the adaptive tracking engine 110, which is depicted in multiple other figures (e.g., FIGS. 1-1 to 5-1 and 6 to 8). The system 1700 may include an interface 1722 for, inter alia, receiving commands 201 and/or indications of commands 201 to access data corresponding to addresses 202 of a memory address space. The interface 1722 may include circuitry, logic circuitry, interface circuitry, interface logic, switch circuitry, switch logic, routing circuitry, routing logic, interconnect circuitry, interconnect logic, I/O circuitry, analog circuitry, digital circuitry, logic gates, registers, switches, multiplexers, ALU, state machines, microprocessors, embedded processors, PIM circuitry, logic 220, an interface 222, first logic 624, an interconnect 105, and/or the like.

The system 1700 may further include a memory 1708, which may include, but is not limited to: a memory, a memory device, a memory component, memory circuitry, a memory array, semiconductor memory, a memory bank, a memory chip, volatile memory, RAM, DRAM, SRAM, SDRAM, DDR memory, non-volatile memory, solid-state memory, a memory 208, a first memory 608, a second memory 618, and/or the like.

In some aspects, the system 1700 includes a first component 1720 for storing access metadata 112 within the memory 1708 responsive to the commands 201. The access metadata 112 may be stored within entries 211 of a dataset 210, each entry 211 of the dataset 210 configured to cover a respective address range of a set of address ranges and comprising access metadata 112 pertaining to addresses 202 within the covered address range. The first component 1720 may include, but is not limited to: circuitry, logic circuitry, memory interface circuitry, memory interface logic, switch circuitry, switch logic, routing circuitry, routing logic, memory interconnect circuitry, memory interconnect logic, I/O circuitry, analog circuitry, digital circuitry, logic gates, registers, switches, multiplexers, ALU, state machines, microprocessors, embedded processors, PIM circuitry, logic 220, update logic 224, first logic 624, search logic 625, hardware search logic, a hardware search engine, and/or the like.

In some implementations, the first component 1720 includes and/or is coupled to a second component 1730 for determining, adjusting, tuning, and/or otherwise managing the set of address ranges covered by the access metadata 112. The second component 1730 may adjust the size of the address range covered by at least one of the entries 211 of the dataset 210 based, at least in part, on one or more metrics 213 indicative of prefetch performance within one or more address ranges of the set of address ranges. The second component 1730 can write one or more bits to the memory 1708 to adjust the size of an address range covered by an entry 211 of the dataset 211 (e.g., can write one or more bits within range metadata 214 of the entry 211). The second component 1730 may include, but is not limited to: circuitry, logic circuitry, memory interface circuitry, memory interface logic, switch circuitry, switch logic, routing circuitry, routing logic, memory interconnect circuitry, memory interconnect logic, I/O circuitry, analog circuitry, digital circuitry, logic gates, registers, switches, multiplexers, ALU, state machines, microprocessors, embedded processors, PIM circuitry, logic 220, management logic 226, second logic 626, adaptation logic 726, and/or the like.

In some aspects, the system 1700 includes a prefetcher 1740 configured to determine access patterns within address ranges covered by respective entries 211 of the dataset 210 based, at least in part, on access metadata 112 of the respective entries 211. The prefetcher 1740 may be further configured to prefetch data based, at least in part, on the determined access patterns. The prefetcher 1740 can be configured to predict addresses 202 of upcoming commands 201 and prefetch data corresponding to the predicted addresses 202. The prefetcher 1740 may include, but is not limited to: circuitry, logic circuitry, memory interface circuitry, memory interface logic, switch circuitry, switch logic, routing circuitry, routing logic, memory interconnect circuitry, memory interconnect logic, I/O circuitry, analog circuitry, digital circuitry, logic gates, registers, switches, multiplexers, ALU, state machines, microprocessors, embedded processors, PIM circuitry, a hardware prefetcher, prefetch circuitry, prefetch logic, cache logic, a stride prefetcher, a correlation prefetcher, an ML prefetcher, an LSTM prefetcher, logic 220, and/or the like.

The first component 1720 can be configured to provide access metadata 112 of an entry 211 of the dataset 210 to a consumer 115, such as the prefetcher 1740. A metric 213 associated with the entry 211 and/or address range covered by the entry 211 may be set, determined, and/or monitored based, at least in part, on prefetch performance within the address range covered by the entry 211. In some implementations, the second component 1730 sets, determines, and/or monitors metrics 213 indicative of prefetch performance within address ranges covered by access metadata 112 maintained within respective entries 211 of the dataset 210. The metrics 213 may be based, at least in part, on feedback 204 from one or more consumers 115 of the access metadata 112, such as the prefetcher 1740 or the like.

The second component 1730 may be configured to adjust the size of the address range covered by an entry 211 of the dataset 210 based, at least in part, on prefetch performance within the address range. The second component 1730 may increase the size of an address range covered by a first entry 211 of the dataset 210 in response to a metric 213 of the first entry 211 exceeding a first threshold. Conversely, the second component 1730 may decrease the size of the address range covered by the first entry 211 of the dataset 210 in response to the metric 213 of the first entry 211 being below a second threshold.

In some implementations, the second component 1730 is configured to modify the set of address ranges covered by the entries 211 of the dataset 210 by, inter alia, manipulating nodes 311 associated with the entries 211 within a data structure 310. The second component 1730 may be configured to combine a first entry 211 of the dataset 210 with a second entry 211 of the dataset 210 in response to determining that a metric 213 of the first entry 211 is within a threshold of a metric 213 of the second entry 211. The second component 1730 may be configured to split a selected entry 211 of the dataset 210 into two or more entries 211 in response to determining that a metric 213 of the selected entry 211 is below a threshold, each of the two or more entries 211 covering address ranges that are smaller than an address range covered by the selected entry 211. Alternatively, or in addition, the second component 1730 may invalidate an entry 211 of the dataset 210 in response to a metric 213 of the entry 211 failing to satisfy the threshold.

In some aspects, the data structure 310 includes a plurality of levels 320, each level 320 can correspond to a respective range size of a plurality of range sizes. The data structure 310 may include a first level 320-1 corresponding to entries 211 having a first range size and a second level 320-2 corresponding to entries 211 having a second range size larger than the first range size. The first component 1720 (and/or second component 1730) may be configured to map addresses 202 to entries 211 covering the addresses 202 through the data structure 310. The second component 1730 may map addresses 202 to entries 211 (and/or nodes 311 of the data structure 310) through the plurality of levels 320 of the data structure 310, e.g., from a top level 320-N towards a lowest level 320-1. The data structure 310 may comprise one or more of a lookup table, a mapping table, a multi-level mapping table, a trie, a tree, a prefix tree, or a radix tree.

In some implementations, the entries 211 of the dataset 210 are maintained within nodes 311 of the data structure 310. Each node 311 within the first level 320-1 of the data structure 310 may comprise an entry 211 of the first range size. Each node 311 within the second level 320-2 may comprise either: a) an entry 211 of the second range size, or b) a reference to a child structure 312 comprising one or more nodes 311 within the first level 320-1 of the data structure 310. The interface 1722 may be configured to receive an indication of a command 201 pertaining to an address 202 and, in response, the first component 1720 (and/or second component 1730) may search the second level 320-2 of the data structure 310 to select a node 311 of the second level 320-2 having second tag data that matches the address 202. If the selected node 311 includes an entry 211 of the dataset 210, the access metadata 122 of the entry 211 may be updated responsive to the command 201. Alternatively, if the selected node 311 references a child structure 312, the child structure 312 may be searched to identify a node 311 of the first level 320-1 having first tag data that matches the address 202.

The second component 1730 may determine that a specified address 202 is outside of the address ranges covered by the dataset 210 and, in response, map a first node 311 of the first level 320-1 of the data structure 310 to a first tag corresponding to a first portion of the specified address 202, the first node 311 defining a first address range of the first range size that covers the specified address. A second node 311 of the second level 320-2 of the data structure 310 may be mapped to a second tag corresponding to a second portion of the specified address 202, the second node 311 referencing the first node 311. The second component may associate a designated entry 211 of the dataset 210 with the first node 311 and configure the designated entry 211 to cover the first address range defined by the first node 311.

In some implementations, the second component 1730 is further configured to combine or merge groups of entries 211 of the dataset 210. The second component 1730 can select entries 211 of the first range size having metrics 213 that satisfy a threshold. The selected entries 211 may be associated with first nodes 311 within the first level 320-1 of the data structure 310, the first nodes 311 having a same parent node 311 within the second level 320-2 of the data structure 310 (a second node 311). Combining the selected entries 211 may include associating the second node 311 with a designated entry 211 of the dataset 210, configuring the designated entry 211 to cover the address range defined by the second node 311, incorporating access metadata 112 of the selected entries 211 into access metadata 112 of the designated entry 211, removing the first nodes 311 from the data structure 310, and/or invalidating the selected entries 211.

The second component 1730 may be further configured to identify an entry 211 of the dataset 210 having a metric 213 below a threshold, the identified entry 211 covering an address range of the second range size and being referenced by a designated node 311 within the second level 320-2 of the data structure 310. In response, the second component 1730 may create a group of nodes 311 within the first level 320 of the data structure 310, each node 311 of the group covering a respective portion of the address range covered by the designated node 311, replicate access metadata 112 of the identified entry 211 within entries 211 corresponding to respective nodes 311 of the group, and/or configure the designated node 311 to reference the group of nodes 311 created within the first level 320 of the data structure 310. Alternatively, or in addition, the second component 1730 may identify an entry 211 of the dataset 210 that has a metric 213 below the threshold and covers an address range defined by a node 311 within the first level 320 of the data structure 310. In response, the second component 1730 may be configured to invalidate the identified entry 211 and/or remove the corresponding node 311 from the data structure 310.

In some implementations, the first component 1720 stores the access metadata 112 (e.g., the dataset 210) within a first memory 608 and the second component 1730 maintains the data structure 310 within a second memory 618. The first memory 608 may be different and/or separate from the second memory 618. Alternatively, the access metadata 112 (e.g., the dataset 210) and the data structure 310 may be maintained within a same memory, such as the memory 208 illustrated in FIG. 2. In some aspects, the dataset 210 may be stored with and/or within the data structure 310. For example, entries 211 of the dataset 210 may be maintained within respective nodes 311 of the data structure 310.

Figure 18:
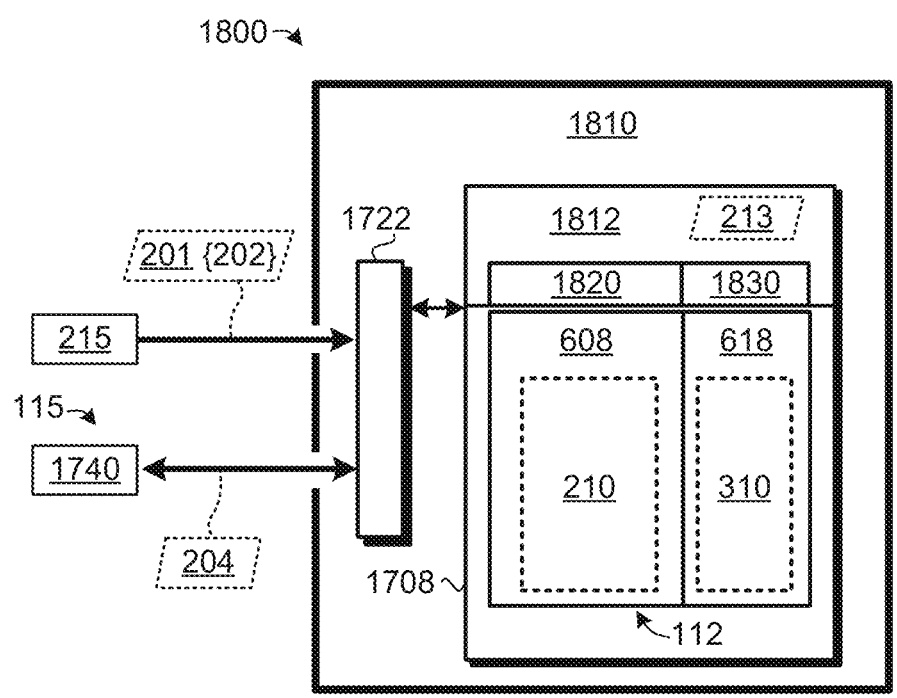
FIG. 18 illustrates another example of a system for implementing adaptive address tracking.

FIG. 18 illustrates an example system 1800 for implementing adaptive address tracking. The system 1800 may include an apparatus 1810, which may include an adaptive tracking engine 110 and/or means for implementing an adaptive tracking engine 110, as disclosed herein. The description of FIG. 18 refers to aspects described above, such as the adaptive tracking engine 110, which is depicted in multiple other figures (e.g., FIGS. 1-1 to 5-1 and 6 to 8). The system 1800 may include a component 1812 configured to represent address ranges of a memory address space by nodes 311 within a plurality of levels 320 of a data structure 310, each level 310 of the plurality of levels 320 of the data structure 310 respectively corresponding to an address range size of a plurality of address range sizes. The component 1812 may maintain access metadata 112 within entries 211 of a dataset 210, each entry 211 of the dataset 210 associated with a respective node 311 of the data structure 310 and covering an address range represented by the associated node 311. In some aspects, the component 1812 is further configured to modify the data structure 310 based, at least in part, a metric 213 pertaining to prefetch performance, and update at least one address range covered by at least one of the entries 211 of the dataset 210 responsive to modifying the data structure 310. The component 1812 may include, but is not limited to: circuitry, logic circuitry, memory interface circuitry, memory interface logic, switch circuitry, switch logic, routing circuitry, routing logic, memory interconnect circuitry, memory interconnect logic, I/O circuitry, analog circuitry, digital circuitry, logic gates, registers, switches, multiplexers, ALU, state machines, microprocessors, embedded processors, PIM circuitry, logic 220, update logic 224, management logic 226, first logic 624, second logic 626, search logic 625, hardware search logic, hardware search circuitry, a hardware search engine, adaptation logic 726, a memory 208, a memory 1708, a first memory 608, a second memory 618, and/or the like.

In some aspects, the system 1800 includes an interface 1722 for receiving information pertaining to commands 201 associated with the memory address space (and/or indications of the commands 201), providing access metadata 112 to one or more consumers 115, such as a prefetcher 1740, and/or receiving feedback 204 pertaining to prefetch performance within address ranges covered by the provided access metadata 112, as disclosed herein. The component 1812 may be further configured to determine the metric 213 pertaining to prefetch performance based, at least in part, on the feedback 204. In some implementations, the component 1812 sets, determines, and/or monitors metrics 213 pertaining to prefetch performance within address ranges represented by respective nodes 311 of the data structure 310 (and/or within address ranges covered by respective entries 211 of the dataset 210).

In some implementations, the component 1812 includes and/or is coupled to a first component 1820 for storing, updating, and/or maintaining the dataset 210 comprising the access metadata 112 within a first memory 608. The first component 1820 may be configured to store and/or update access metadata 112 of respective entries 211 of the dataset 210 in response to commands 201 pertaining to addresses 202 within address ranges covered by the respective entries 211 (and/or in response indications of and/or information pertaining to the commands 201). The first component 1820 may be further configured to map addresses 202 to entries 211 of the dataset 210 (e.g., lookup entries 211 of the dataset 210 corresponding to specified addresses 202). The first component 1820 may include, but is not limited to: circuitry, logic circuitry, memory interface circuitry, memory interface logic, switch circuitry, switch logic, routing circuitry, routing logic, memory interconnect circuitry, memory interconnect logic, I/O circuitry, analog circuitry, digital circuitry, logic gates, registers, switches, multiplexers, ALU, state machines, microprocessors, embedded processors, PIM circuitry, logic 220, update logic 224, first logic 624, search logic 625, hardware search logic, hardware search circuitry, a hardware search engine, and/or the like.

In some aspects, the component 1812 includes and/or is coupled to a second component 1830 for maintaining the data structure 310 within a second memory 618, modifying the set of address ranges represented by the nodes 311 of the data structure 310, and/or configuring entries 211 of the dataset 210 stored within the first memory 608 to cover the modified set of address ranges represented by the nodes 311 of the data structure 310. The second component 1830 may be configured to modify the set of address ranges based, at least in part, on the metric 213 pertaining to prefetch performance. The second component 1830 may be configured to determine and/or monitor metrics 213 pertaining to prefetch performance within address ranges represented by respective nodes 311 of the data structure 310 (and/or covered by access metadata 112 maintained within corresponding entries 211 of the dataset 210) and modify the set of address ranges based, at least in part, on metrics 213 of one or more of the address ranges. The second component 1830 may include, but is not limited to: circuitry, logic circuitry, memory interface circuitry, memory interface logic, switch circuitry, switch logic, routing circuitry, routing logic, memory interconnect circuitry, memory interconnect logic, I/O circuitry, analog circuitry, digital circuitry, logic gates, registers, switches, multiplexers, ALU, state machines, microprocessors, embedded processors, PIM circuitry, logic 220, management logic 226, second logic 626, adaptation logic 726, and/or the like.

In some aspects, the component 1812 (and/or component 1830) is configured to merge selected nodes 311 of the data structure 310. Merging the selected nodes 311 may include configuring target node 311 of the data structure 310 to represent an address range that spans the address ranges represented by each of the selected nodes 311, configuring an entry 211 of the dataset 210 to cover the address range represented by the target node 311, and/or invalidating entries 211 associated with the selected nodes 311 within the dataset 210. In some implementations, access metadata 112 of the entries 211 associated with the selected nodes 311 may be combined into access metadata 112 of the entry 211 associated with the target node 311.

In some examples, the component 1812 (and/or component 1830) merges nodes 311 selected within a first level 320-1 of the data structure 310. The nodes 311 may be selected based, at least in part, on prefetch performance within address ranges covered by the selected nodes 311. The selected nodes 311 may be merged into a parent node 311 within a second level 320-2 of the data structure 310, the second level 320-2 higher than the first level 320-1 in a hierarchy defined by the data structure 310. Merging the selected nodes 311 may include configuring an entry 211 of the dataset 210 associated with the parent node 311 to cover the address range represented by the parent node 311, incorporating access metadata 112 of the entries 211 associated with the selected nodes 311 into the configured entry 211, and/or for invalidating entries 211 of the dataset 210 that are associated with child nodes 311 of the parent node 311 within the data structure 310.

The component 1812 (and/or component 1830) may be further configured to split a node 311 of the data structure 310 into a group of two or more nodes 311. The node 311 may be selected based, at least in part, on prefetch performance within an address range represented by the node 311. Splitting a selected node 311 may include configuring a group of two or more nodes 311 to represent respective subsets of the address range represented by the selected node, configuring entries 211 of the dataset 210 to cover address ranges represented by each node 311 of the group of two or more nodes 311, and/or invalidating the entry 211 associated with the selected node 311 within the dataset 210. In addition, access metadata 112 of the entry 211 associated with the selected node 311 may be replicated within entries 211 associated with each node 311 of the group of two or more nodes 311. In some implementations, the group of two or more nodes 311 may be created within a child structure 312 disposed within a lower level 320 of the data structure 310, the lower level 320 corresponding to a smaller address range size than an address range size of an upper level 320 of the data structure 310 comprising the selected node 310. The selected node 311 may be designated as the parent node 311 of each node 311 of the group of two or more nodes 311 within the data structure 310. Alternatively, the group of two or more nodes 311 may be created within a same level 320 of the data structure 310 as the selected node 311, and the parent node 311 of the selected node 311 may be designated as the parent node 311 of each node 311 of the group of the two or more nodes 311 within the data structure 310.

In some aspects, the component 1812 (and/or second component 1830) is further configured to remove a selected node 311 from the data structure 310 based, at least in part, on prefetch performance within an address range represented by the selected node 311. Removing the selected node 311 may include invalidating an entry 211 of the dataset 310 associated with the selected node 311. In some implementations, removing the selected node 311 further includes associating the address range represented by the selected node 311 with a no-track indicator, the no-track indicator configured to prevent subsequent creation of one or more nodes 311 representing the address range within the data structure 310 (and/or prevent creation of entries 211 comprising access metadata 112 covering the address range within the dataset 210).

In some implementations, the component 1812 (and/or second component 1830) is configured to add a node 311 to a first level 320-1 of the data structure 310 in response to determining that a specified address 202 is not covered by the entries 211 of the dataset 210. The node 311 may be configured to represent an address range that includes the specified address 202. Adding the node 311 may further include configuring a first entry 211 of the dataset 210 to cover the address range represented by the node 311. Adding the node 311 may also include establishing one or more parent-child relationships between the node 311 and one or more parent nodes 311 within at least one upper level 320 of the data structure 310. The data structure 310 may be configured to establish parent-child relationships between nodes 310 within respective levels 320 of the data structure 310. The parent-child relationships between nodes 311 may define and/or correspond to relationships between address ranges represented by the nodes 311. In some aspects, each child node 311 of a parent node 311 may be configured to represent a respective subset of the address range represented by the parent node 311. Adding the node 311 to the first level 320-1 of the data structure 310 may include establishing a parent-child relationship between the node 311 and a parent node 311 within a second level 320-2 of the data structure 310 (a designated node 311). The second level 320-2 may be adjacent to the first level 320-1 in a hierarchy defined by the data structure 320. The second level 320-2 may correspond to a larger address range size than an address range size of the first level 320-1. The address range represented by the node 311 may be a subset of the address range represented by the designated node 311.

In some aspects, the component 1812 (and/or second component 1830) is further configured to promote the node 311 from the first level 320-1 of the data structure 310 to the second level 320-1. The node 311 may be selected for promotion based, at least in part, on prefetch performance within the address range represented by the node 311. Promoting the node 311 may include configuring an entry 211 of the dataset 210 to cover the address range represented by the designated node 311 and/or associating the entry 211 with the designated node 311 (the parent of the node 311 within the second level 320-2 of the data structure 310). In some implementations, promoting the node 311 includes modifying the first entry 211 to cover the larger address range represented by the designated node 311. Alternatively, a second entry 211 of the dataset 210 may be configured to cover the address range represented by the designated node 311. Promoting the node 311 may further include merging access metadata 112 of the first entry 211 into access metadata 112 of the second entry 211 and/or invalidating the first entry 211 within the dataset 210.

Conclusion

Although implementations for adaptive address tracking have been described in language specific to certain features and/or methods, the subject of the appended claims is not necessarily limited to the specific features or methods described. Rather, the specific features and methods are disclosed as example implementations for adaptive address tracking.

The invention claimed is:

1. An apparatus comprising:
at least one memory configured to store a data structure and a dataset, the dataset comprising multiple entries including access metadata corresponding to memory accesses for an address space, each entry of the multiple entries covering a respective address range of a set of address ranges covered by the access metadata; and
logic coupled to the at least one memory and configured to:
maintain the data structure within the at least one memory, the data structure comprising multiple nodes distributed across multiple levels, each respective level of the multiple levels corresponding to entries of the dataset having a respective range size of multiple range sizes, the multiple levels including a first level corresponding to a first range size and a second level corresponding to a second range size smaller than the first range size, each respective entry of the multiple entries associated with a respective node of the multiple nodes at a level of the multiple levels that corresponds to the respective address range covered by the access metadata of the respective entry;
split a node of the first level of the data structure into two or more nodes of the second level of the data structure based on access metadata covering the respective address range of the node; and
split an entry of the multiple entries into two or more entries of the dataset, the entry covering the respective address range of the node, the two or more entries covering two or more non-overlapping address ranges contained by the respective address range of the node,
one or more nodes of the multiple nodes including at least one node tag configured to uniquely identify at least one node within a respective level of the multiple levels of the data structure, the one or more nodes and the at least one node at different levels of the multiple levels of the data structure; and
another node of the multiple nodes including coverage data pertaining to access metadata for an address range of the set of address ranges, the coverage data comprising a reference to another entry of the multiple entries of the dataset, and the other entry including the access metadata for the address range.

2. The apparatus of claim 1, wherein the logic is configured to:
modify the data structure to adjust the set of address ranges based, at least in part, on utility metrics of the access metadata; and
propagate modifications of the data structure to the dataset.

3. The apparatus of claim 2, wherein the logic is configured to:
propagate the modifications of the data structure by reconfiguring the set of address ranges covered by respective entries of the dataset that include access metadata to correspond with the adjusted set of address ranges of the data structure.

4. The apparatus of claim 1, wherein:
the coverage data comprises the access metadata for the address range.

5. The apparatus of claim 1, wherein:
the data structure is separate from the dataset;
the at least one memory comprises a first memory and a second memory;
the first memory is configured to store the data structure; and
the second memory is configured to store the dataset.

6. The apparatus of claim 1, wherein:
the multiple nodes include a particular node;
the particular node is part of the first level of the multiple levels; and
the particular node includes at least two of a next valid indicator, a next pointer, an entry valid indicator, or an entry pointer.

7. The apparatus of claim 1, wherein:
the multiple levels include a third level corresponding to a third range size smaller than the second range size.

8. The apparatus of claim 7, wherein:
the second level comprises a particular node that references a child structure of the third level, the child structure including two or more other nodes corresponding to the third range size.

9. The apparatus of claim 1, wherein:
the apparatus comprises a memory device; and
the memory device includes the at least one memory and the logic.

10. The apparatus of claim 1, wherein the logic is configured to:
add a particular node to the second level of the multiple levels of the data structure in response to a determination that a specified address is not covered by the multiple entries of the dataset, the particular node configured to represent an address range that includes the specified address; and
create a particular entry of the multiple entries of the dataset to cover the address range represented by the particular node.

11. The apparatus of claim 1, wherein:
the two or more nodes include a first node of the second level and a second node of the second level;
the two or more non-overlapping address ranges include a first address range corresponding to the first node and a second address range corresponding to the second node;
the two or more entries include a first entry corresponding to the first node and a second entry corresponding to the second node; and
the logic is configured to:
update first access metadata stored in the first entry based on memory accesses pertaining to the first address range; and
update second access metadata stored in the second entry based on memory accesses pertaining to the second address range.

12. The apparatus of claim 1, wherein the logic is configured to:
merge two or more other nodes of the second level of the data structure into a particular node of the first level of the data structure based on access metadata covering two or more other non-overlapping address ranges of the two or more other nodes, the particular node corresponding to a respective address range that spans the two or more other non-overlapping address ranges; and
merge two or more other entries of the dataset into a particular entry of the dataset, the particular entry covering the respective address range of the particular node.

13. The apparatus of claim 1, wherein:
each respective entry of the multiple entries comprises an indication of the respective address range covered by the access metadata of the respective entry; and
the access metadata comprises at least one of access statistics, access pattern statistics, access history, access sequences, access frequency metadata, access time metadata, access pattern metadata, stride patterns, correlation patterns, delta sequences, access modeling metadata, machine learning modeling metadata, or machine learning feature data.

14. The apparatus of claim 1, wherein the logic is configured to:
provide, to a prefetcher, access metadata of a particular entry of the dataset, the prefetcher configured to prefetch data within a particular address range covered by the particular entry into a cache memory based, at least in part, on the provided access metadata; and
set a metric of the particular entry based, at least in part, on prefetch performance within the particular address range covered by the particular entry.

15. A method comprising:
storing in at least one memory a dataset comprising multiple entries including access metadata corresponding to memory accesses for an address space, each entry of the multiple entries covering a respective address range of a set of address ranges covered by the access metadata;
maintaining a data structure within the at least one memory, the data structure comprising multiple nodes distributed across multiple levels, each respective level of the multiple levels corresponding to entries of the dataset having a respective range size of multiple range sizes, the multiple levels including a first level corresponding to a first range size and a second level corresponding to a second range size smaller than the first range size, each respective entry of the multiple entries associated with a respective node of the multiple nodes at a level of the multiple levels that corresponds to the respective address range covered by the access metadata of the respective entry;
splitting a node of the first level of the data structure into two or more nodes of the second level of the data structure based on access metadata covering the respective address range of the node; and
splitting an entry of the multiple entries into two or more entries of the dataset, the entry covering the respective address range of the node, the two or more entries covering two or more non-overlapping address ranges contained by the respective address range of the node, one or more nodes of the multiple nodes including at least one node tag configured to uniquely identify at least one node within a respective level of the multiple levels of the data structure, the one or more nodes and the at least one node at different levels of the multiple levels of the data structure; and another node of the multiple nodes including coverage data pertaining to access metadata for an address range of the set of address ranges, the coverage data comprising a reference to another entry of the multiple entries of the dataset, and the other entry including the access metadata for the address range.

16. The method of claim 15, further comprising:
determining that a specified address is outside of the set of address ranges covered by the dataset;
mapping a second node of the second level of the data structure to a second tag corresponding to a second portion of the specified address, the second node defining a second address range of the second range size that covers the specified address;
mapping a first node of the first level of the data structure to a first tag corresponding to a first portion of the specified address, the first node referencing the second node; and
associating a designated entry of the dataset with the second node, the designated entry configured to cover the second address range.

17. The method of claim 15, further comprising:
identifying a particular entry of the dataset having a metric below a threshold, the identified particular entry covering a particular address range of the first range size and being referenced by a designated node within the first level of the data structure;
creating a group of nodes within the second level of the data structure, each node of the group of nodes covering a respective portion of the particular address range covered by the designated node;
replicating access metadata of the identified particular entry within entries corresponding to respective nodes of the group of nodes; and
configuring the designated node to reference the group of nodes created within the second level of the data structure.

18. The method of claim 15, further comprising:
identifying a particular entry of the dataset having a metric below a threshold, the identified particular entry covering a particular address range of the second range size and being referenced by a particular node within the second level of the data structure;
invalidating the identified particular entry; and
removing the particular node from the data structure.

19. The method of claim 15, further comprising:
maintaining copies of the multiple entries of the dataset within nodes of the data structure, wherein:
each node of the second level of the data structure comprises a copy of a given entry for the second range size; and
each node of the first level of the data structure comprises one of:
a copy of a given entry for the first range size, or
a reference to a child structure comprising one or more nodes of the second level of the data structure.

20. A system comprising:
means for storing in at least one memory a dataset comprising multiple entries including access metadata corresponding to memory accesses for an address space, each entry of the multiple entries covering a respective address range of a set of address ranges covered by the access metadata;
means for maintaining a data structure within the at least one memory, the data structure comprising multiple nodes distributed across multiple levels, each respective level of the multiple levels corresponding to entries of the dataset having a respective range size of multiple range sizes, the multiple levels including a first level corresponding to a first range size and a second level corresponding to a second range size smaller than the first range size, each respective entry of the multiple entries associated with a respective node of the multiple nodes at a level of the multiple levels that corresponds to the respective address range covered by the access metadata of the respective entry;
means for splitting a node of the first level of the data structure into two or more nodes of the second level of the data structure based on access metadata covering the respective address range of the node; and
means for splitting an entry of the multiple entries into two or more entries of the dataset, the entry covering the respective address range of the node, the two or more entries covering two or more non-overlapping address ranges contained by the respective address range of the node, one or more nodes of the multiple nodes including at least one node tag configured to uniquely identify at least one node within a respective level of the multiple levels of the data structure, the one or more nodes and the at least one node at different levels of the multiple levels of the data structure; and another node of the multiple nodes including coverage data pertaining to access metadata for an address range of the set of address ranges, the coverage data comprising a reference to another entry of the multiple entries of the dataset, and the other entry including the access metadata for the address range.

* * * * *